(12) United States Patent
Kim et al.

(10) Patent No.: US 8,249,662 B2
(45) Date of Patent: Aug. 21, 2012

(54) MOBILE TERMINAL AND TRANSPARENT DISPLAY CONTROL METHOD THEREOF

(75) Inventors: Jong-Hwan Kim, Gyeonggi-Do (KR); Nam-Yong Park, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 494 days.

(21) Appl. No.: 12/407,024

(22) Filed: Mar. 19, 2009

(65) Prior Publication Data

US 2009/0298548 A1    Dec. 3, 2009

(30) Foreign Application Priority Data

May 29, 2008  (KR) ........................ 10-2008-0050460
Jun. 10, 2008  (KR) ........................ 10-2008-0054327

(51) Int. Cl.
*G09G 5/00*  (2006.01)
*H04W 99/00*  (2009.01)
(52) U.S. Cl. ..................... 455/566; 455/575.1
(58) Field of Classification Search .................. 455/566, 455/575.1, 575.3, 575.4
See application file for complete search history.

(56) References Cited

U.S. PATENT DOCUMENTS

| | | | |
|---|---|---|---|
| 5,160,920 A | 11/1992 | Harris | |
| 5,469,185 A | 11/1995 | Lebby et al. | |
| 5,798,744 A | 8/1998 | Tanaka et al. | |
| 5,801,758 A | 9/1998 | Heirich | |
| 5,896,575 A * | 4/1999 | Higginbotham et al. | 455/566 |
| 6,132,048 A * | 10/2000 | Gao et al. | 353/20 |
| 6,327,482 B1 | 12/2001 | Miyashita | |
| 6,466,202 B1 | 10/2002 | Suso et al. | |
| 6,662,244 B1 | 12/2003 | Takahashi | |
| 6,753,842 B1 | 6/2004 | Williams et al. | |
| 6,998,772 B2 * | 2/2006 | Terumoto | 313/504 |
| 7,205,959 B2 | 4/2007 | Henriksson | |
| 7,420,585 B2 | 9/2008 | Fredlund et al. | |
| 7,460,108 B2 | 12/2008 | Tamura | |
| 7,504,770 B2 | 3/2009 | Choong | |
| 7,532,173 B2 | 5/2009 | Yamazaki et al. | |
| 7,573,522 B2 | 8/2009 | Kim | |
| 7,724,208 B1 | 5/2010 | Engel et al. | |
| 7,738,912 B1 | 6/2010 | Hawkins et al. | |
| 7,876,288 B1 | 1/2011 | Huang | |
| 8,022,977 B2 | 9/2011 | Kanade et al. | |
| 2002/0094846 A1 | 7/2002 | Kishimoto et al. | |
| 2004/0017524 A1 | 1/2004 | Li | |
| 2004/0100510 A1 | 5/2004 | Milic-Frayling et al. | |
| 2004/0257473 A1 | 12/2004 | Miyagawa | |
| 2005/0001796 A1 | 1/2005 | Liu | |
| 2005/0012842 A1 | 1/2005 | Miyagawa et al. | |
| 2005/0024339 A1 * | 2/2005 | Yamazaki et al. | 345/169 |
| 2005/0030518 A1 | 2/2005 | Nishi et al. | |
| 2005/0037815 A1 | 2/2005 | Besharat et al. | |

(Continued)

FOREIGN PATENT DOCUMENTS

EP    0 967 511 A1    12/1999

(Continued)

*Primary Examiner* — Howard Williams
(74) *Attorney, Agent, or Firm* — Birch, Stewart, Kolasch & Birch, LLP

(57) ABSTRACT

A mobile terminal including a transparent display configured to display information on both surfaces of the transparent display, a sensing unit configured to detect a movement of the terminal, and a controller configured to control the information displayed on said both surfaces of the transparent display based on the detected movement of the terminal.

20 Claims, 73 Drawing Sheets

U.S. PATENT DOCUMENTS

| | | |
|---|---|---|
| 2005/0078227 A1 | 4/2005 | Kobayashi et al. |
| 2005/0083642 A1 | 4/2005 | Senpuku et al. |
| 2005/0117096 A1 | 6/2005 | Voloschenko et al. |
| 2005/0183040 A1 | 8/2005 | Kondo et al. |
| 2006/0044286 A1 | 3/2006 | Kohlhaas et al. |
| 2006/0079302 A1 | 4/2006 | Kota et al. |
| 2007/0002130 A1 | 1/2007 | Hartkop |
| 2007/0075915 A1 | 4/2007 | Cheon et al. |
| 2007/0188450 A1 | 8/2007 | Hernandez et al. |
| 2007/0287056 A1 | 12/2007 | Kim et al. |
| 2008/0106591 A1 | 5/2008 | Crocker et al. |
| 2008/0129719 A1 | 6/2008 | Jonsson et al. |
| 2008/0220821 A1 | 9/2008 | Okuzako et al. |
| 2009/0009628 A1 | 1/2009 | Janicek |
| 2009/0091513 A1 | 4/2009 | Kuhn |
| 2009/0231244 A1* | 9/2009 | Lee .................................. 345/76 |
| 2009/0298546 A1 | 12/2009 | Kim et al. |
| 2010/0222110 A1 | 9/2010 | Kim et al. |
| 2011/0171942 A1 | 7/2011 | Kokubo |

FOREIGN PATENT DOCUMENTS

| | | |
|---|---|---|
| EP | 1 510 994 A1 | 3/2005 |
| EP | 1 770 473 A2 | 4/2007 |
| EP | 1 804 113 A1 | 7/2007 |
| EP | 1 843 563 A1 | 10/2007 |
| JP | 61-21561 A | 1/1986 |
| WO | WO-98/38822 A1 | 9/1998 |
| WO | WO 2007/047685 A2 | 4/2007 |
| WO | WO 2007/047685 A3 | 4/2007 |
| WO | WO 2007/138543 A2 | 12/2007 |
| WO | WO 2007/138543 A3 | 12/2007 |

* cited by examiner

FIG. 5
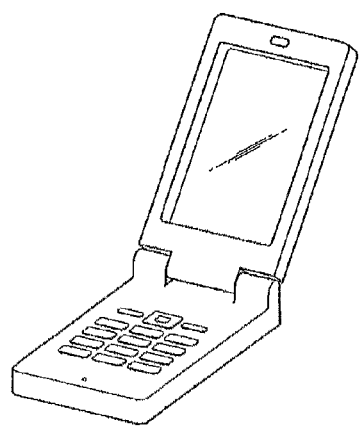
(a)
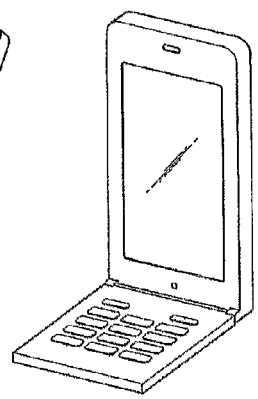
(b)
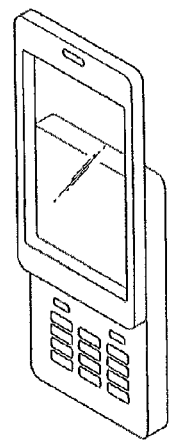
(c)
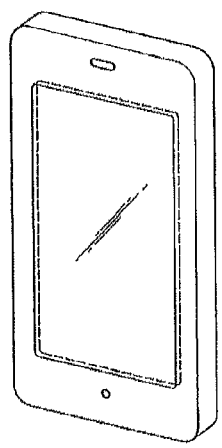
(d)
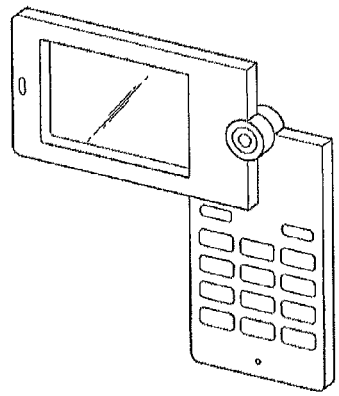
(e)
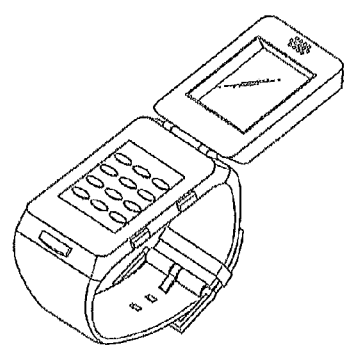
(f)

FIG. 6
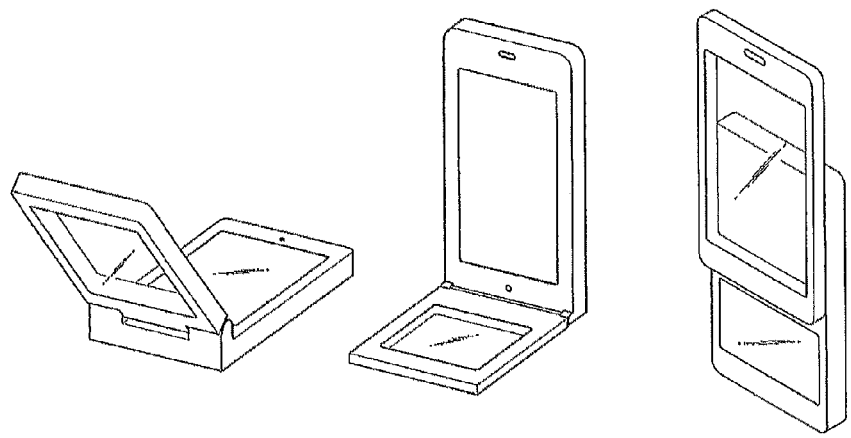
(a)  (b)  (c)
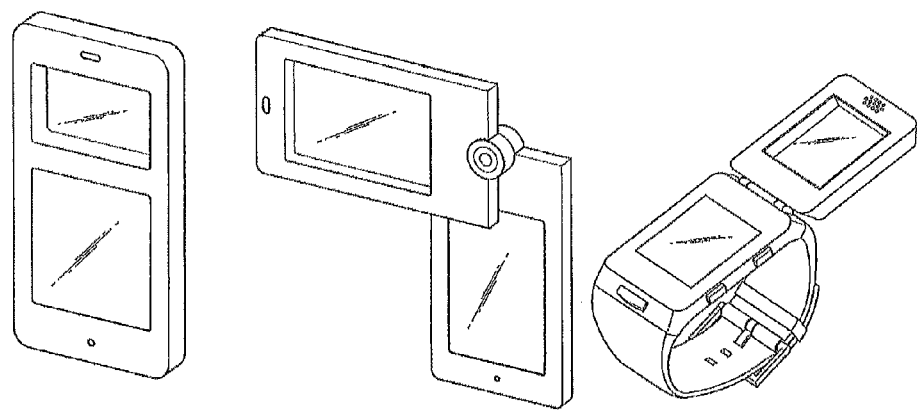
(d)  (e)  (f)

FIG. 7A
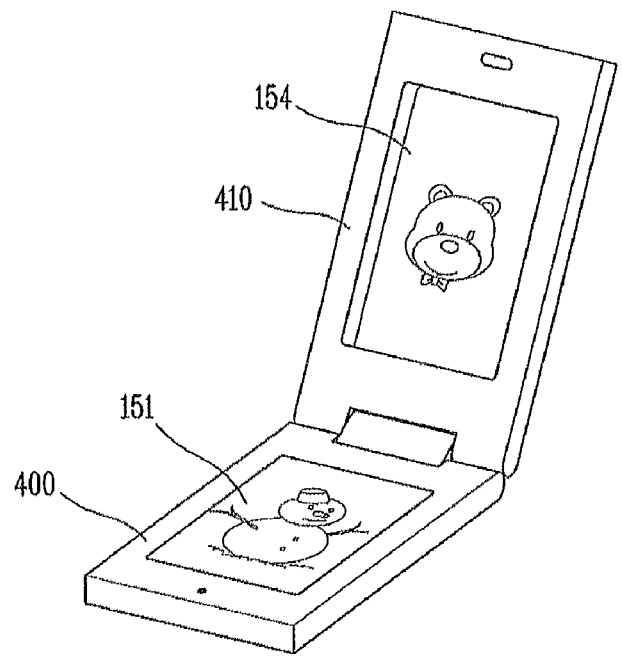
(a)
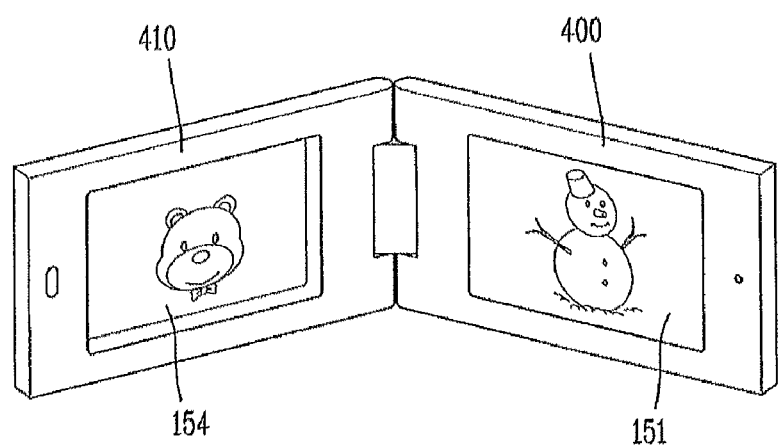
(b)

FIG. 7B
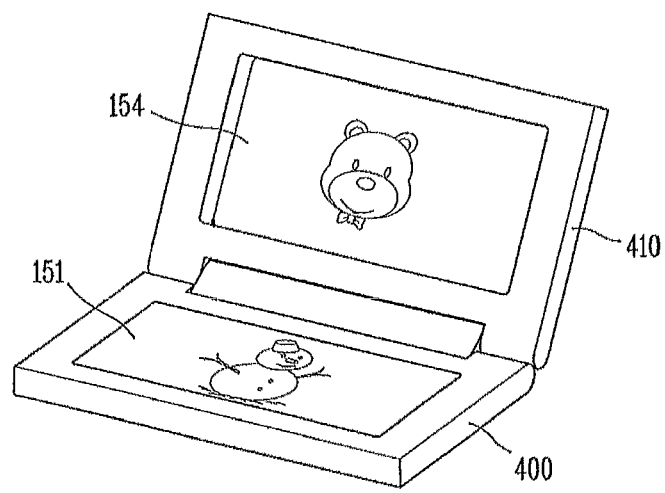
(a)
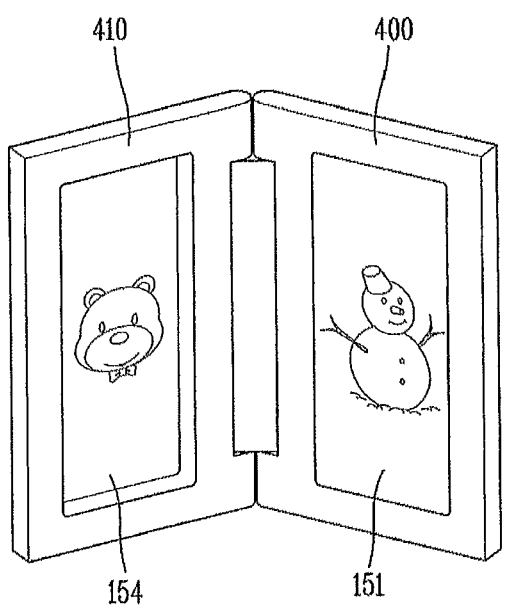
(b)

FIG. 8
(a) 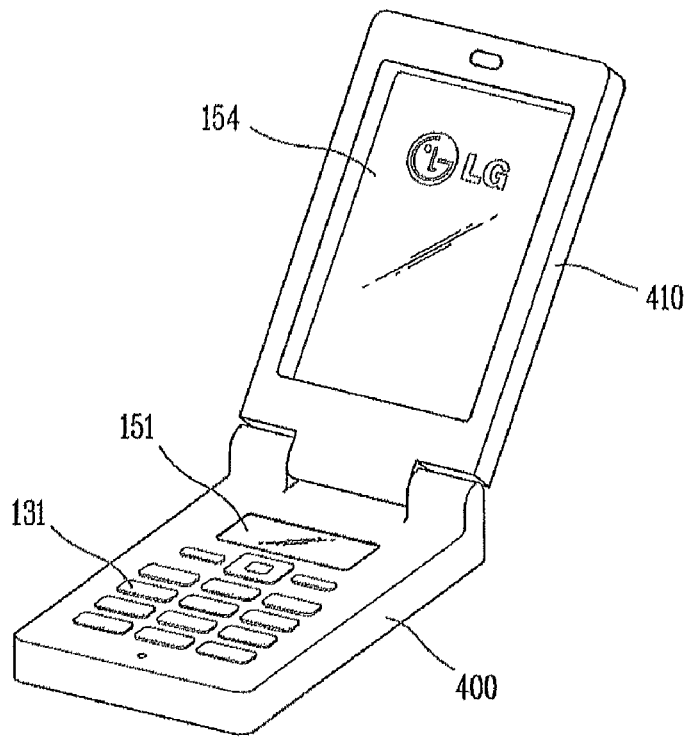
(b) 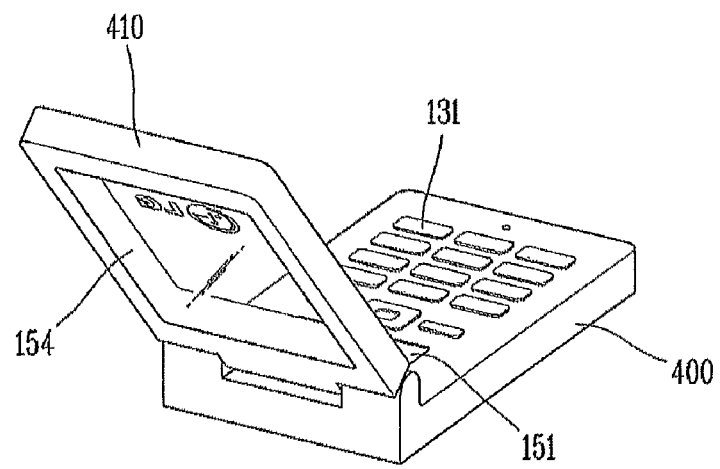

FIG. 9
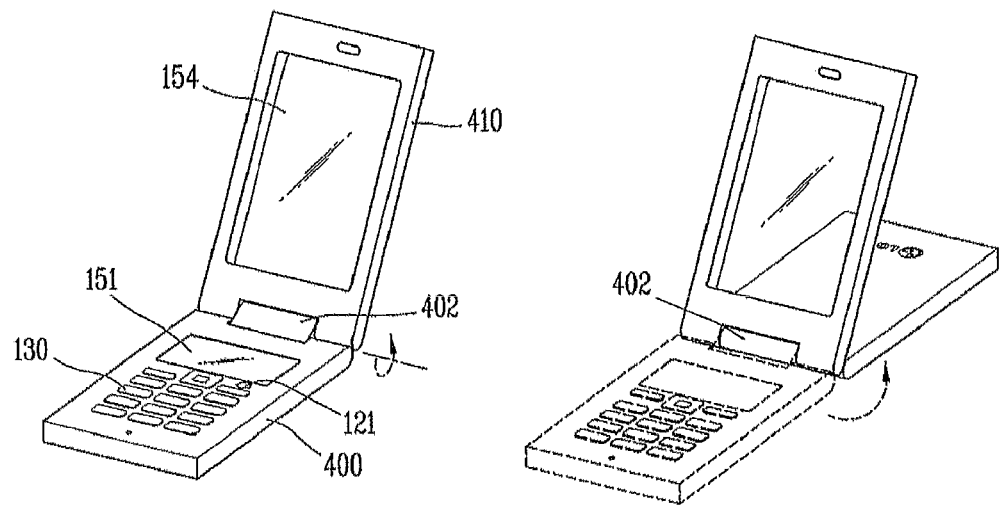
(a)  (b)
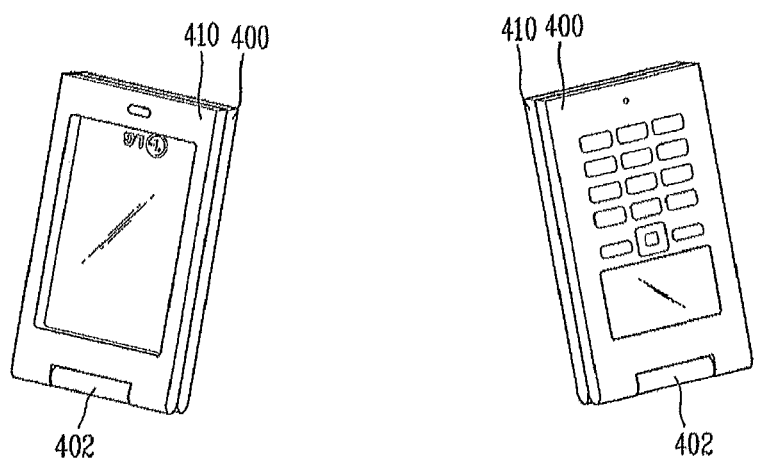
(c)  (d)

FIG. 10
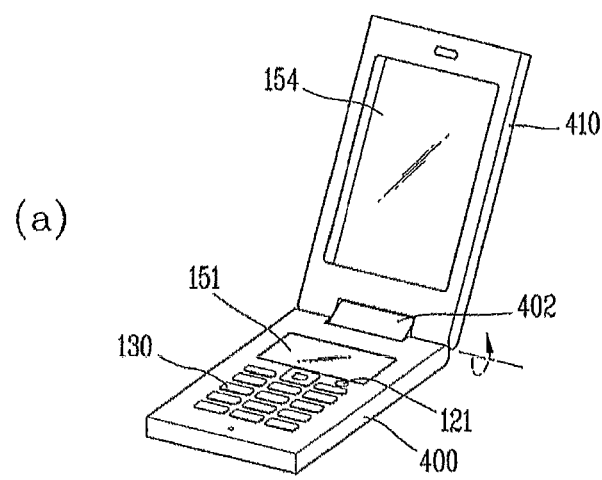
(a)
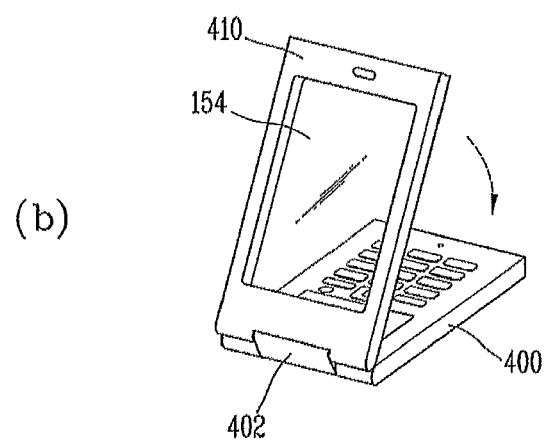
(b)
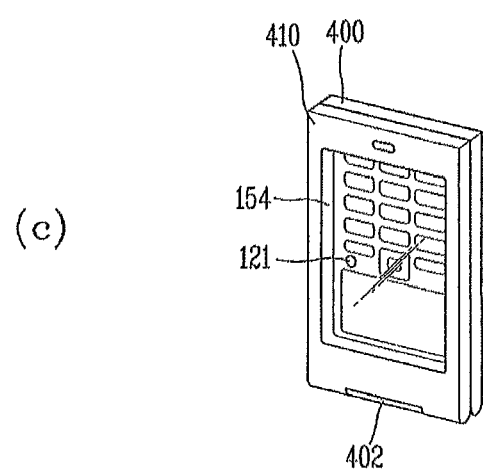
(c)

FIG. 11
(a) 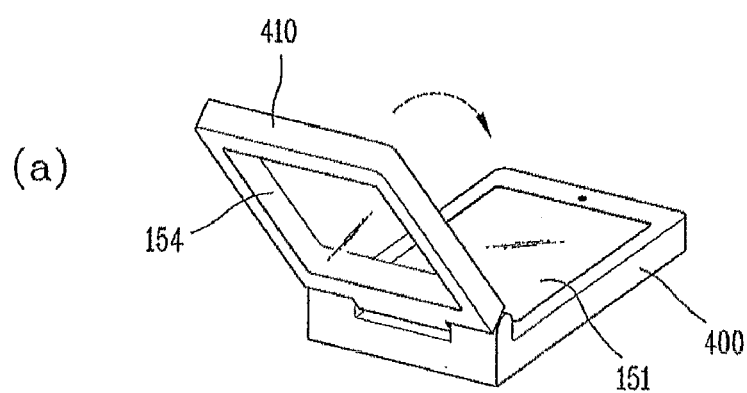
(b) 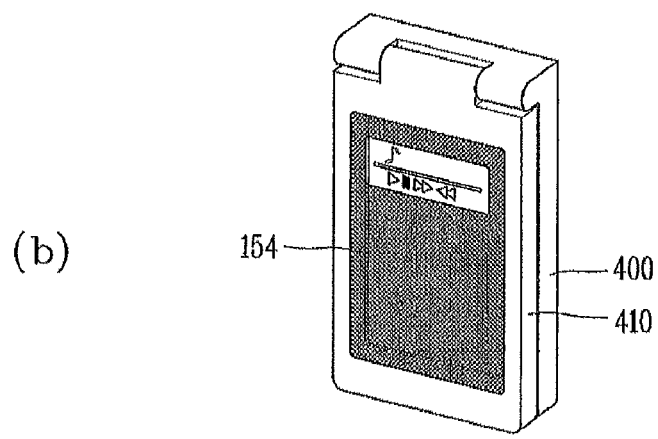
(c) 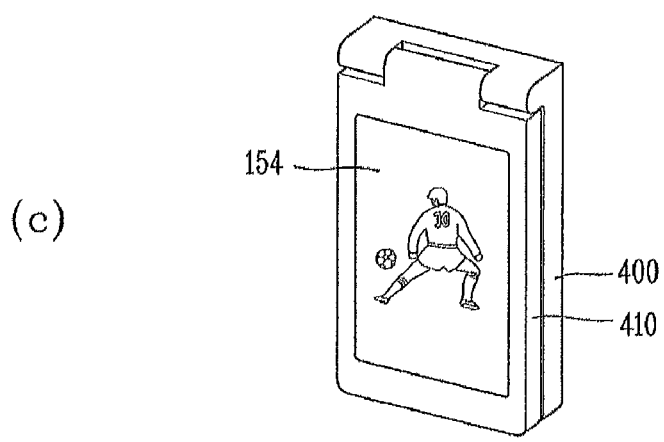

FIG. 12A
(a) 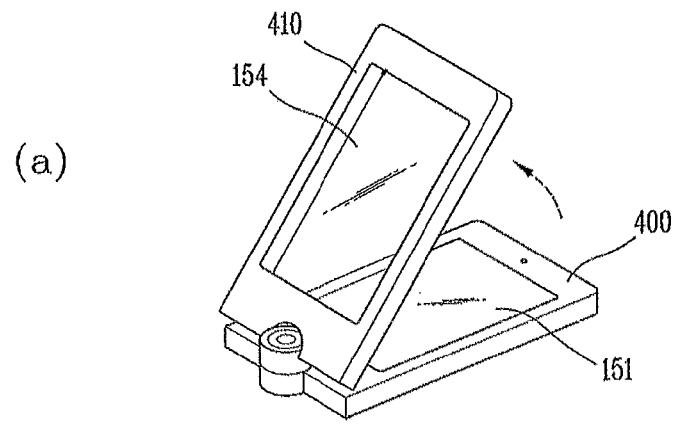
(b) 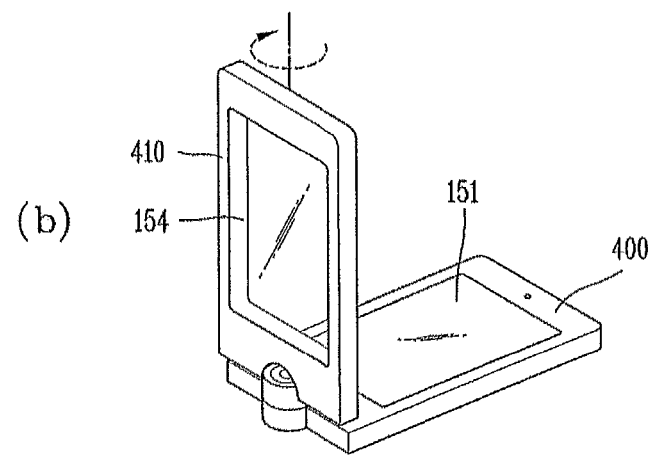
(c) 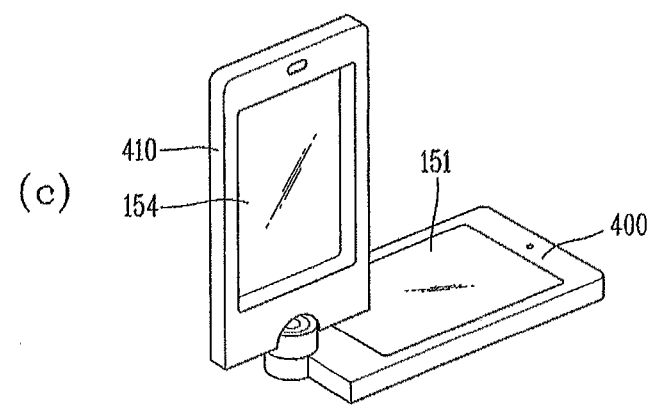

FIG. 12B
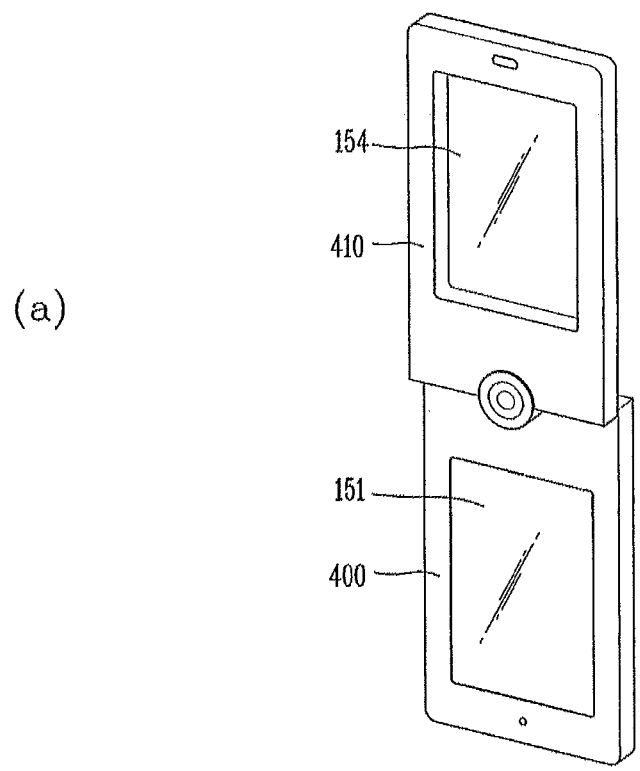
(a)
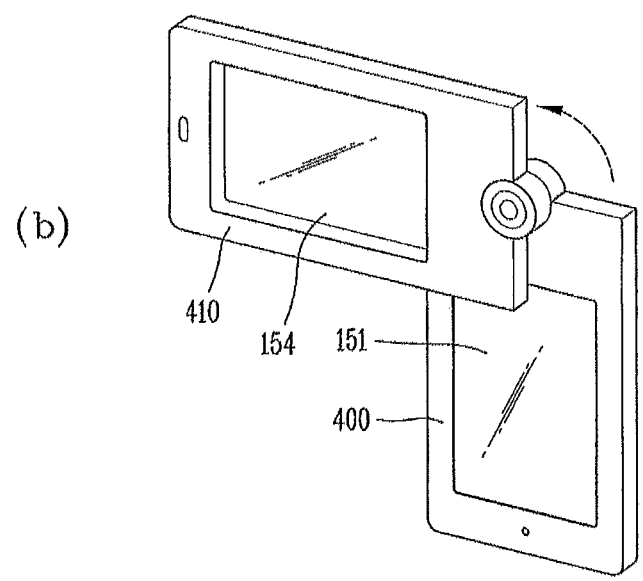
(b)

FIG. 13
(a) 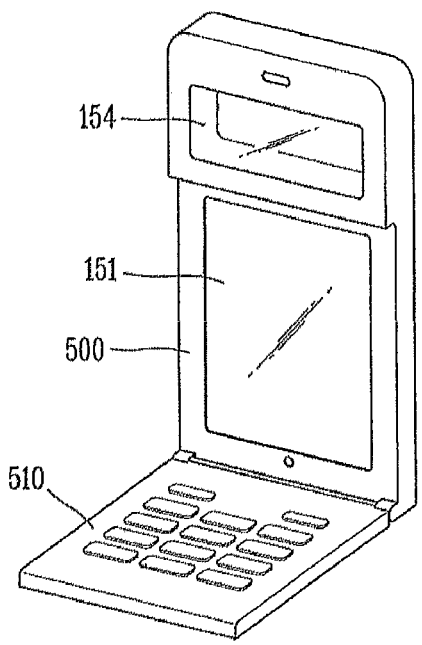
(b) 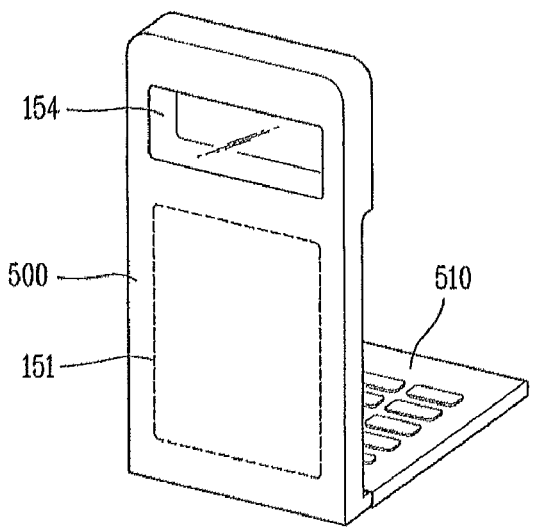

FIG. 14
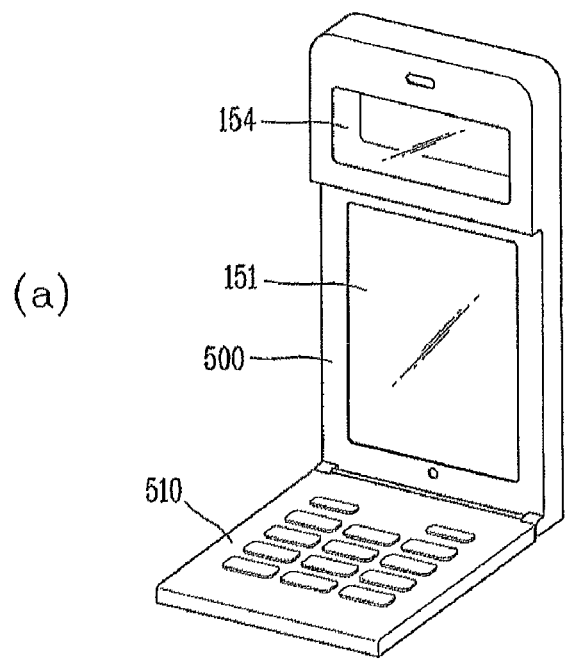
(a)
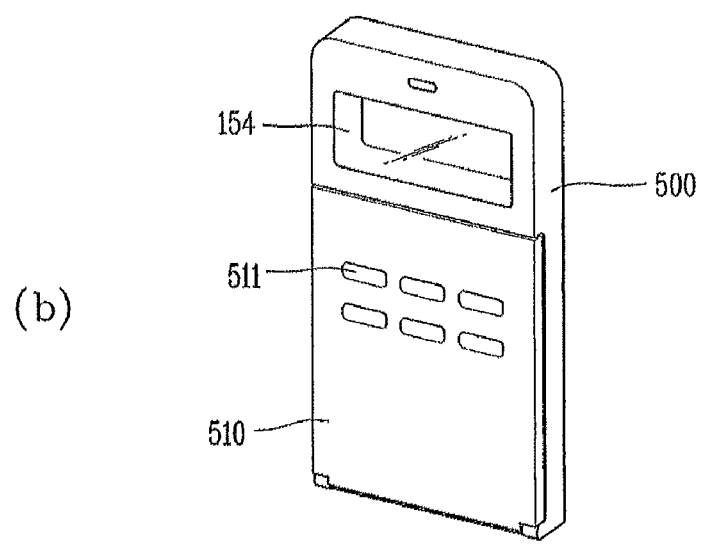
(b)

FIG. 15
(a)
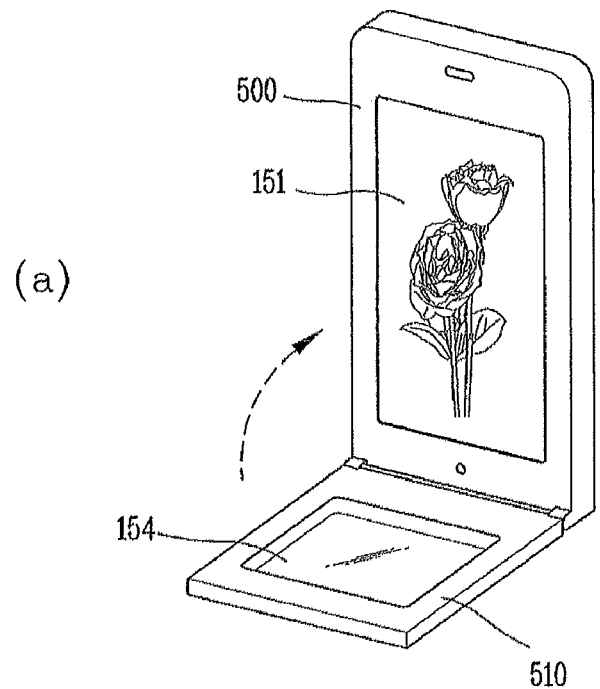
(b)
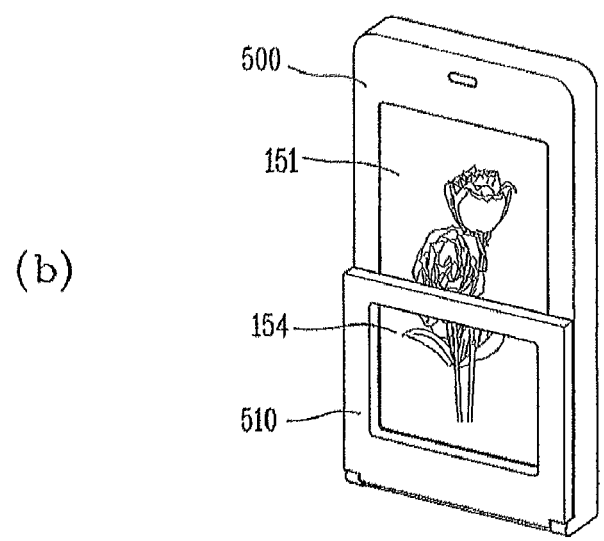

(a)　　　　　　　　(b)

FIG. 20
(a) 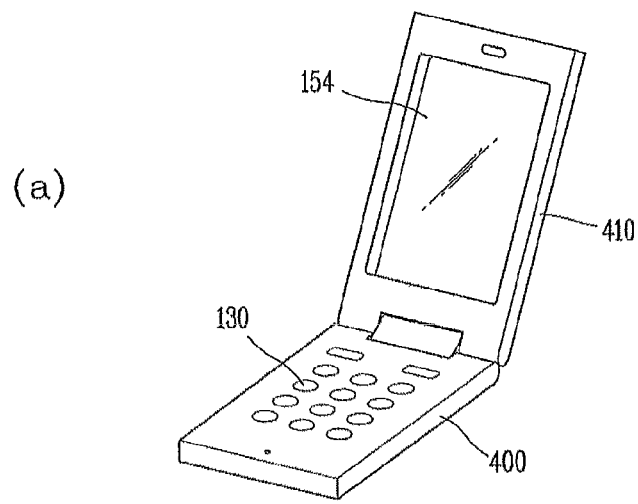
(b) 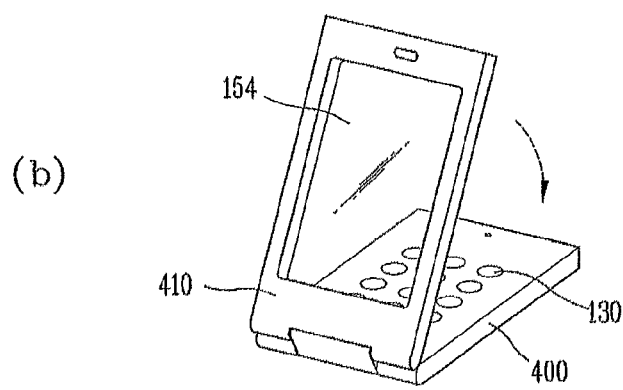
(c) 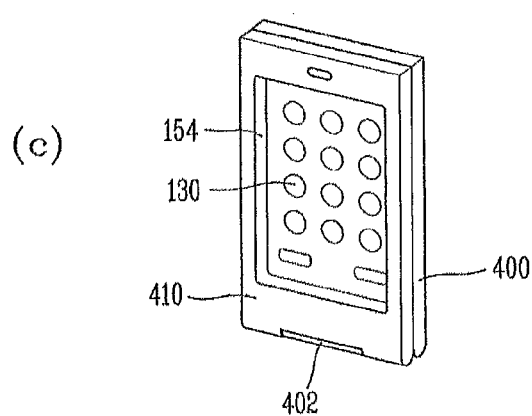

FIG. 21
(a) 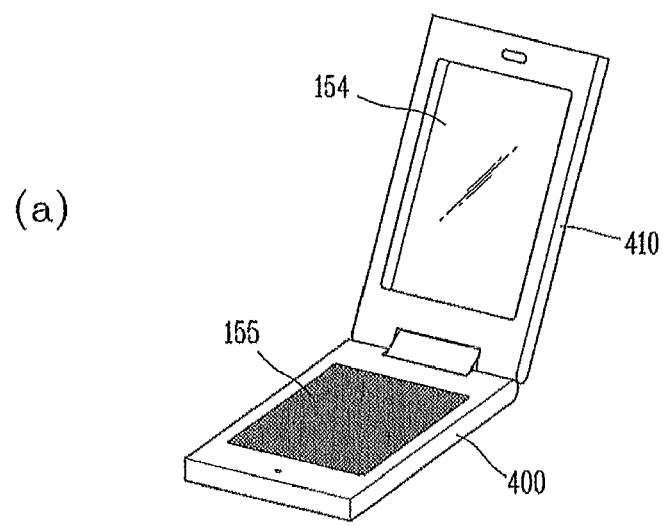
(b) 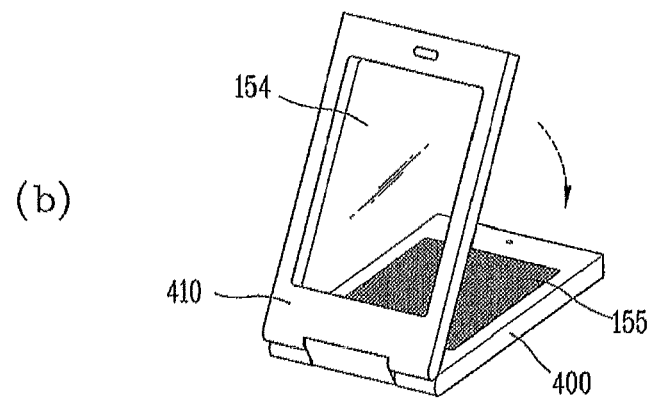
(c) 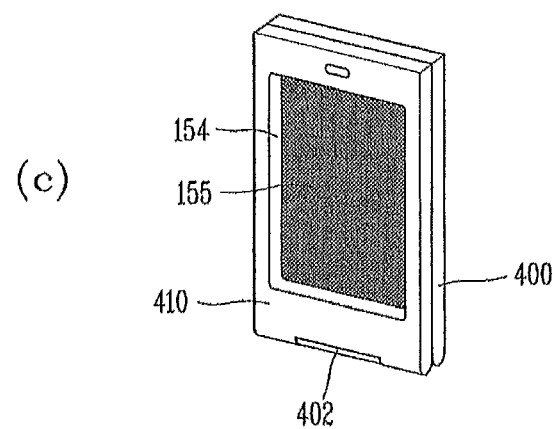

FIG. 22
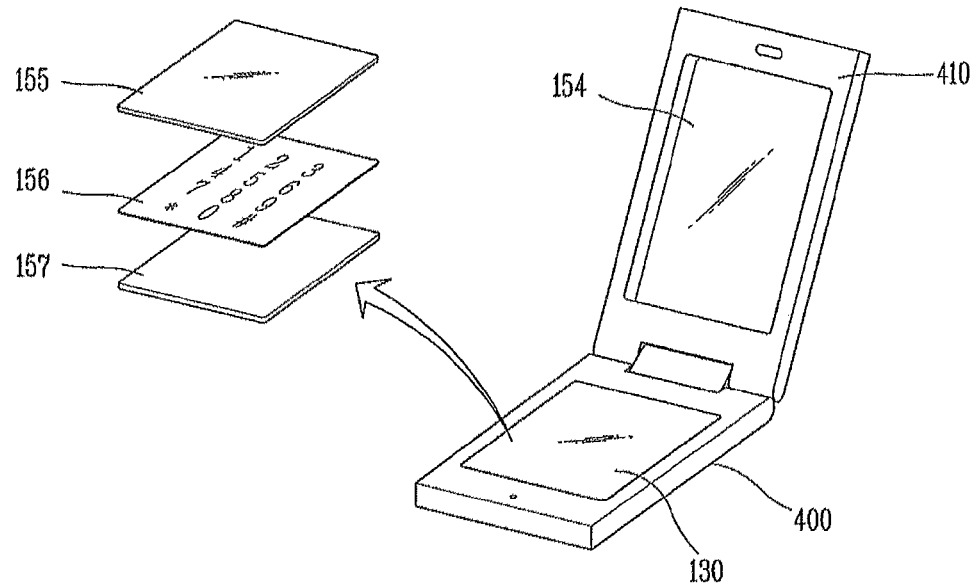
(a)
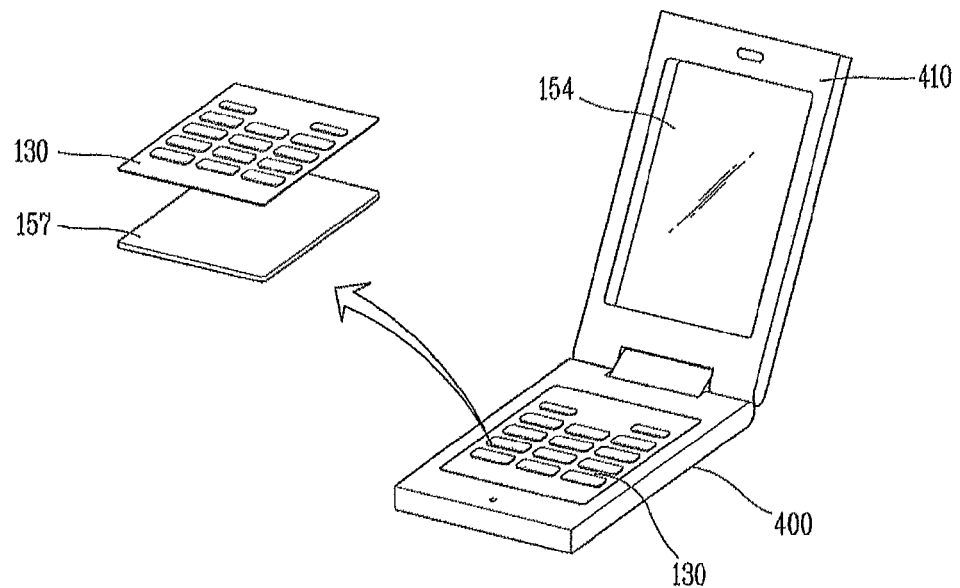
(b)

FIG. 23
(a)
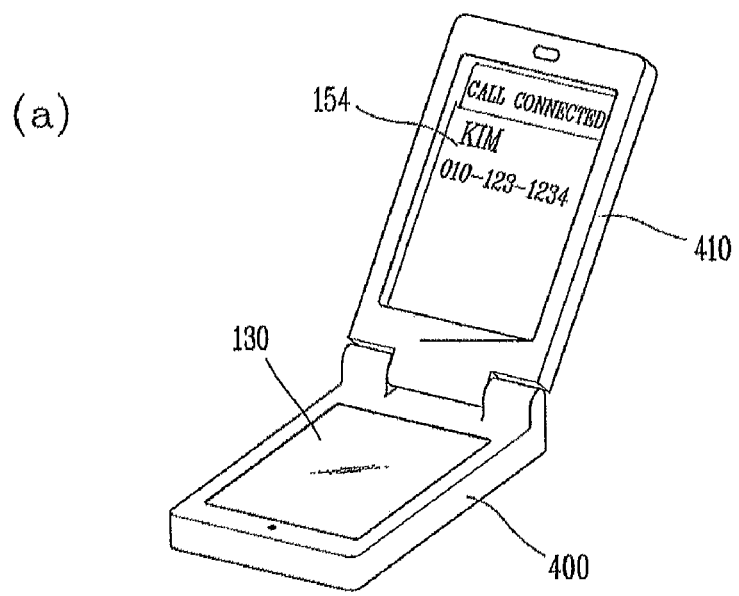
(b)
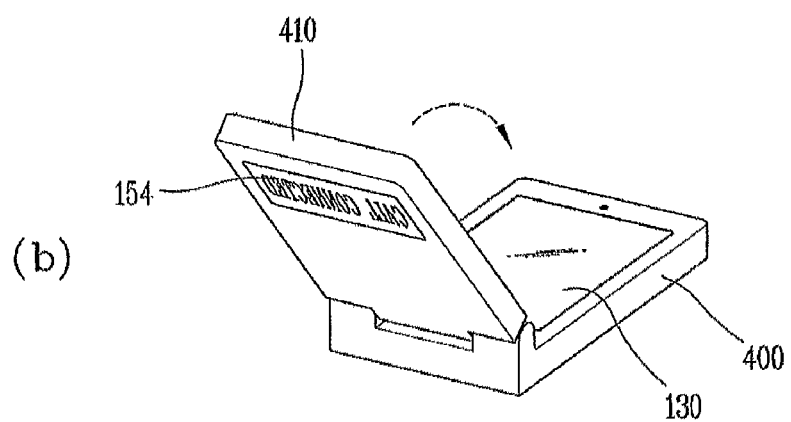

FIG. 24
(a) 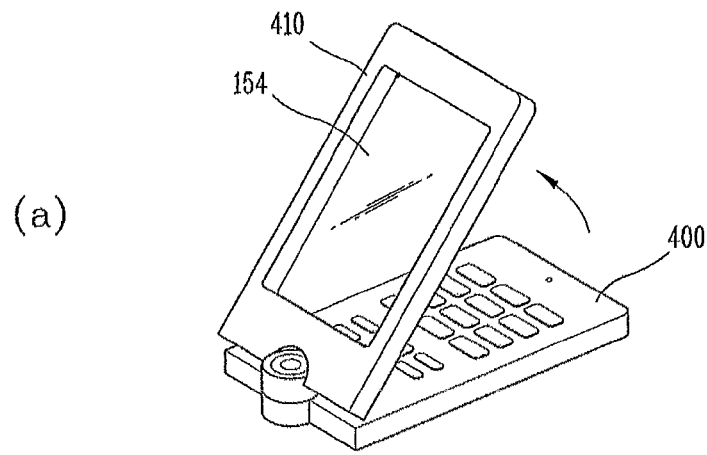
(b) 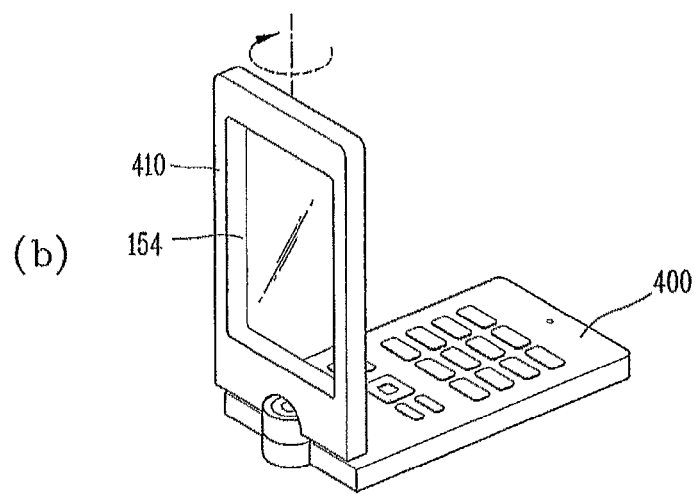
(c) 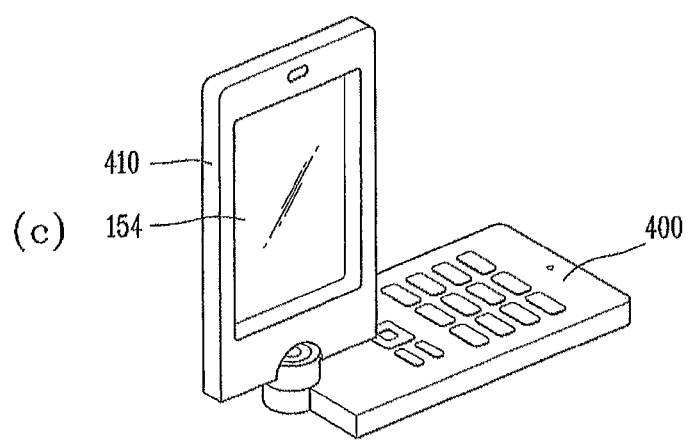

(a)　　　　　　　　(b)

(a)　　　　　　　　(b)

(a)　　　　　　　　(b)

FIG. 40
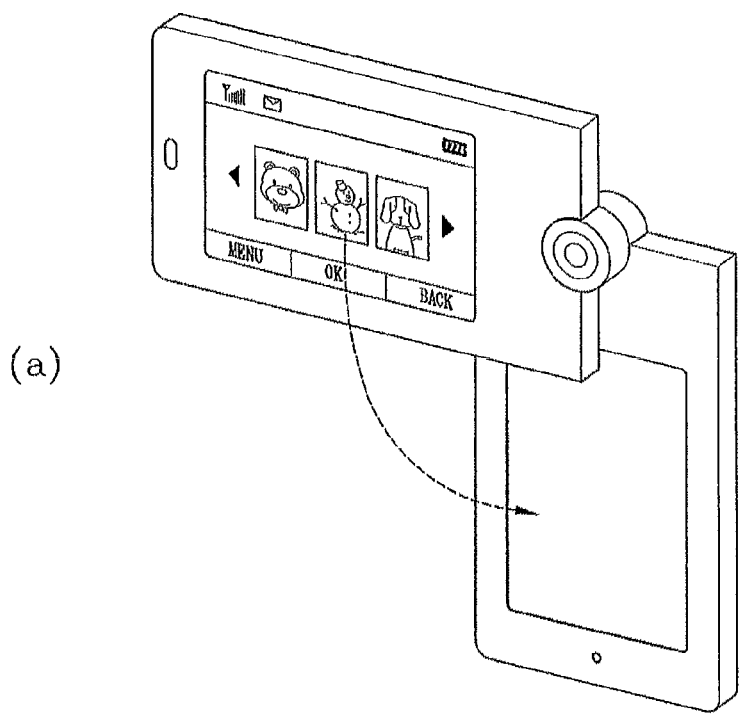
(a)
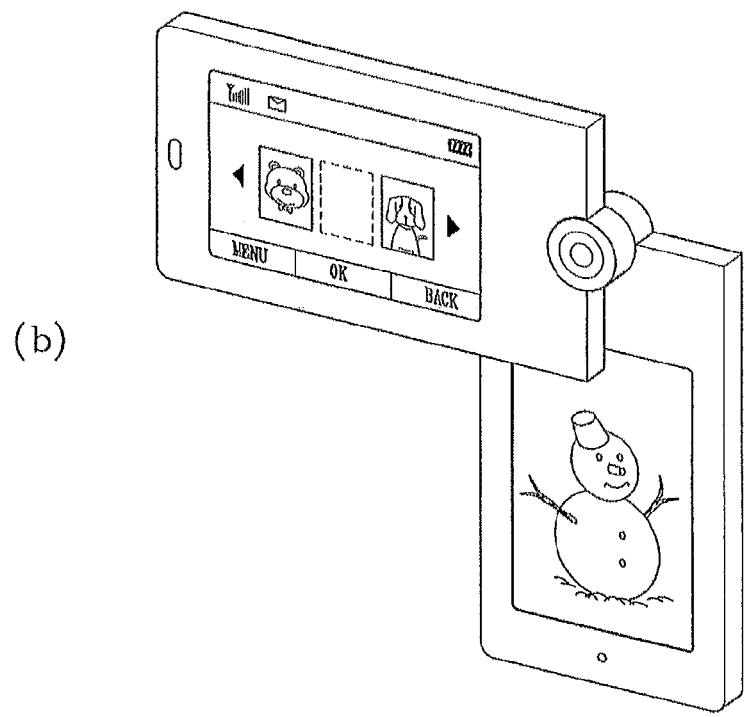
(b)

FIG. 41
(a) 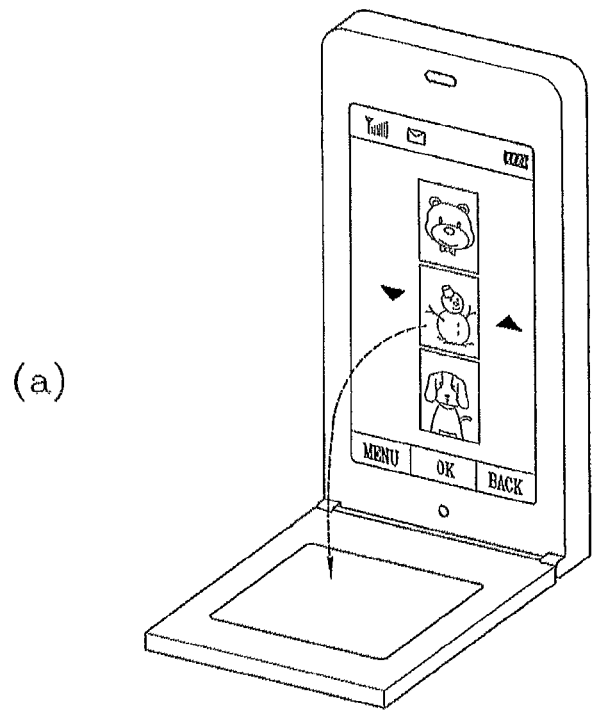
(b) 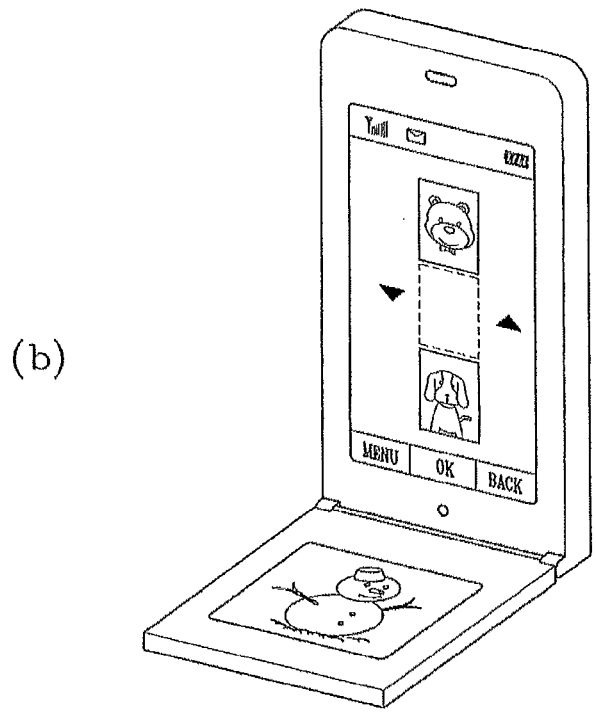

FIG. 42
(a) 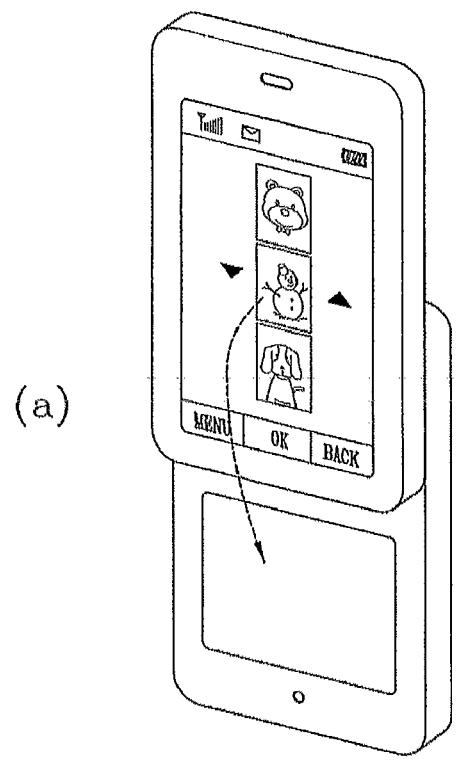
(b) 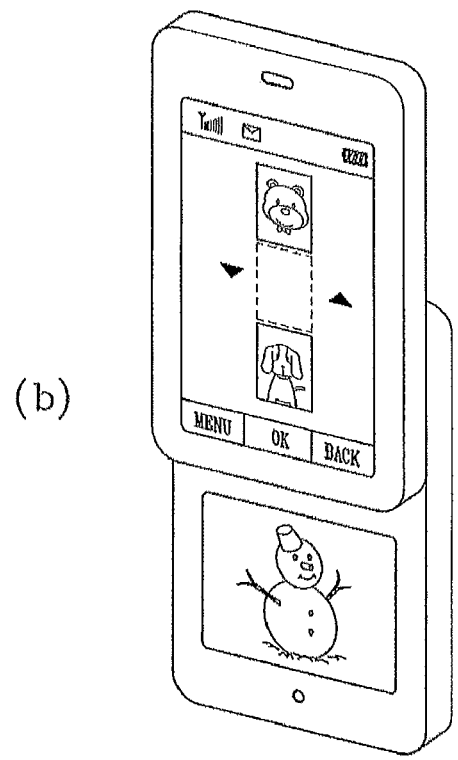

FIG. 43
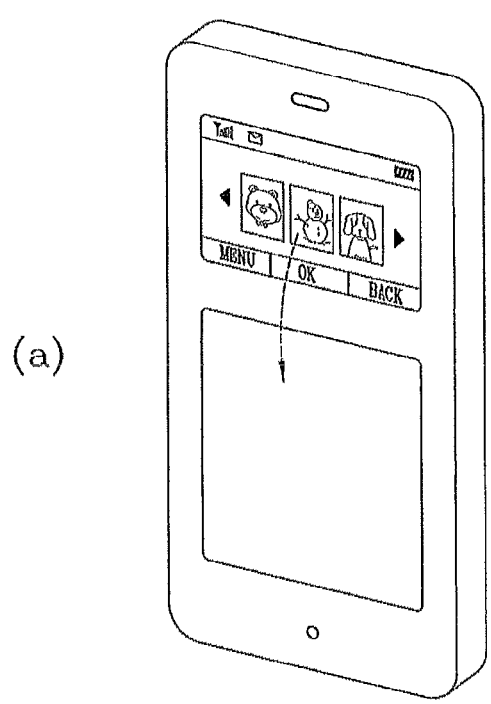
(a)
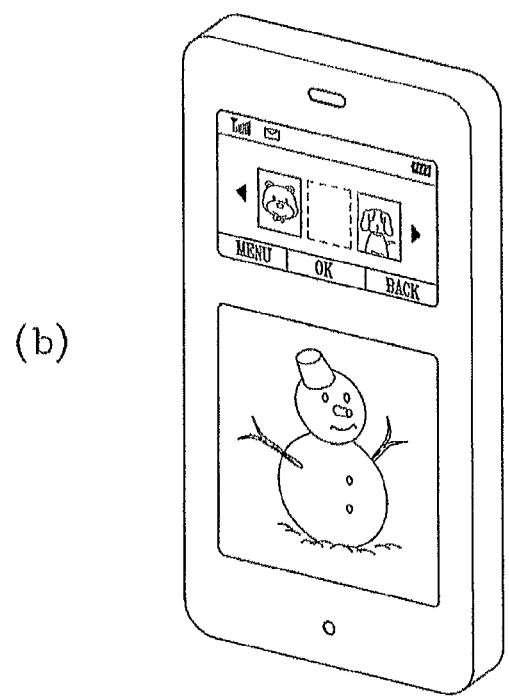
(b)

FIG. 44
(a) 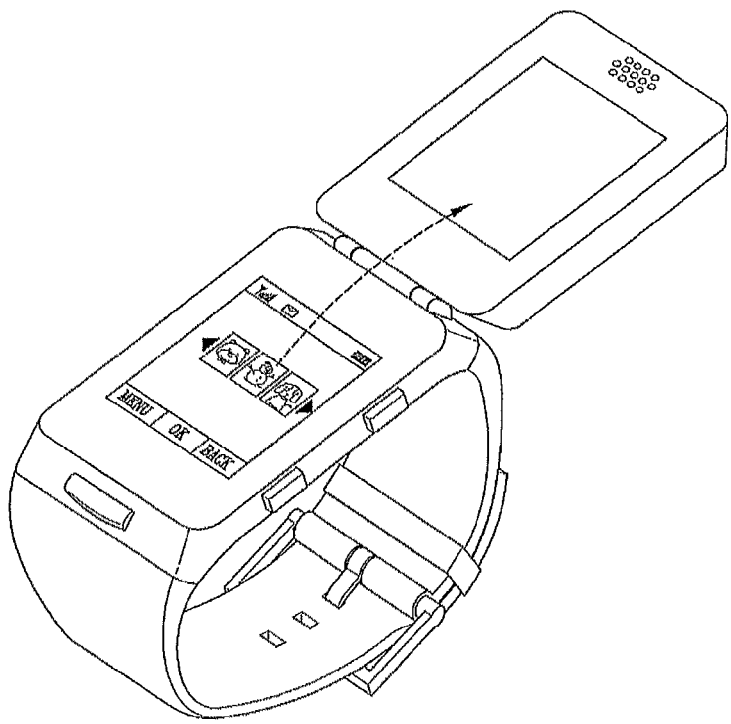
(b) 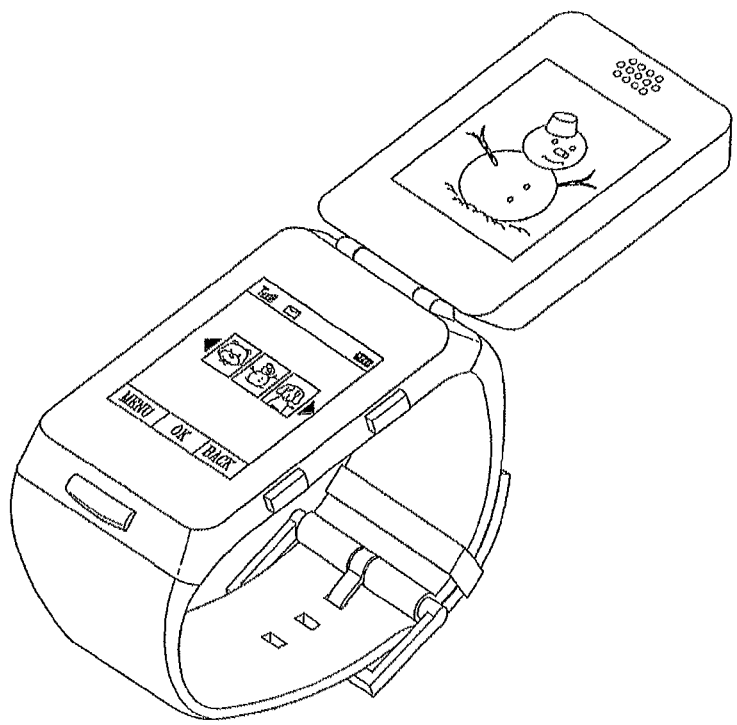

FIG. 45
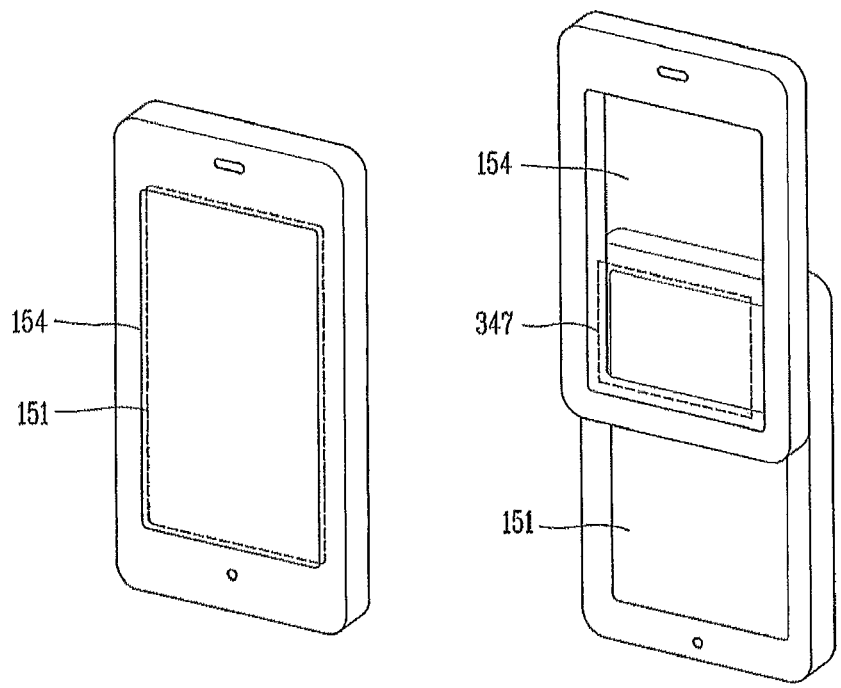
(a)   (b)
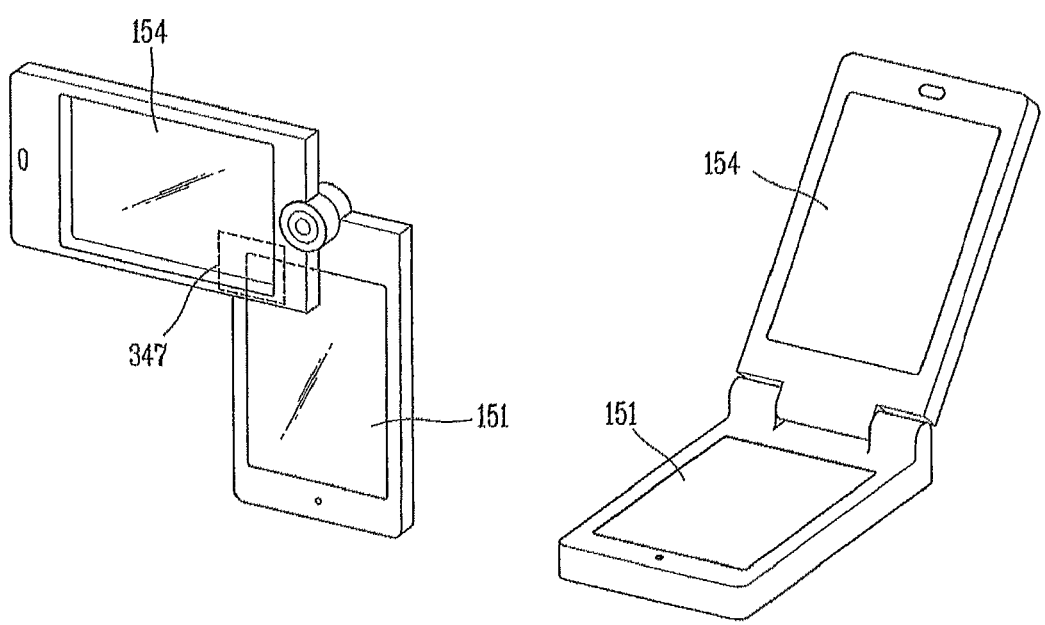
(c)   (d)

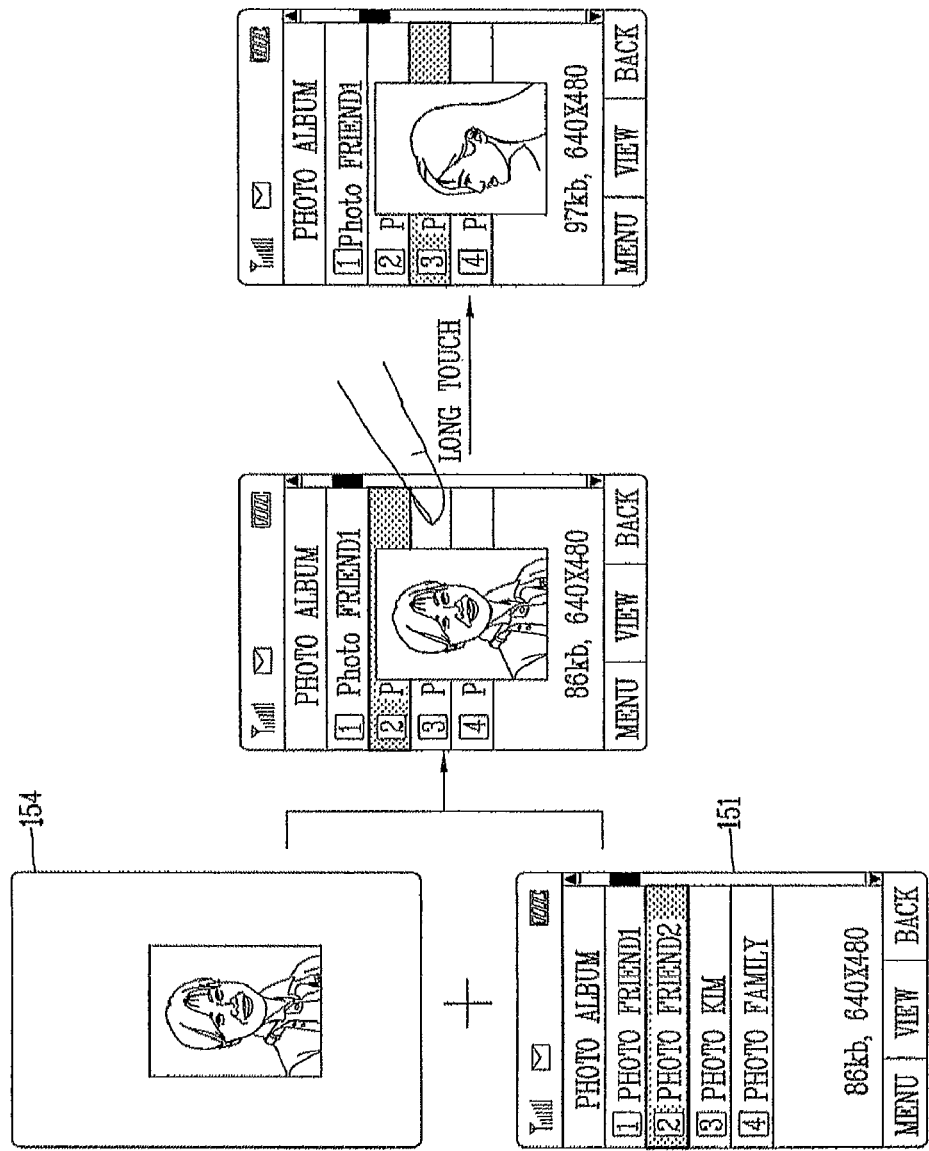

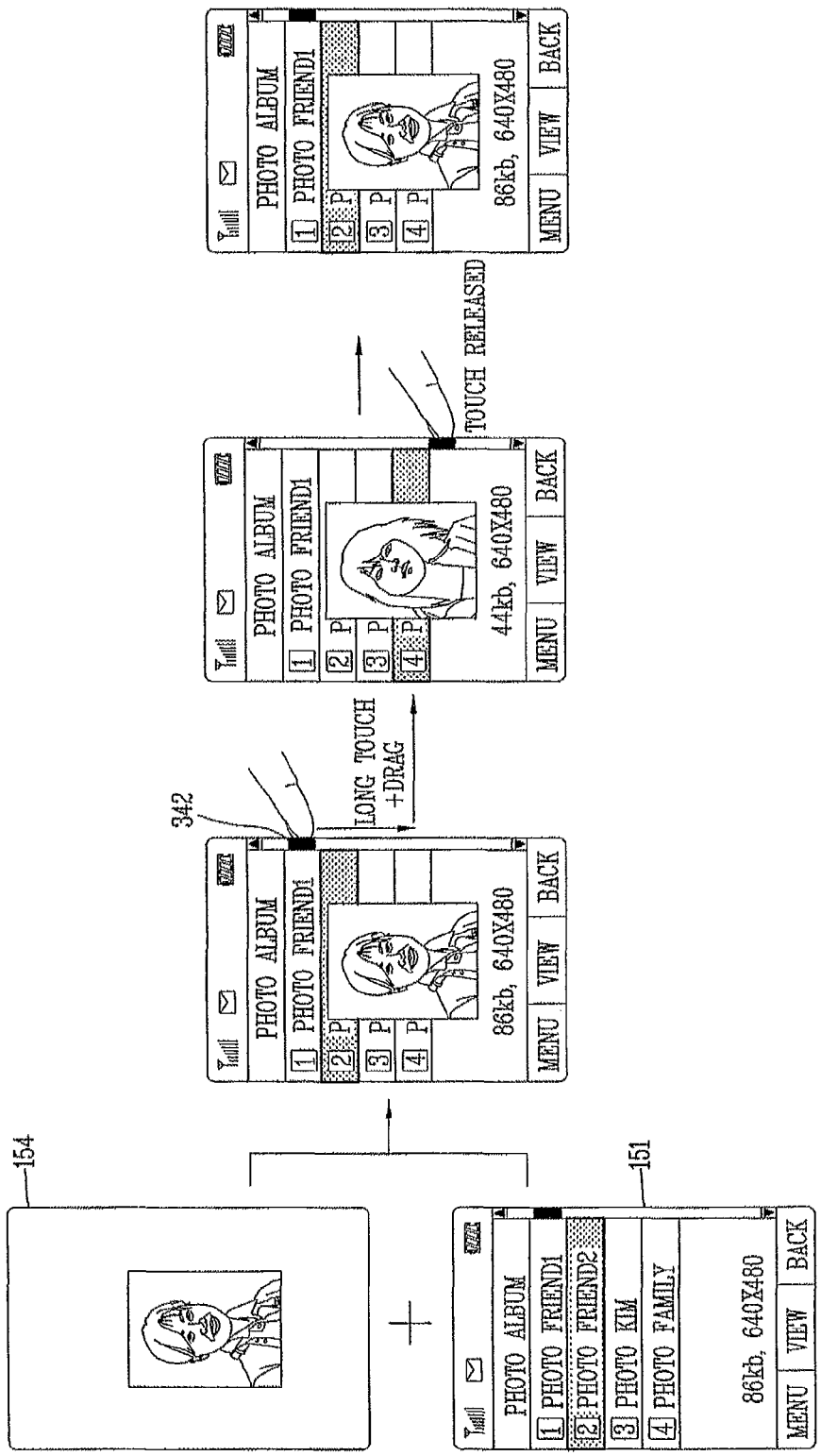

(a)  (b)

(a)　　　　　　　　　(b)

FIG. 56
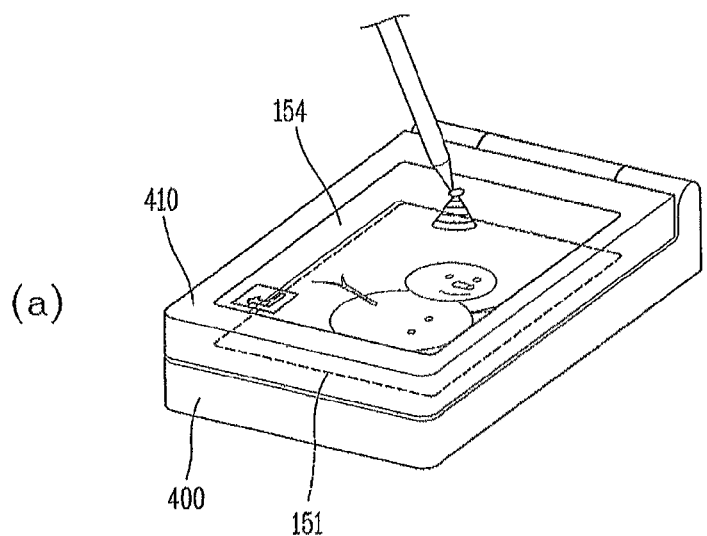
(a)
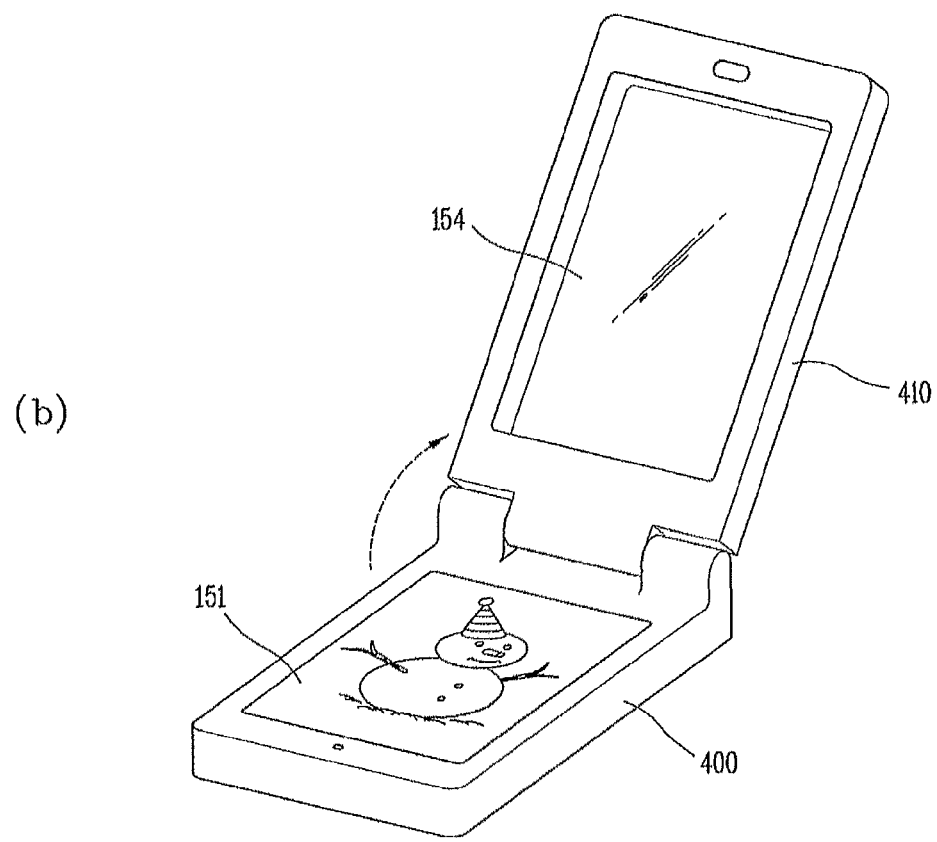
(b)

FIG. 67
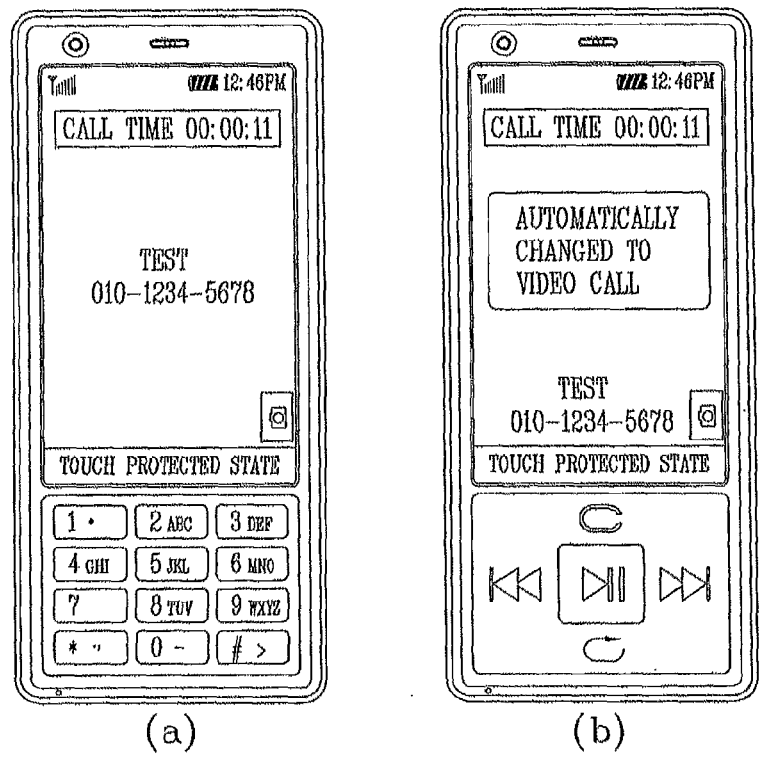
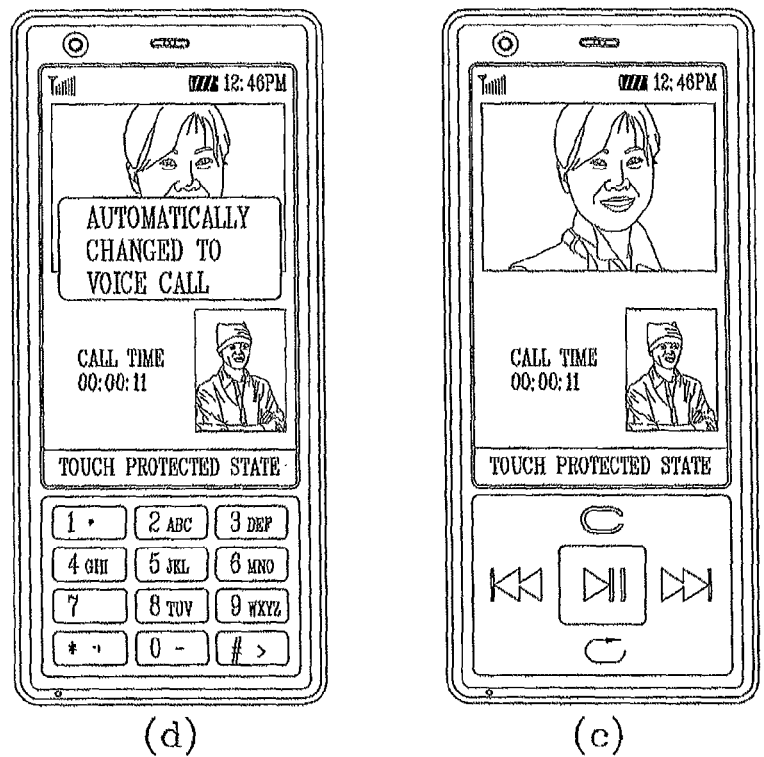

MOBILE TERMINAL AND TRANSPARENT DISPLAY CONTROL METHOD THEREOF

CROSS REFERENCE TO RELATED APPLICATIONS

The present application claims priority to Korean Application No. 10-2008-0050460 filed in Korea on May 29, 2008, and No. 10-2008-0054327 filed in Korea on Jun. 10, 2008, the entire contents of which both are hereby incorporated by reference in their entirety.

BACKGROUND OF THE INVENTION

1. Field of the Invention

The present invention relates to a mobile terminal and corresponding method for controlling a display direction of information on a transparent display according to the movement of the terminal and an external input.

2. Description of the Related Art

A mobile terminal is a device which may be configured to perform various functions. Examples of such functions include data and voice communications, capturing images and video via a camera, recording audio, playing music files via a speaker system, and displaying images and video on a display. Some terminals include additional functionality which supports game playing, while other terminals are configured as multimedia players. In addition, mobile terminals can also receive broadcast and multicast signals, which permit viewing of content such as videos and television programs.

Efforts are ongoing to support and increase the functionality of mobile terminals. Such efforts include software and hardware improvements, as well as changes and improvements in the structural components which form the mobile terminal. Lately, efforts to apply a transparent display to mobile terminals are being made.

SUMMARY OF THE INVENTION

Accordingly, one object of the present invention is to address drawbacks of the related art.

Another object of the present invention is to provide a mobile terminal and corresponding method for controlling a display direction of information in a transparent display according to a movement of the terminal and an external input.

Still another object of the present invention is to provide a mobile terminal and corresponding method for changing an operation mode according to a movement of the terminal and displaying a corresponding screen image.

Yet another object of the present invention is to provide a mobile terminal and corresponding method for changing a screen display process according to a movement of the terminal.

Another object of the present invention is to provide a mobile terminal and corresponding method for executing a particular function according to a movement of the terminal.

To achieve these and other advantages and in accordance with the purpose of the present invention, as embodied and broadly described herein, the present invention provides in one aspect a mobile terminal including a transparent display, a sensing unit operable to detect at least one of a movement of the terminal and an external input, and a controller operable to control the direction of an information display of the transparent display according to the detection result.

In another aspect, the present invention provides a mobile terminal including a transparent display configured to display information on both surfaces of the transparent display, a sensing unit configured to detect a movement of the terminal, and a controller configured to control the information displayed on said both surfaces of the transparent display based on the detected movement of the terminal.

In still another aspect, the present invention provides a method of controlling a mobile terminal, and which includes displaying information on both surfaces of a transparent display included with the mobile terminal, detecting a movement of the terminal, and controlling the information displayed on said both surfaces of the transparent display based on the detected movement of the terminal.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIG. 5 is an exemplary view of mobile terminals each having a single transparent display according to an embodiment of the present invention;

FIG. 6 is an overview of mobile terminals each having a dual transparent display according to an embodiment of the present invention;

FIGS. 7A and 7B are overviews of a folder-type mobile terminal having a dual transparent display according to an embodiment of the present invention, which shows a mobile terminal having variable directions to display information according the posture of the mobile terminal;

FIG. 8 is an overview of a folder-type mobile terminal having a dual transparent display according to an embodiment of the present invention, which shows a mobile terminal further having a keypad;

FIG. 9 is an overview of a mobile terminal having a dual transparent display according to an embodiment of the present invention, which shows a mobile terminal having a folder rotatable by 360°;

FIG. 10 is an overview of a mobile terminal having a dual transparent display according to an embodiment of the present invention, which shows a mobile terminal capable of photographing even in the state of the folder being closed;

FIG. 11 is a perspective view of a mobile terminal having a dual transparent display according to an embodiment of the present invention, which shows a mobile terminal capable of controlling a size of information output in cooperation with an opening/closing of a folder;

FIGS. 12A and 12B are overviews of a swivel-type mobile terminal having a dual transparent display according to an embodiment of the present invention;

FIG. 13 is an overview of a flip-type mobile terminal having a dual transparent display according to an embodiment of the present invention;

FIG. 14 is another overview of the flip-type mobile terminal of FIG. 13;

FIG. 15 is another overview of the flip-type mobile terminal of FIG. 13;

FIG. 20 is an overview of a folder-type mobile terminal having a single transparent display according to an embodiment of the present invention;

FIG. 21 is an overview showing a method for inputting information in a folder-type mobile terminal having a single transparent display according to an embodiment of the present invention;

FIG. 22 is an overview showing a configuration of a keypad for a folder-type mobile terminal having a single transparent display according to an embodiment of the present invention;

FIG. 23 is an overview of a folder-type mobile terminal having a transparent display according to an embodiment of the present invention, which shows a mobile terminal having a configuration in which information displayed on any one surface of the transparent display can be restricted;

FIG. 24 is an overview of a swivel-type mobile terminal having a single transparent display according to an embodiment of the present invention;

FIGS. 39 to 44 are overviews showing a method for controlling a display of a mobile terminal having a dual transparent display according to an embodiment of the present invention;

FIG. 45 is an overview of a mobile terminal having a dual transparent display according to an embodiment of the present invention, which shows a method for controlling displays according to an overlapped state between the displays;

FIGS. 46A to 46C are overviews showing a method for controlling a touching operation under the state that the displays of FIG. 45 are completely overlapped with each other according to an embodiment of the present invention;

FIG. 56 is an overview showing an operation related to the movement of a displayed object executed in cooperation with an open/closing operation of a mobile terminal having a dual transparent display according to an embodiment of the present invention;

FIGS. 66 to 68 are overviews showing an example of controlling a display direction of information on the transparent display of the mobile terminal according to an embodiment of the present invention.

DETAILED DESCRIPTION OF THE INVENTION

Reference will now be made in detail to the preferred embodiments of the present invention, examples of which are illustrated in the accompanying drawings.

A mobile terminal may be implemented using a variety of different types of terminals. Examples of such terminals include mobile phones, smart phones, notebook computers, digital broadcast terminals, Personal Digital Assistants (PDA), Portable Multimedia Players (PMP), navigators and the like.

Figure 1:
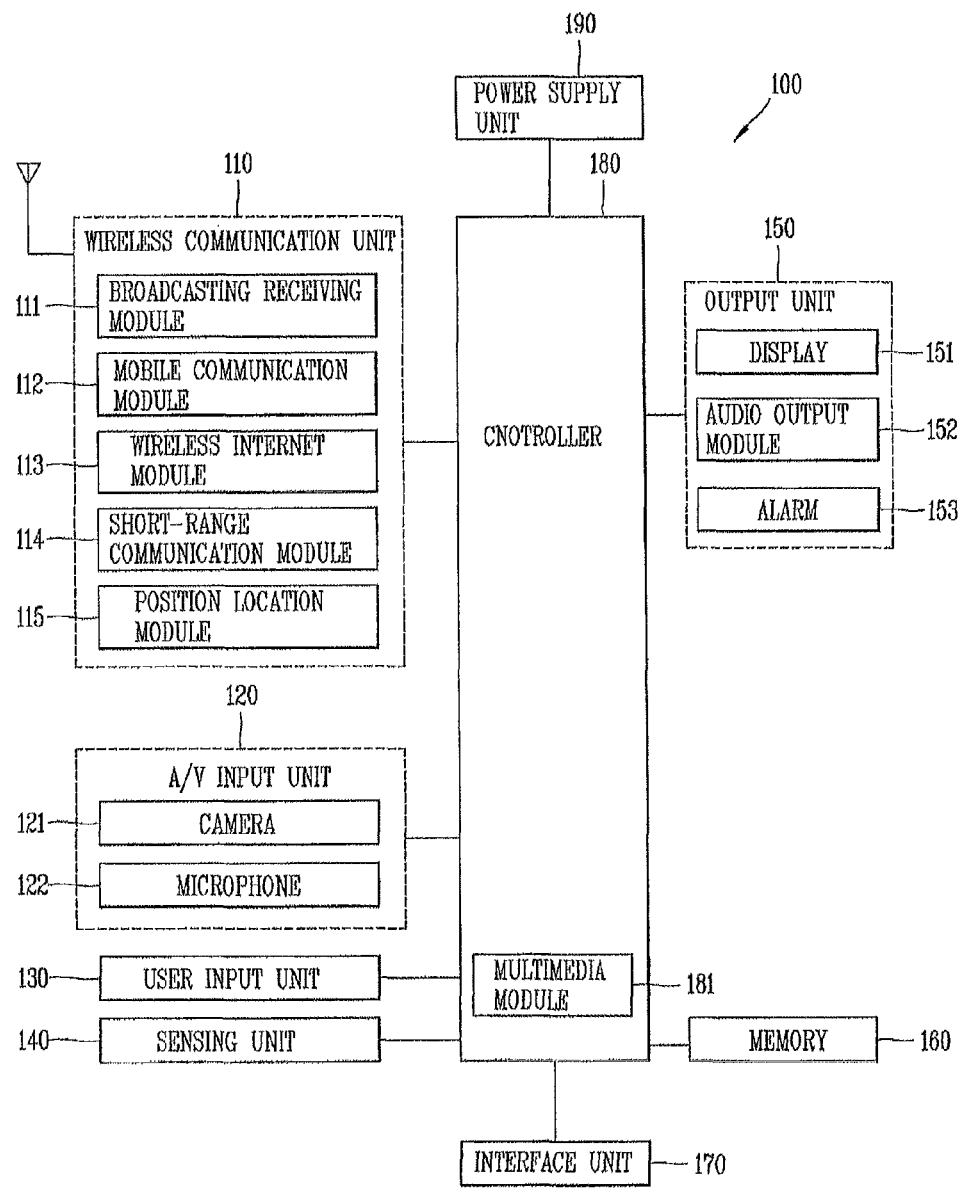
FIG. 1 is a schematic block diagram of a mobile terminal implementing an embodiment of the present invention.

FIG. 1 is a block diagram illustrating a mobile terminal according to one embodiment of the present invention. As shown, the mobile terminal 100 may include components such as a wireless communication unit 110, an Audio/Video (A/V) input unit 120, a user input unit 130, a sensing unit 140, an output unit 150, a memory 160, an interface unit 170, a controller 180, a power supply 190 and the like. Further, FIG. 1 shows the mobile terminal 100 having various components, but it is understood that implementing all of the illustrated components is not a requirement. Greater or fewer components may alternatively be implemented.

In addition, the wireless communication unit 110 may include one or more components which permit wireless communications between the mobile terminal 100 and a wireless communication system or between the mobile terminal 100 and a network within which the mobile terminal 100 is located. For example, the wireless communication unit 110 may include at least one of a broadcast receiving module 111, a mobile communication module 112, a wireless Internet module 113, a short-range communication module 114 and a position location module 115.

The broadcast receiving module 111 receives a broadcast signal and/or broadcast associated information from an external broadcast managing entity via a broadcast channel. The broadcast channel may include a satellite channel and a terrestrial channel. Further, the broadcast managing entity may indicate a server which generates and transmits a broadcast signal and/or broadcast associated information or a server which receives a pre-generated broadcast signal and/or broadcast associated information and sends them to the mobile terminal. Examples of broadcast associated information may include information associated with a broadcast channel, a broadcast program, a broadcast service provider, and the like.

The broadcast signal may be implemented as a TV broadcast signal, a radio broadcast signal, and a data broadcast signal, among others. The broadcast signal may further include a data broadcast signal combined with a TV or radio broadcast signal. Also, the broadcast associated information may be provided via a mobile communication network, and received by the mobile communication module 112. In addition, the broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include the Digital Multimedia Broadcasting-Terrestrial (DMB-T) system, the Digital Multimedia Broadcasting-Satellite (DMB-S) system, the Media Forward Link Only (MediaFLO) system, the Digital Video Broadcast-Handheld (DVB-H) system, the Integrated Services Digital Broadcast-Terrestrial (ISDB-T) system, and the like. The broadcast receiving module 111 may be configured to be suitable for all broadcast system transmitting broadcast signals as well as the digital broadcasting systems. Broadcast signals and/or broadcast associated information received via the broadcast receiving module 111 may also be stored in a suitable device, such as a memory 160.

Further, the mobile communication module 112 transmits/receives wireless signals to/from at least one of network entities (e.g., base station, an external mobile terminal, a server, etc.) on a mobile communication network. In addition, the wireless signals may include audio call signal, video call signal, or various formats of data according to transmission/reception of text/multimedia messages. Also, the wireless Internet module 113 supports wireless Internet access for the mobile terminal, and may be internally or externally coupled to the mobile terminal. Examples of such wireless Internet access may include Wireless LAN (WLAN) (Wi-Fi), Wireless Broadband (Wibro), World Interoperability for Microwave Access (Wimax), High Speed Downlink Packet Access (HSDPA), and the like.

Further, the short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, and the like. The position location module 115 denotes a module for detecting or calculating a position of a mobile terminal. An example of the position location module 115 may include a Global Position System (GPS) module.

In addition, the GPS module may receive position information in cooperation with associated multiple satellites. Further, the position information may include coordinates information represented by latitude and longitude. For example, the GPS module can measure accurate time and distance respectively from more than three satellites so as to accurately calculate a current position of the mobile terminal based on such three different distances according to a triangulation scheme. A scheme may be used to obtain time information and distance information from three satellites and correct error by one satellite. Specifically, the GPS module can further obtain three-dimensional speed information and an accurate time, as well as position on latitude, longitude and altitude, from the position information received from the satellites.

In addition, the A/V input unit 120 is configured to provide audio or video signal input to the mobile terminal. The A/V input unit 120 may include a camera 121 and a microphone 122. Further, the camera 121 receives and processes image frames of still pictures or video obtained by image sensors in a video call mode or a capturing mode. The processed image frames may then be displayed on a display 151.

Also, the image frames processed by the camera 121 may be stored in the memory 160 or transmitted to the exterior via the wireless communication unit 110. Two or more cameras 121 may be provided according to the configuration of the mobile terminal. The microphone 122 may receive an external audio signal via a microphone while the mobile terminal is in a particular mode, such as a phone call mode, a recording mode, a voice recognition mode, or the like. This audio signal is processed into digital data, and the processed digital data is converted for output into a format transmittable to a mobile communication base station via the mobile communication module 112 for the phone call mode. The microphone 122 may also include assorted noise removing algorithms to remove noise generated in the course of receiving the external audio signal.

In addition, the user input unit 130 may generate input data input by a user to control the operation of the mobile terminal. The user input unit 130 may include a keypad, a dome switch, a touchpad (e.g., static pressure/capacitance), a jog wheel, a jog switch and the like. A specific example can be one in which the touchpad is layered with the display 151 to be explained later so as to be in cooperation with the display 151, which is referred to as a touch screen. Further, the sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100.

For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device. Here, the sensing unit 140 may include a proximity sensor.

In addition, the interface unit 170 is generally implemented to couple the mobile terminal to external devices. The interface unit 170 may include, for example, wired/wireless headset ports, external charger ports, wired/wireless data ports, memory card ports, ports for coupling devices having an identification module, etc.), audio Input/Output (I/O) ports, video I/O ports, earphone ports, and the like. The identification module may be configured as a chip for storing various information required to authenticate an authority to use the mobile terminal 100, which may include a User Identity Module (UIM), a Subscriber Identity Module (SIM), a Universal Subscriber Identity Module (USIM), and the like. Also, the device having the identification module (hereinafter, referred to as 'identification device') may be implemented in a type of smart card. Hence, the identification device can be coupled to the mobile terminal 100 via a port.

In addition, the interface unit 170 may receive data from an external device, or be provided with power and accordingly transfer the received data or power to each component within the mobile terminal 100 or transfer data of the mobile terminal 100 to an external device. Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals and power inputted from the cradle may operate as a signal for recognizing that the mobile terminal 100 has accurately been mounted to the cradle.

The output unit 150 is configured to output an audio signal, a video signal or an alarm signal, and may include the display 151, an audio output module 152, an alarm 153, and the like. Further, the display 151 may output information processed in the mobile terminal 100. For example, when the mobile terminal is operating in a phone call mode, the display 151 provides a User Interface (UI) or a Graphic User Interface (GUI) which includes information associated with the call. As another example, if the mobile terminal is in a video call mode or a capturing mode, the display 151 may additionally or alternatively display images captured and/or received, UI, or GUI.

Meanwhile, as mentioned above, a touch screen can be configured as the display 151 and the touchpad are layered with each other to work in cooperation with each other. This configuration permits the display 151 to function both as an input device and an output device. The display 151 may be implemented using, for example, a Liquid Crystal Display (LCD), a Thin Film Transistor-Liquid Crystal Display (TFT-LCD), an Organic Light-Emitting Diode (OLED), a flexible display, a three-dimensional (3D) display, or the like.

Some of the displays according to embodiments of the present invention can be configured to be transparent such that it is possible to see the exterior therethrough. These displays may be called transparent displays. A representative example of the transparent display may include a Transparent Organic Light Emitting Diode (TOLED), and the like. Further, the mobile terminal 100 may include two or more of such displays 151. For example, the mobile terminal 100 may simultaneously include an external display (not shown) and an internal display (not shown).

Further, the audio output module 152 may output audio data which is received from the wireless communication unit 110 in various modes including a call-receiving mode, call-placing mode, recording mode, voice recognition mode, broadcast reception mode, and the like, or audio data stored in the memory 160. Also, the audio output module 152 may output an audio signal relating to a particular function (e.g., call received, message received, etc.) performed in the mobile terminal 100. The audio output module 152 may be implemented using a speaker, a buzzer, or the like.

In addition, the alarm 153 may output a signal to inform a generation of event associated with the mobile terminal 100. Alarm events may include a call received, message received, user input received and the like. In addition to generating the audio or video signal, the alarm 153 may also inform the event generation in different manners, for example, by providing tactile sensations (e.g., vibration) to a user. The alarm 153 may also be configured to vibrate responsive to the mobile terminal receiving a call or message. As another example, vibration is provided by the alarm 153 responsive to receiving user input at the mobile terminal, thus providing a tactile feedback mechanism. Such vibration can also be provided to make a user recognize the event generation. The signal informing the event generation may be output via the display 151 or the audio output module 152.

Further, the memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio outputted upon the touch input on the touch screen. In addition, the memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, optical disk, and the like. Also, the mobile terminal 100 may operate a web storage which performs the storage function of the memory 160 on the Internet.

In addition, the controller 180 generally controls the overall operations of the mobile terminal. For example, the controller 180 performs the control and processing associated with voice calls, data communications, video calls, and the like. The controller 180 may also include a multimedia module 181 which provides multimedia playback. The multimedia module 181 may be configured as part of the controller 180 or as a separate component. The controller 180 can also perform a pattern recognition processing so as to recognize writing or drawing input on the touch screen as text or image. Further, the power supply 190 provides power required by various components under the control of the controller 180. The provided power may be internal power, external power, or combination thereof.

Various embodiments described herein may be implemented in a computer-readable medium using, for example, software, hardware, or some combination thereof. For a hardware implementation, the embodiments described herein may be implemented within one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

The internal components of the mobile terminal related to an embodiment of the present invention have been described from the perspective of their functions. Hereinafter, external components of the mobile terminal related to an embodiment of the present invention will be described from the perspective of their functions with reference to FIGS. 2 and 3. Further, the mobile terminal may be implemented in a variety of different configurations. Examples of such configurations include a folder type, slide type, bar type, rotating type, swing type or the like. The present description in FIGS. 2 and 3 relates to a slide-type mobile terminal, but the present invention is not limited to the slide-type mobile terminal, and can be applied to other types of terminals including the above-mentioned types of terminals.

Figure 2:
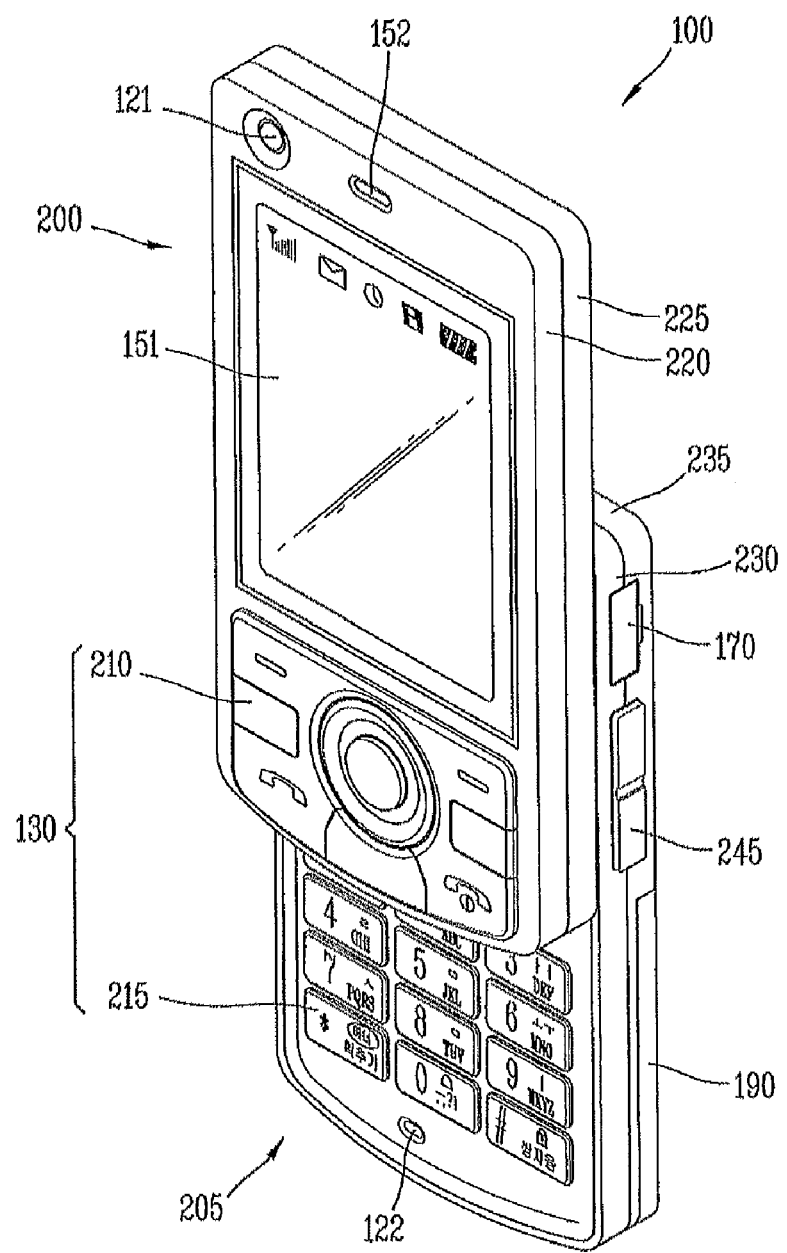
FIG. 2 is a front perspective view of a mobile terminal implementing an embodiment of the present invention.

FIG. 2 is a front perspective view of a mobile terminal according to an embodiment of the present invention. As shown, the mobile terminal 100 includes a first body 200, and a second body 205 configured to slidably cooperate with the first body 200 in at least one direction. For a folder-type mobile terminal, the mobile terminal 100 may include the first body 200, and the second body 205 configured to have at least one side folded or unfolded with respect to the first body 200.

Also, the first body 200 is positioned over the second body 205 in a manner that the second body 205 is obscured by the first body 200. This state can be referred to as a closed configuration (position). As illustrated in FIG. 2, the state where the first body 200 exposes at least part of the second body 205 can be referred to as an open configuration (position). In addition, when the mobile terminal is a folder-type mobile terminal including a first body and a second body having one side folded or unfolded with respect to the first body, the folded state of the second body can be referred to as the closed configuration, whereas the unfolded state of the second body can be referred to as the open configuration.

In addition, when the mobile terminal is a swing-type mobile terminal including a first body and a second body capable of being swung with respect to the first body, the state that the first body is overlapped with the second body can be referred to as the closed configuration whereas the state that the second body is swung thus to make the first body partially exposed can be referred to as the open configuration. Also, even though a specific description is not given of the folder-type mobile terminal and the swing-type mobile terminal with respect to FIGS. 2 and 3, it can be easily understood by those skilled in the art and thus a detailed description thereof will not be repeated.

In addition, the mobile terminal may be operable in a standby (idle) mode when in the closed configuration, but this mode can be released by the user's manipulation. Also, the mobile terminal may be operable in an active (phone call) mode in the open configuration. This mode may also be changed into the idle mode according to the user's manipulation or after a certain time elapses. As shown in FIG. 2, a case (housing, casing, cover, etc.) forming the outside of the first body 200 is formed by a first front case 220 and a first rear case 225. In addition, various electronic components may be disposed in a space between the first front case 220 and the first rear case 225. One or more intermediate cases may additionally be disposed between the first front case 220 and the first rear case 225.

Further, the cases can be formed of resin in a manner of injection molding, or formed using metallic materials such as stainless steel (STS) and titanium (Ti). Also, a display 151, an audio output module 152, a camera 121 or a first user input unit 210 may be disposed at the first front case 220 of the first body 200. In addition, the display 151 may include LCD, OLED, and the like, which can visibly display information. The display 151 and a touchpad can also be layered with each other such that the display 151 can be configured to function as a touch screen so as to allow a user to input information in a touching manner.

Further, the audio output module 152 may be implemented as a speaker, and the camera 121 may be implemented to be suitable for a user to capture still images or video. In addition, like the first body 200, a case configuring the outside of the second body 205 may be formed by a second front case 230 and a second rear case 235. Also, the second user input unit 215 may be disposed at the second body 205, and in more detail, at a front face of the second front case 230. A third user input unit 245, a microphone 122 and an interface unit 170 may also be disposed either at the second front case 230 or at the second rear case 235.

Further, the first to third user input units 210, 215 and 245 may be referred to as a user input unit 130. Any tactile manner that a user can touch, e.g., the display 151, for manipulation can be employed for the user input unit 130. For example, the user input unit 130 can be implemented as a dome switch or touchpad which a user can input information in a pushing or touching manner, or implemented in a manner of using a wheel, a jog or a joystick to rotate keys.

Regarding each function, the first user input unit 210 can be used for inputting commands such as START, END, SCROLL or the like, and the second user input unit 215 can be used for inputting numbers, characters, symbols, or the like. The first user input unit 210 may also include so-called soft keys used in cooperation with icons displayed on the display module 151, and navigation keys (usually composed of four navigation keys and a central key) for indicating and confirming an orientation. Also, the third user input unit 245 can be operated as a hot key for activating a specific function within the mobile terminal, and the microphone 122 may be implemented to be suitable for receiving user's voice or various sounds.

In addition, the interface unit 170 may be used as a passage through which the terminal related to the present invention can exchange data or the like with an external device. For example, the interface unit 170 may be implemented as one of a wired/wireless connection port for connecting an earphone to the mobile terminal, a port for short-range communications (e.g., an Infrared Data Association (IrDA) port, a BLUE-TOOTH port, a wireless LAN port, etc.), power supply ports for providing power to the mobile terminal, or the like.

The interface unit 170 can be a card socket for receiving an external card, such as a Subscriber Identity Module (SIM), a User Identity Module (UIM), a memory card for storing information, or the like. The power supply 190 may be disposed at a side of the second rear case 235 to provide power to the mobile terminal, and may be a rechargeable battery, for example, to be attachable/detachable for charging.

Figure 3:
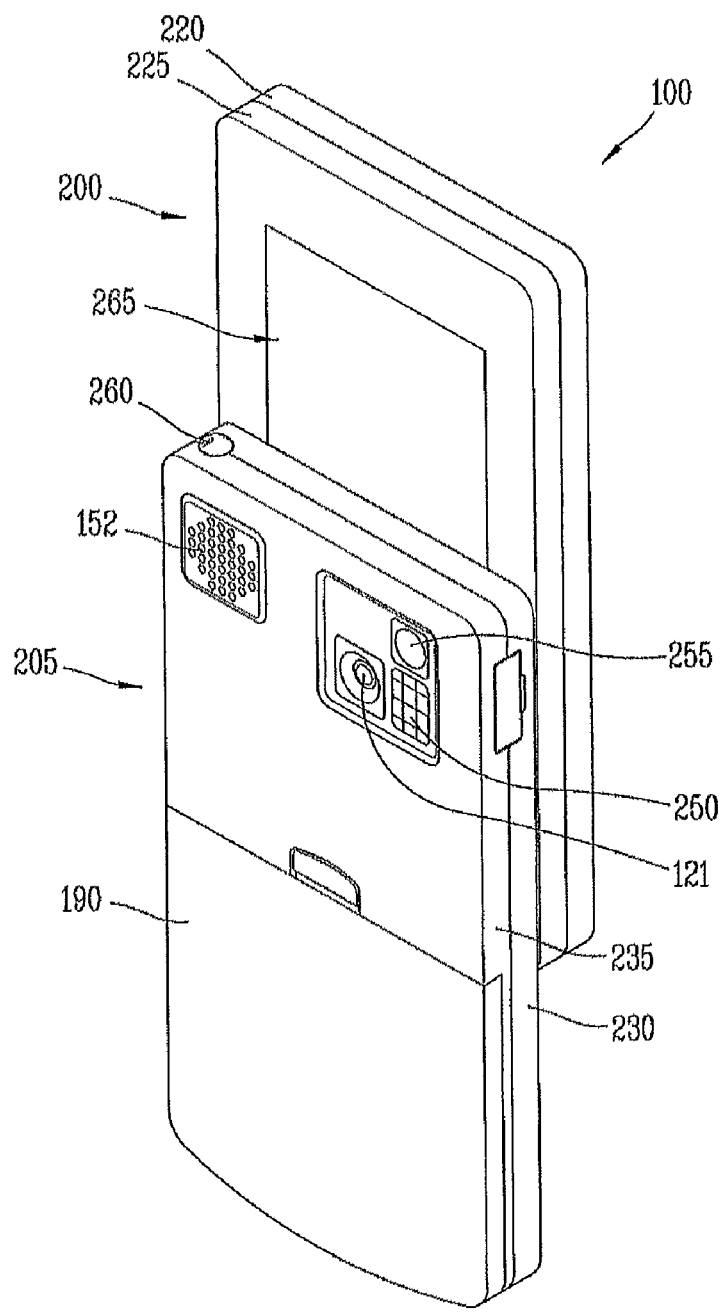
FIG. 3 is a rear perspective view of a mobile terminal implementing an embodiment of the present invention.

Next, FIG. 3 is a rear perspective view of the mobile terminal according to an embodiment of the present invention. As illustrated in FIG. 3, a camera 121 may further be disposed at a rear face of the second rear case 235 of the second body 205. In addition, the camera 121 of the second body 205 faces a direction which is opposite to a direction faced by the camera 121 of the first body 200, and may have different pixels from those of the camera 121 of the first body 200.

For example, the camera 121 of the first body 200 may operate with relatively lower pixels (lower resolution). Thus, the camera 121 of the first body 200 may be useful when a user can capture his face and send it to another party during a video call or the like. On the other hand, the camera 121 of the second body 205 may operate with a relatively higher pixels (higher resolution) such that it can be useful for a user to obtain higher quality pictures for later use. Also, a flash 250 and a mirror 255 may additionally be disposed adjacent to the camera 121 of the second body 205. The flash 250 operates in conjunction with the camera 121 of the second body 205 when taking a picture using the camera 121 of the second body 205. In addition, the mirror 255 can cooperate with the camera 121 of the second body 205 to allow a user to photograph himself in a self-portrait mode.

The second rear case 235 may further include an audio output module 152. Also, the audio output module 152 of the second body 205 can cooperate with the audio output module 152 of the first body 200 to provide stereo output. In addition, the audio output module 152 may be configured to operate as a speakerphone. A broadcast signal receiving antenna 260 may also be disposed at one side of the second rear case 235, in addition to an antenna for communications. The antenna 260 can be configured to retract into the second body 205. One part of a slide module 265 which allows the first body 200 to be slidably coupled to the second body 205 may be disposed at the first rear case 225 of the first body 200.

Further, the other part of the slide module 265 may be disposed at the second front case 230 of the second body 205, such that it may not be exposed to the exterior as illustrated in the drawing of the present invention. As such, it has been described that the camera 121 is disposed at the second body 205; however, the present invention may not be limited to the configuration. For example, it is also possible that one or more of those components (e.g., 260, 121~250, 152, etc.), which have been described to be implemented on the second rear case 235, such as the camera 121, will be implemented on the first body 200, particularly, on the first rear case 225. In this configuration, the component(s) disposed on the first rear case 225 can be protected by the second body 205 in a closed position of the mobile terminal. In addition, without the camera 121 of the second body 205, the camera 121 of the first body 200 can be implemented to be rotatable so as to rotate up to a direction which the camera 121 of the second body 205 faces.

The mobile terminal 100 of FIGS. 1 to 3 may also be configured to operate within a communication system which transmits data via frames or packets, including both wireless and wireline communication systems, and satellite-based communication systems. Hereinafter, a communication system within which the mobile terminal related to the present invention can operate will be described with reference to FIG. 4. Such communication systems utilize different air interfaces and/or physical layers. Examples of such air interfaces utilized by the communication systems include Frequency Division Multiple Access (FDMA), Time Division Multiple Access (TDMA), Code Division Multiple Access (CDMA), and Universal Mobile Telecommunications System (UMTS), the Long Term Evolution (LTE) of the UMTS, the Global System for Mobile Communications (GSM), and the like. By way of non-limiting example only, further description will relate to a CDMA communication system, but such teachings apply equally to other system types including the CDMA wireless communication system.

Figure 4:
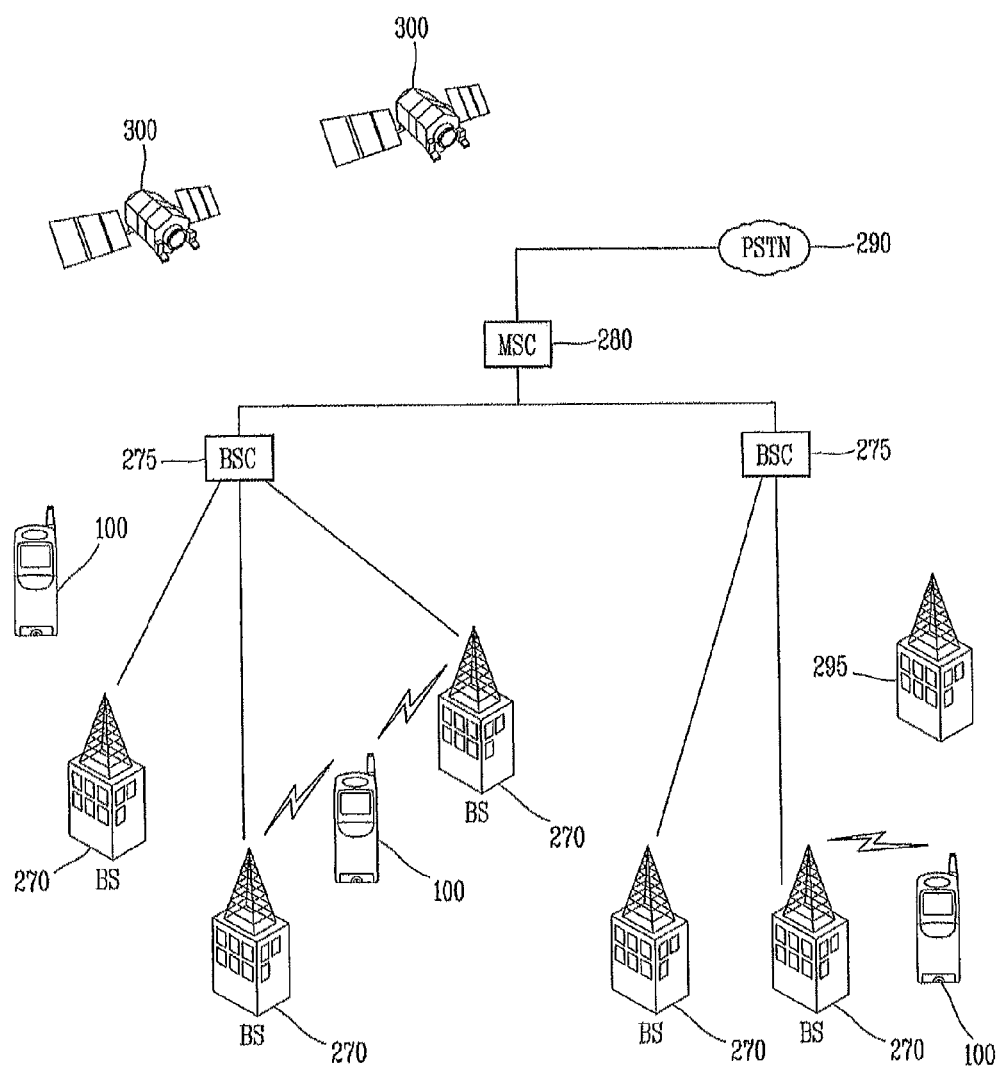
FIG. 4 is a block diagram of a wireless communication system with which the mobile terminal according to an embodiment of the present invention is operable.

Referring now to FIG. 4, a CDMA wireless communication system is shown having a plurality of mobile terminals 100, a plurality of base stations (BSs) 270, base station controllers (BSCs) 275, and a mobile switching center (MSC) 280. The MSC 280 is configured to interface with a conventional Public Switch Telephone Network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs 275 can be included in the system as shown in FIG. 4.

Each base station 270 may include one or more sectors, each sector having an omni-directional antenna or an antenna pointed in a particular direction radially away from the base station 270. Alternatively, each sector may include two or more different antennas. Each base station 270 may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations 270 may also be referred to as Base Station Transceiver Subsystems (BTSs). In some instances, the term "base station" may be used to refer collectively to a BSC 275, and one or more base stations 270. The base stations may also be denoted as "cell sites." Alternatively, individual sectors of a given base station 270 may be referred to as cell sites. A broadcasting transmitter (BT) 295, as shown in FIG. 4, transmits a broadcast signal to the mobile terminals 100 operating within the system. The broadcast receiving module 111 (FIG. 1) can also be configured inside the mobile terminal 100 to receive broadcast signals transmitted by the BT 295.

FIG. 4 further depicts several Global Positioning System (GPS) satellites 300. Such satellites 300 facilitate locating the position of at least one of plural mobile terminals 100. Two satellites are depicted in FIG. 4, but it is understood that useful position information may be obtained with greater or fewer satellites than two satellites. The GPS module 115 (FIG. 1) can also be configured to cooperate with the satellites 300 to obtain desired position information. It is to be appreciated that other types of position detection technology, (i.e., location technology that may be used in addition to or instead of GPS location technology) may alternatively be implemented. If desired, at least one of the GPS satellites 300 may alternatively or additionally be configured to provide satellite DMB transmissions.

During an operation of the wireless communication system, the base stations 270 receive sets of reverse-link signals from various mobile terminals 100. The mobile terminals 100 are engaging in calls, messaging, and executing other communications, and each reverse-link signal received by a given base station 270 is processed within that base station 270. The resulting data is then forwarded to an associated BSC 275. Further, the BSC 275 provides call resource allocation and mobility management functionality including the orchestration of soft handoffs between base stations 270. The BSCs 275 also route the received data to the MSC 280, which then provides additional routing services for interfacing with the PSTN 290. Similarly, the PSTN 290 interfaces with the MSC 280, and the MSC 280 interfaces with the BSCs 275, which in turn control the base stations 270 to transmit sets of forward-link signals to the mobile terminals 100.

Operations and functions of mobile terminals according to the present invention will now be described from the perspective of their configurations and interfacing methods.

Configuration of a Mobile Terminal According to an Embodiment of the Present Invention A mobile terminal according to an embodiment of the present invention will be divided, according to a structure of a display, into a mobile terminal having a dual display and a mobile terminal having a single display. In more detail, FIG. 5 shows various types of mobile terminals each having the single display, and FIG. 6 shows various types of mobile terminals each having the dual display. Each mobile terminal having the dual display and the single display as shown in FIGS. 5 and 6 may be applicable to various types of mobile terminals, including folder-type (a), flip-type (b), slide-type (c), bar-type (d), rotating-type (e) (e.g., swivel-type or swing-type), watch-type (f), or the like.

Hereinafter, a mobile terminal having the single or dual display may have a transparent display. In addition, a non-transparent display may further be provided. The transparent display and the non-transparent display may be configured to be overlapped with each other or be separately provided. That is, the single display shown in FIG. 5 may be configured as one display module having the transparent display and the non-transparent display being overlapped with each other or be implemented only with the transparent display, whereas the dual display shown in FIG. 6 may be configured to have the transparent display and the non-transparent display separately provided.

In addition, in all embodiments, the transparent display may be defined as a Transparent OLED (TOLED), and the non-transparent display may be defined as the display module 151 or a Liquid Crystal Display (LCD). However, the transparent and non-transparent displays are not limited to the TOLED and the LCD, respectively. Also, the transparent display may be a permeable display having both displayable surfaces (e.g., inner surface-outer surface, or lower surface-upper surface). Further, the embodiments disclosed in the present invention may be applied to all types of mobile terminal; however, depending on embodiments, a certain type of mobile terminal may be illustrated, which is appropriate for the sake of explanation.

Dual Display—Folder-Type Mobile Terminal

FIGS. 7A and 7B are overviews of a folder-type mobile terminal having a dual transparent display according to an embodiment of the present invention, which shows a mobile terminal having variable directions to display information according to a posture of the mobile terminal. As shown in FIGS. 7A and 7B, a folder-type mobile terminal according to an embodiment of the present invention may be configured such that a TOLED 154 is disposed at a folding portion 410 and a LCD 151 is disposed at a main body portion 400. Further, the LCD 151 may operate as a main display and the TOLED 154 may operate as a sub display.

Such positions of the TOLED 154 and the LCD 151 may also be changed, and accordingly, their functions as the main and sub displays may also be changed. For example, under the open position of the folding portion 410, the TOLED 154 may serve as a main display while the LCD 151 may serve as a sub display. Also, the LCD 151 can display an interactive keypad in one embodiment. In addition, under the closed state of the folding portion 410 of the mobile terminal, if the TOLED 154 independently operates, the operation of the LCD 151 at the main body portion 400 can be blocked such that it cannot interrupt the displaying of the TOLED 154.

Further, the TOLED 154 and the LCD 151 may be overlapped by a touchpad on any one of their upper or lower surface, so as to be useable as touch screens. Hereinafter, although not separately mentioned in every embodiment of the present invention, it is assumed that the TOLED 154 and the LCD 151 function as a touch screen. Also, the folder-type mobile terminal may be configured for its folding portion to be folded (closed) or unfolded (opened) in a vertical direction (i.e., up and down direction) or in a horizontal direction (i.e., right and left direction), according to its posture (i.e., its rotational direction). Thus, the mobile terminal may detect its posture (i.e., the rotational direction) and also rotate information output on the TOLED 154 or the LCD 151 for output according to its detected posture (i.e. the rotational direction).

In addition, FIG. 7A is an overview illustrating a method for displaying information when the folding portion 410 is open or closed in the vertical direction, and FIG. 7B is an overview illustrating a method for displaying information when the folding portion 410 is open or closed in the horizontal direction. Further, FIG. 8 is an overview of a folder-type mobile terminal having a dual transparent display according to an embodiment of the present invention, which shows a mobile terminal further having a keypad and a display. Also, the mobile terminal shown in FIG. 8 may be configured such that TOLED 154 is disposed at the folding portion 410 and the LCD 151 and keypad of the user input unit 130 are disposed at the main body portion 400. The TOLED 154 may also operate as a main display.

Preferably, the TOLED 154 serving as the main display executes and displays most of functions and operations of the mobile terminal including a multimedia function and communication function. On the other hand, the LCD 151 at the main body portion 400 executes operations associated with the keypad of the user input unit 130 and calls. When the TOLED 154 independently operates under the closed state of the folding portion 410, the emission of backlights in a dome keypad may preferably be prevented, so as to protect the displaying of the TOLED 154 from the interference of the emission.

FIG. 8(*a*) is a perspective view of a front face of the folder-type mobile terminal having a transparent display according to an embodiment of the present invention, and FIG. 8(*b*) is a perspective view of a rear face thereof. Further, FIG. 9 is an overview of a mobile terminal having a dual transparent display according to an embodiment of the present invention, which shows a mobile terminal having a folding portion rotatable by 360°.

Also, the mobile terminal shown in FIG. 9 may be configured to have the TOLED 154 disposed at the folding portion 410 and the LCD 151 and keypad 131 of the user input unit 130 both disposed on the main body portion 400. Also, the TOLED 154 and the LCD 151 can display various types of information by dividing them according to their purposes of use. For instance, the TOLED 154 may display as the main display information related to most of the functions and operations executed in the mobile terminal as well as the multimedia function and the communication function, while the LCD 151 may display as the sub display telephone numbers input for placing a call or additional information.

Further, the mobile terminal according to this embodiment can implement a dual look by configuring a hinge 402 disposed between the folding portion 410 and the main body portion 400 to be rotatable by 360°. That is, as shown in FIGS. 9(*a*) to 9(*d*), the mobile terminal can be folded by rotating the main body portion 400 by 360° centering around the hinge 402.

Next, FIG. 10 is an overview of a mobile terminal having a dual transparent display according to an embodiment of the present invention, which shows the mobile terminal being capable of photographing in a state of a folder being closed. As shown, the mobile terminal may be configured such that TOLED 154 is disposed at the folding portion 410 and the LCD 151 and keypad 131 of the input unit 130 are both disposed at the main body portion 400. Further, the TOLED 154 may operate as a main display and the LCD 151 may operate as a sub display. For example, the TOLED 154 serving as the main display can display information related to most of the functions and operations of the mobile terminal including the multimedia function and communication function, while the LCD 151 can display a telephone number input for placing a call on the keypad and additional information such as an indicator.

In addition, the mobile terminal may further be provided with the camera 121 disposed between the LCD 151 and the keypad 131. By disposing the camera 121 between the LCD 151 and the keypad 131, a user can photograph an object to be taken or photograph himself in a self-portrait mode not only in the open sate of the folding portion 410 but also in the closed state. This is because the photographing operation can be executed through the TOLED 154.

Also, in the closed state of the folding portion 410, the camera 121 is located at a central portion of the rear side of the TOLED 154. Hence, assuming as mentioned above that a video call is attempted in the closed state of the folding portion 410, another party's image is displayed on the TOLED 154, and the camera 121 is located at the rear side of the other party's image displayed on the TOLED 154. Accordingly, when the user faces the other party's image displayed on the TOLED 154, an effect is generated as if the user directly faces the camera 121. Therefore, the controller 180 can send the user's face image to the other party's terminal by using the camera 121. Thus, the other party can feel like they are directly talking with the user. That is, because the parties are looking directly into the cameras when they are conducting a video call between each other, the parties feel as if they are directly talking to each other.

In another embodiment, a bar-type mobile terminal can be configured such that the camera 121 is disposed at a central portion of a lower side of the TOLED 154 and an object viewed through the TOLED 154 can be photographed. Here, an image (interference image) displayed on the TOLED 154 may be photographed together with the object. In this instance, such image of the object can be compensated using preset compensation data. If the interference image is included in the image of the object by more than a certain reference, the transparency of the TOLED 154 increases such that the interference image can be reduced by a compensatable level.

Also, when using a self-portrait mode, the mobile terminal having the TOLED 154 may be configured to display a preview image of the camera 121 on a non-overlapped portion between the camera 121 and the TOLED 154. For example, when a folding portion having the TOLED 154 is slid up to operate a self-portrait mode in a slide-type mobile terminal, the preview image can be displayed on the slid-up portion of the TOLED 154.

In addition, if other information (e.g., multimedia image information) is being displayed on the TOLED 154, the controller 180 can simultaneously display both the multimedia image information and the preview image of the camera 121 by adjusting the transparency and color of the TOLED 154. Further, an image to be displayed on the TOLED 154 can manually be changed by the user's input. Also, to receive the user's input, the mobile terminal may include a sensor for detecting information such as an inclination, touching, key input, pressure, proximity, voice or the like.

Next, FIG. 11 is an overview of a mobile terminal having a dual transparent display according to an embodiment of the present invention, which shows a method for controlling a size of information output in cooperation with the opening or closing of a folding portion.

Further, as shown, the TOLED 154 is disposed on the folding portion 410 and the LCD 151 is disposed on the main body portion 400. Also, each of the TOLED 154 and the LCD 151 may be obscured by a touchpad on their upper surface or a lower surface, so as to operate as a touch screen. As discussed above, any one of the TOLED 154 or LCD 151 may serve as a main display, and the other as a sub display. For example, the TOLED 154 may be used to display menu information for displaying operational states of the mobile terminal or to control a multimedia playback under the closed state of the mobile terminal. Also, the TOLED 154 may serve as a sub display to assist a main display (e.g., LCD 151) according to various scenarios of user interfaces under the open state of the mobile terminal.

FIGS. 12A and 12B are overviews illustrating a swivel-type mobile terminal having a dual transparent display according to an embodiment of the present invention. As shown in FIGS. 12A and 12B, the swivel-type mobile terminal may be separately provided with the TOLED 154 and LCD 151. Similar to the different types of mobile terminals having the dual display as above, the TOLED 154 and the LCD 151 may serve respectively as main display and sub display so as to display different information from each other.

For example, the TOLED 154 may be used as the main display in the open state of the folding portion 410, the LCD 151 may serve as the sub display to display a keypad in a software configuration. Also, as shown in FIGS. 12A and 12B, the mobile terminal may have a swivel hinge 403 that allows the folding portion 410 to be rotated or moved to a certain angle (or position).

Dual Display—Flip-Type Mobile Terminal

FIG. 13 is an overview illustrating a flip-type mobile terminal having a dual transparent display according to an embodiment of the present invention. As shown in FIG. 13, the flip-type mobile terminal may be configured such that a keypad is disposed on a flip portion 510 and the TOLED 154 and LCD 151 are all disposed on a main body portion 500. Further, the TOLED 154 and the LCD 151 may operate as any of a main display or a sub display. For example, for displaying various information related to the mobile terminal (e.g., a current time, absent calls, message received, additional service related information, and the like) on the TOLED 154, a user can check such information on any portion of a front or rear surface of the mobile terminal even in the closed state.

Next, FIG. 14 is an overview illustrating another embodiment of the flip-type mobile terminal of FIG. 13, in which a separate sub-keypad 511 may be disposed on an outer surface of the flip portion 510. Such arrangement of the sub-keypad 511 on the outer surface of the flip portion 510 allows the user to control the operation of the mobile terminal with reference to information displayed on the TOLED 154 even in the closed state of the flip portion 510.

Further, FIG. 15 is another overview illustrating the flip-type mobile terminal of FIG. 13. As shown in FIG. 15, the TOLED 154 is disposed on the flip portion 510 and the LCD 151 is disposed on the main body portion 500. The TOLED 154 and the LCD 151 may operate as any of a main display or a sub display. For example, assuming that the TOLED 154 operates as a main display in the open state of the flip portion 510, the LCD 151 serves as a sub display so as to display a keypad in a software configuration.

Also, if the TOLED 154 operates as a sub display in the closed state of the flip portion 510, the TOLED 154 can display, for example, a software key for manipulating the mobile terminal, an operational state of the mobile terminal, wireless (radio) information transmitted/received to/from the mobile terminal, and various additional information (e.g., current time, absent calls, message received, additional service related information, and the like).

Dual Display—Slide-Type Mobile Terminal

Figure 16:
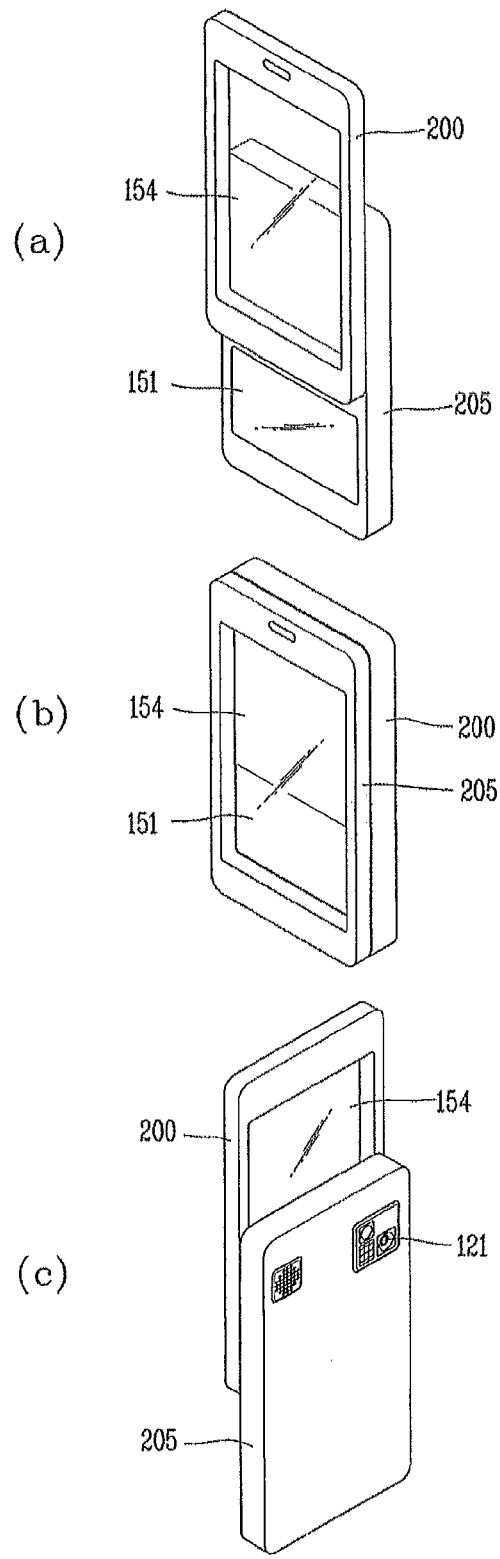
FIG. 16 is an overview of a mobile terminal having a dual transparent display according to an embodiment of the present invention, which shows a method of displaying information on the transparent display in cooperation with opening or closing of a sliding portion of the mobile terminal.

FIG. 16 is an overview illustrating a mobile terminal having a dual transparent display according to an embodiment of the present invention, which shows a method for displaying information on a transparent display in cooperation with the opening or closing of a sliding portion of the mobile terminal.

As shown in FIG. 16, the slide-type mobile terminal may be configured to have TOLED 154 disposed on a first body 200 and the LCD 151 disposed on a second body 205. Further, the TOLED 154 and the LCD 151 may operate as any of a main display or a sub display, and each can display various different types of information. As one example, when the user photographs himself in a self-portrait mode, the user can easily do photograph himself based upon image information output on the TOLED 154.

For example, previously, the user had to photographed himself in the self-portrait mode by using a mirror disposed adjacent to a camera. However, in the embodiment of the present invention, as shown in FIG. 16(*c*), an image reflected on the camera 121 can be output as a preview image on a partial display region of the TOLED 154 (e.g., a display region seen from the rear side of the mobile terminal when being slid up). Hence, the user can photograph himself more easily by viewing an image displayed on the TOLED 154. Also, as shown in FIG. 16(*a*), the TOLED 154 transmits an image output on the LCD 151 when the sliding portion is in the closed state. Accordingly, even in the closed state of the sliding portion, it is possible to output and control basic information required to control the mobile terminal.

Dual Display—Bar-Type Mobile Terminal

Figure 17:
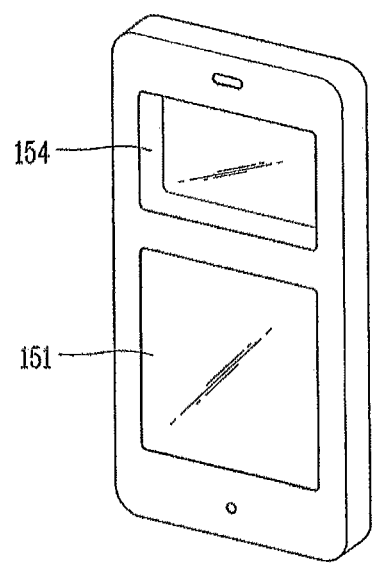
FIG. 17 is an overview of a bar-type mobile terminal having a dual transparent display according to an embodiment of the present invention.

FIG. 17 is an overview illustrating a bar-type mobile terminal having a dual transparent display according to an embodiment of the present invention. As shown in FIG. 17, the bar-type mobile terminal may be configured to have the TOLED 154 disposed on an upper portion of a terminal body and the LCD 151 disposed on a lower portion thereof. Further, the TOLED 154 and the LCD 151 may operate as any of a main display or a sub display, and each can display various different types of information.

Figure 18:
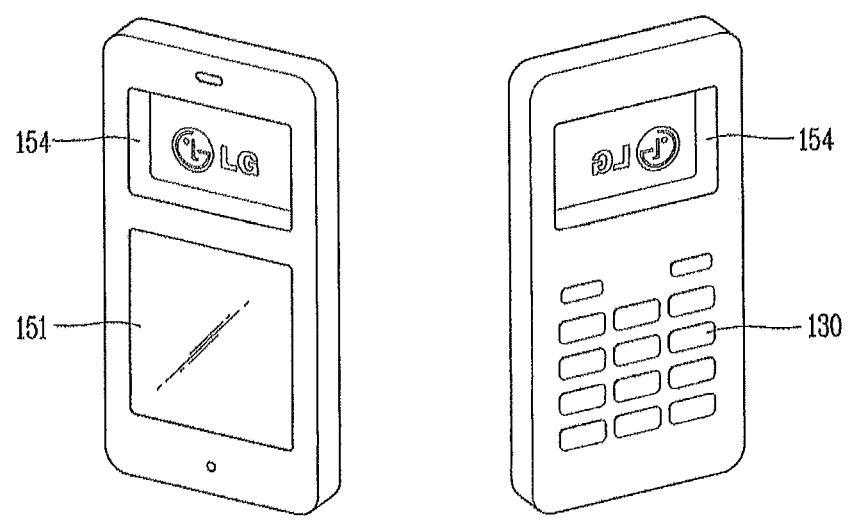
FIG. 18 is an overview of a mobile terminal configured such that the rear surface of the bar-type mobile terminal of FIG. 17 can be used.

FIG. 18 is an overview of another embodiment of the bar-type mobile terminal of FIG. 17, in which the mobile terminal is configured such that its rear surface can be used as another type of mobile terminal. As shown in FIG. 18, the mobile terminal may be configured such that the LCD 151 is disposed below the TOLED 154 on a front surface of the mobile terminal and the keypad 131 is disposed below the TOLED 154 on a rear surface of the mobile terminal. Further, information displayed on the TOLED 154 is provided in order to represent that the information displayed on the front surface of the TOLED 154 is transmitted and displayed on the rear surface. Such information may be displayed by converting or rotating a displaying direction according to the user's manipulation.

Watch-Type Mobile Terminal

Figure 19:
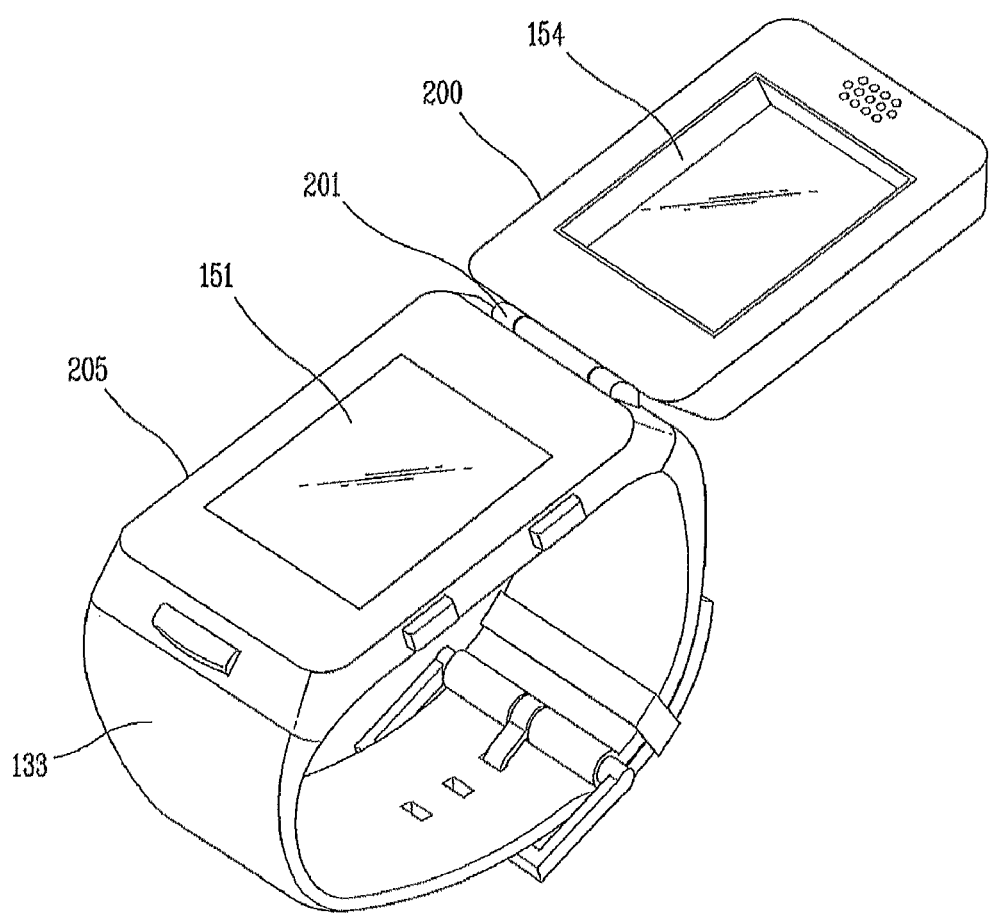
FIG. 19 is an overview of a watch-type mobile terminal having a single transparent display according to an embodiment of the present invention.

FIG. 19 is an overview illustrating a watch-type mobile terminal having a dual transparent display according to an embodiment of the present invention. As shown FIG. 19, the watch-type mobile terminal may include the second body 205 having a watchstrap 133 connected thereto and having the LCD 151, and the first body 200 connected to one side of the second body 205 by a hinge 201 to be open or closed and having the TOLED 154. Hereinafter, the first body 200 may also be referred to as a cover.

Similar to the different types of mobile terminals having the dual display as discussed above, the TOLED 154 and the LCD 151 may operate as any of a main display or a sub display, and each can display various different types of information. Also, because the TOLED 154 is transparent, it can transmit information displayed on the LCD 151 in the closed state of the cover so as to output such information thereon, namely, the first body 200. Also, in the open state of the first body 200, the TOLED 154 and the LCD 151 can display different information from each other. Further, in the open state of the first body 200, the TOLED 154 and the LCD 151 may be used either as displays or keypads.

Single Display—Folder-Type Mobile Terminal

FIG. 20 is an overview illustrating a folder-type mobile terminal having a single transparent display according to an embodiment of the present invention. As shown in FIG. 20, the mobile terminal may be configured to have the TOLED 154 disposed on the folding portion 410 and the keypad 130 disposed on the main body portion 400. The keypad 130 may also be configured as a dome key or have backlights (not shown). Thus, when the folding portion 410 is in the open state, a user can input information by pressing the keypad 130. Conversely, when the folding portion 410 is in the closed state, the user can input information by touching keys on corresponding positions with referring to the positions of the keys on the keypad 130, which is viewable by being transmitted through the TOLED 154.

Next, FIG. 21 is an overview illustrating an information input method in a folder-type mobile terminal having a single transparent display according to an embodiment of the present invention. As shown in FIG. 21, the mobile terminal may be configured to have the TOLED 154 disposed on the folding portion 410 and a keypad or touchpad 155 disposed on the main body portion 400. Further, the TOLED 154 may operate as a touch screen with a touchpad (or touch film) attached on its upper surface or lower surface. In addition, the keypad may include dome keys, or be configured as a printed pattern having various key-like patterns (e.g., numeral keys, navigation keys, symbol keys, character keys, and the like). Also, the keypad or touchpad 155 may be provided with backlights. The backlights may be configured by using Light Emitting Diodes (LEDs) or an Electroluminescence Sheet (EL).

Further, the backlight may automatically be driven by the controller 180 according to the user's manipulation or the opening/closing operation of the folding portion 410. For example, when the folding portion is closed while specific information is being displayed on the TOLED 154, the backlights may not be driven in order to prevent the keypad from being transmitted as a background. Also, in order to prevent the keypad from being transmitted as a background even when the backlights are not driven, the keypad or touchpad 155 may preferably be implemented to be flat or with a dark color. On the other hand, in the open state of the folding portion 410, the user can input information by touching the keypad or touchpad 155. That is, the user can touch the touchpad 155 to input cursive letters or to perform a touch and drag operation when the backlight is not driven.

Next, FIG. 22 is an overview illustrating a configuration of a keypad on a folder-type mobile terminal having a single transparent display according to an embodiment of the present invention. As shown in FIG. 22, the mobile terminal may be configured such that the TOLED 154 is disposed on the folding portion 410. Also, the touchpad 155, various key patterns 156 and an EL 157 for backlights are disposed on the main body portion 400.

In addition, the EL 157 may be a material emitting light onto a space to which an electrical force can come up to. Also, an EL Sheet is a planar light source in a paper form based on EL, and has many advantages that neon or phosphor does not have. As a material in a form of flexible thin-film, it requires low power consumption and can be cut in various forms suitable for applications. Also, the input unit 130 uses multi-layered EL sheets to activate EL sheets suitable for each backlight control algorithm. For example, the EL sheet may be configured as a key pattern combining numeral keys and navigation keys, a symbol key pattern, QWERTY key pattern, and the like. The controller 180 can then activate one of such key patterns according to the user's control or a preset backlight control algorithm. The input unit 130 using the EL sheets may also be implemented by a keypad or by a touchpad.

FIG. 23 is an overview illustrating a folder-type mobile terminal having a transparent display according to an embodiment of the present invention, which shows a configuration of the mobile terminal in which information displayed on one surface of the transparent display can be restricted. As shown in FIG. 23(a), the mobile terminal may be configured such that the TOLED 154 is disposed on the folding portion 410 and the input unit 130 using a dome keypad, touch keypad, EL sheets or the like is disposed on the main body portion 400.

In the closed state of the mobile terminal, the folding portion 410 is designed to expose part of the TOLED 154 as shown in FIG. 23(b). Thus, the part of the TOLED 154 can be exposed to the user. Further, the folding portion 410 according to this embodiment may be provided with the TOLED 154 on both surfaces (i.e., inner surface and outer surface) such that displaying information can be executed both in the open and closed states of the mobile terminal.

FIG. 24 is an overview illustrating a swivel-type mobile terminal having a single transparent display according to an embodiment of the present invention. As shown in FIG. 24, the swivel-type mobile terminal may be configured with the TOLED 154 and the keypad 131 separately disposed and the swivel hinge 403 connecting the folding portion 410 to the main body portion 400. The swivel hinge 403 allows the folding portion 410 to be rotated or moved to a certain angle (or position).

Further, the controller 180 can change a displaying direction of information output on the TOLED 154 according to the rotation of the folding portion 410. In addition, the TOLED 154 is allowed to display on both surfaces thereof. Accordingly, the controller 180 can allow information, which is displayed on a front surface (first surface) of the TOLED 154, to be displayed on a rear surface (second surface) thereof, according to the rotation of the folding portion 410 or the opening/closing of the folding portion 410.

Single Display—Slide-Type Mobile Terminal

Figure 25:
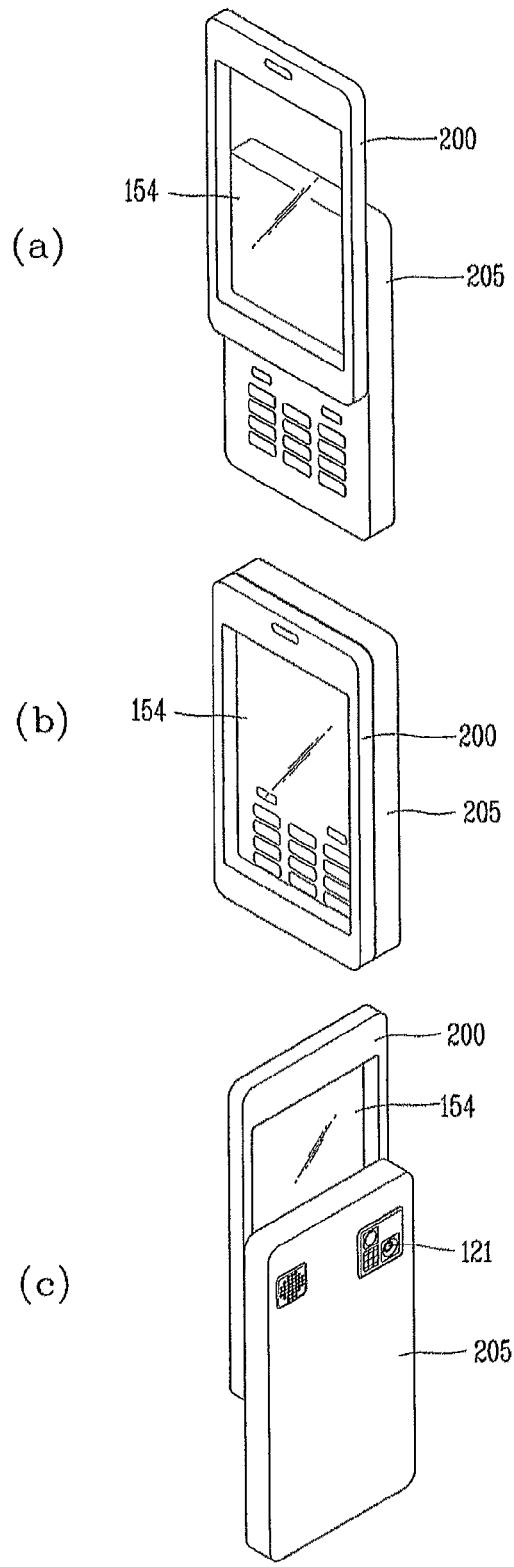
FIG. 25 is an overview of a slider-type mobile terminal having a single transparent display according to an embodiment of the present invention, which shows an information displaying method on the transparent display in cooperation with opening or closing of a sliding portion of the mobile terminal.

FIG. 25 is an overview of a slide-type mobile terminal having a single transparent display according to an embodiment of the present invention, which shows a method for displaying information on the transparent display in cooperation with the opening or closing of a sliding portion. As shown in FIG. 25, the slide-type mobile terminal may be configured to have the TOLED 154 disposed on the first body 200 and the keypad 131 disposed on the second body 205. Also, the camera 121 is disposed at a rear surface of the second body 205.

Thus, when a user wants to photograph himself or herself using the camera 121 disposed at the rear surface, the controller 180, as shown in FIG. 25(c), can output an image reflected on the camera 121 as a preview image on a partial display region of the TOLED 154 (i.e., a display region exposed to the rear surface when the mobile terminal is slid open). Accordingly, the user can view his own image displayed on the TOLED 154 so as to photograph himself or herself more easily.

Also, as shown in FIG. 25(a), because the keypad 131 disposed on the second body 205 is transmitted through the TOLED 154 when the sliding portion is in the closed state, the user can input information by touching keys on corresponding positions and referring to the positions of the keys transmitted and displayed on the TOLED 154. As such, the basic operations of the mobile terminal can be controlled even in the closed state of the sliding portion.

Single Display—Bar-Type Mobile Terminal

Figure 26:
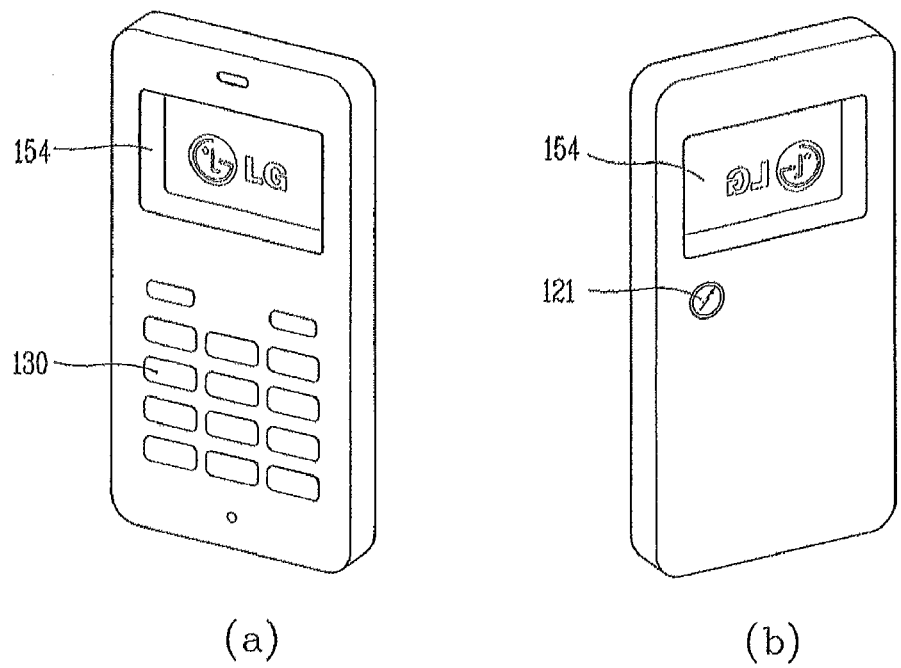
FIG. 26 is an overview of a bar-type mobile terminal having a single transparent display according to an embodiment of the present invention.

FIG. 26 is an overview illustrating a bar-type mobile terminal having a single transparent display according to an embodiment of the present invention. As shown in FIG. 26, the bar-type mobile terminal may be configured to have the TOLED 154 disposed at an upper portion of a front surface of a terminal body and the keypad 130 disposed at a lower portion thereof. The TOLED 154 is also exposed to the rear surface of the mobile terminal.

Figure 27:
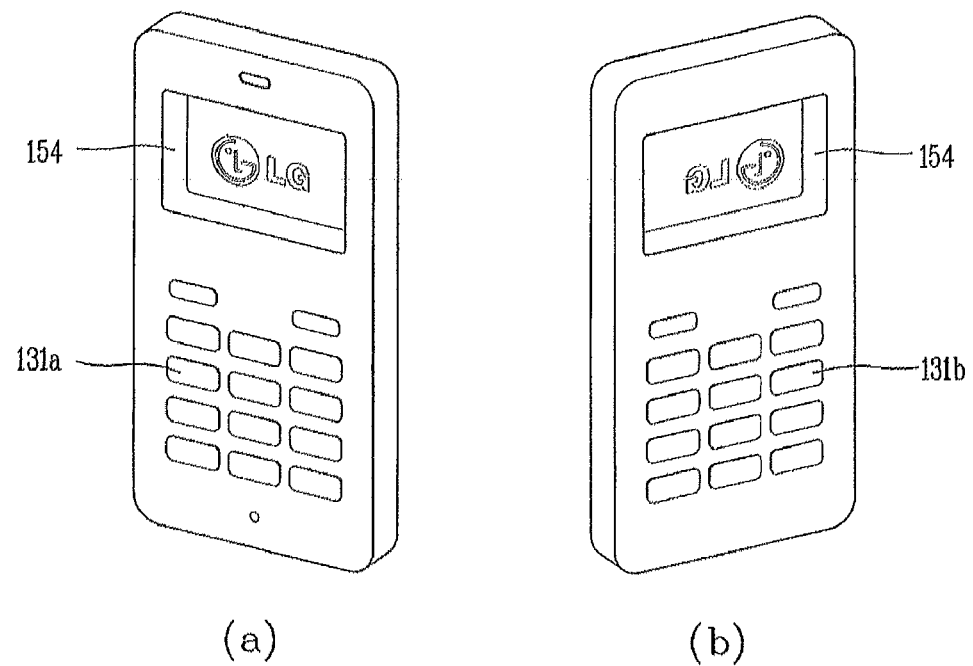
FIG. 27 is an overview of a bar-type mobile terminal having keypads at both surfaces of the mobile terminal of FIG. 26.

Therefore, as shown in FIG. 27, the keypad 131 may further be disposed below the TOLED 154 shown on the rear surface of the terminal body. Accordingly, when an error is generated on a keypad (e.g., 131a) on one surface, the user can use a keypad (e.g., 131b) on another surface. Further, the information displayed on the TOLED 154 is provided in order to represent that information displayed on the front surface of the TOLED 154 is transmitted and displayed on the rear surface thereof. Such information may be displayed on any one of both surfaces of the TOLED 154, according to a keypad which the user manipulates, or be displayed by converting or rotating its displaying direction.

Figure 28:
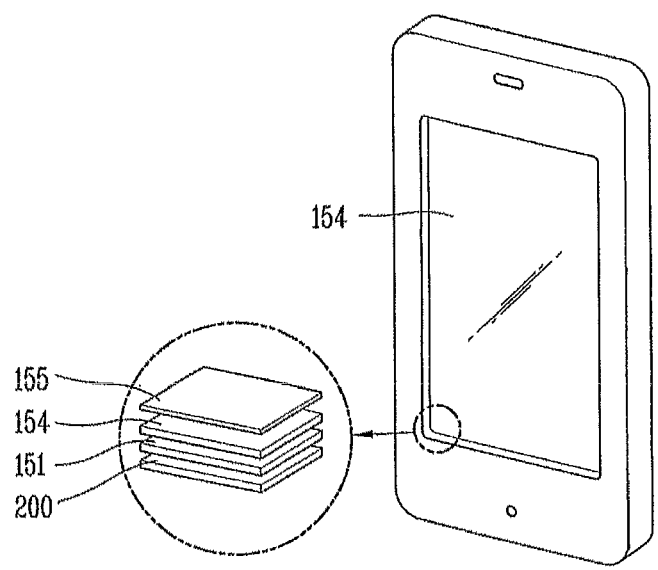
FIG. 28 is an overview showing a configuration of a single display configured by overlapping a transparent display with a non-transparent display.

Next, FIG. 28 is an overview illustrating a configuration of a single display obtained by overlapping a transparent display with a non-transparent display according to an embodiment of the present invention. In this description, a bar-type mobile terminal having such a single display will be described. As shown in FIG. 28, the single display may be configured as a single module in which the TOLED 154 is overlapped with the LCD 151.

Also, a touchpad (or a touch film) 155 may be attached to the upper surface of the module so as to be used as a touch screen. Further, the LCD 151 and TOLED 154 having such a single display may operate as one of a main display or sub display. That is, the LCD 151 and the TOLED 154 may display different information from each other or output the same information, and can make various visual effects according to a method for outputting such information. For example, when a user manipulates and outputs a menu or image, the image or menu can be shown with a cubic effect. In addition, the display may be applied not only to the bar-type mobile terminal but also every type of mobile terminal, such as folder-type, flip-type, slide-type, rotating-type (e.g., swivel-type, swing-type), or the like), or a watch-type.

Figure 29:
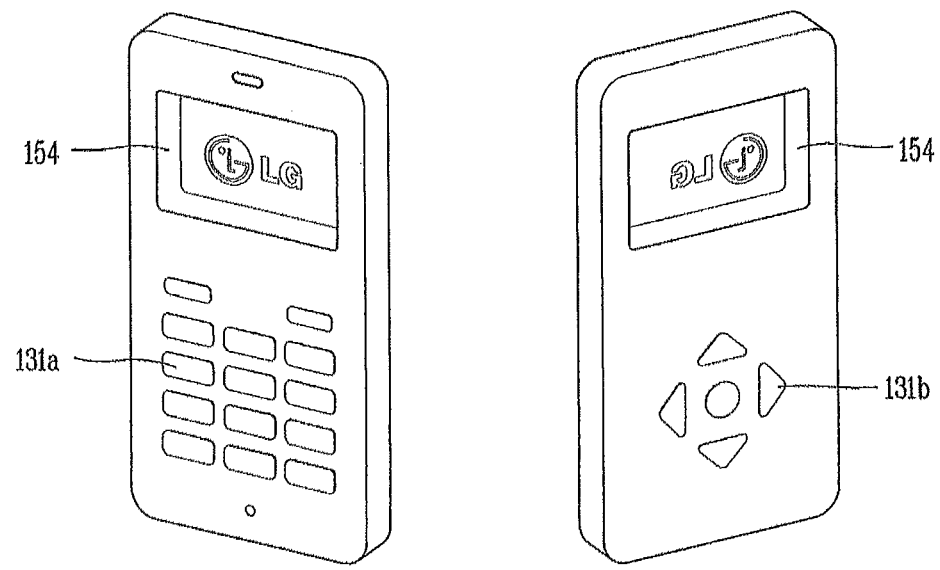
FIG. 29 is an overview of a bar-type mobile terminal having keypads with different functions at both surfaces of the mobile terminal of FIG. 26.

FIG. 29 is an overview of a bar-type mobile terminal having keypads with different functions disposed on both surfaces of the bar type mobile terminal of FIG. 26. As shown in FIG. 29, the mobile terminal is configured to have a first keypad 131*a* disposed below the TOLED 154 on a front surface of the mobile terminal, and a second keypad 131*b* disposed below the TOLED 154 on a rear surface of the mobile terminal. Further, information displayed on the TOLED 154 is provided in order to represent that information displayed on the front surface of the TOLED 154 is transmitted and displayed onto the rear surface thereof. Such information may be displayed by converting or rotating its displaying direction according to the user's manipulation.

In addition, the first keypad 131*a* may have keys for inputting letters and numerals and several short keys for allowing an immediate execution of certain functions. The second keypad 131*b* may have navigation keys and short keys for allowing an immediate execution of other certain functions. Also, the short keys may be disposed both on the first and second keypads 131*a* and 131*b*.

Accordingly, such keys having different functions can be disposed on both of the front and rear surfaces of the mobile terminal such that the keys can be arranged with wider intervals therebetween, which ensures a simple keypad configuration, thereby preventing key input errors. For example, communication functions can effectively be executed on the surface having the first keypad 131*a* (e.g., the keypad containing keys for letters and numerals), while various multimedia functions such as playing games can effectively executed on the surface having the second keypad 131*b* (e.g., the keypad containing navigation keys or function keys).

Watch-Type Mobile Terminal

Figure 30:
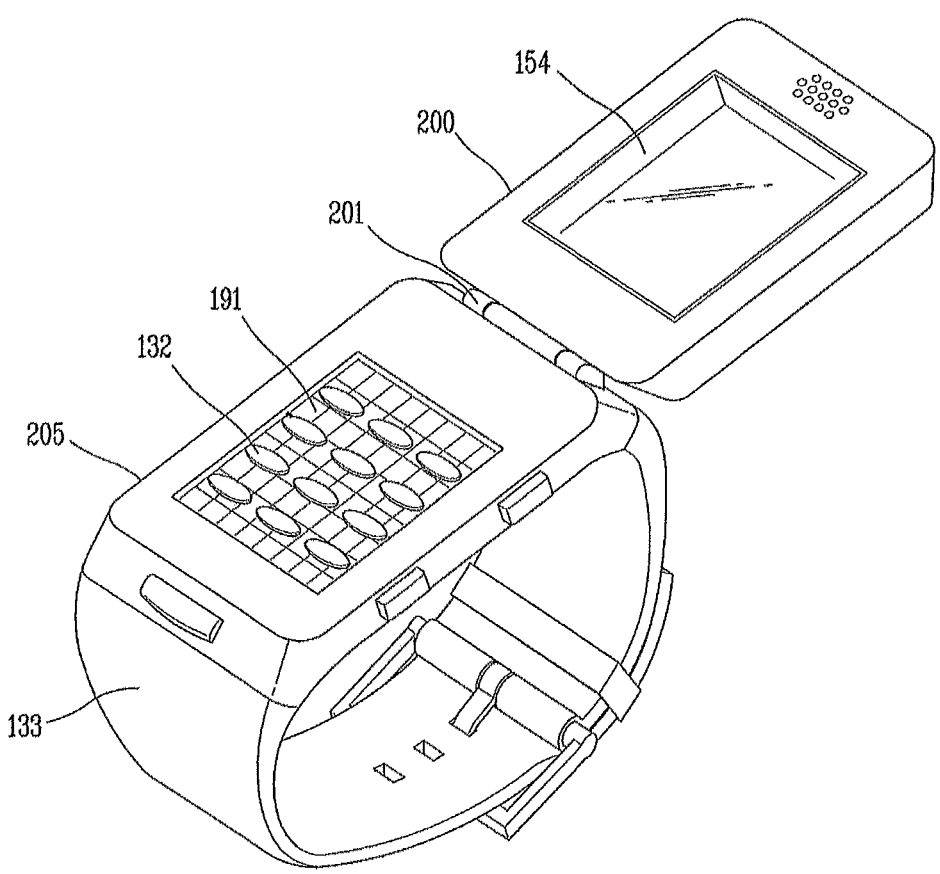
FIG. 30 is an overview of a watch-type mobile terminal having a single transparent display and a solar cell in a rear surface thereof according to an embodiment of the present invention.

FIG. 30 is an overview illustrating a watch-type mobile terminal having a single transparent display and a solar cell on a rear surface thereof according to an embodiment of the present invention. As shown in FIG. 30, the watch-type mobile terminal may include the second body 205 having a watchstrap 133 connected thereto and having a solar cell 191 disposed therein, and the first body 200 connected to one side of the second body 205 by the hinge 201 to be open or closed and having the TOLED 154. The first body 200 may also be referred to as a cover.

In addition, the solar cell 191 is disposed inside the second body 205, and the TOLED 154 is structurally disposed to cover the solar cell 191. The first body 200 having the TOLED 154 may be configured using a sliding unit or the hinge 201 such that one side of the TOLED 154 can be opened or closed with respect to the second body 205. Also, under the closed state of the first body 200, the controller 180 can receive a user's command input via a touchpad disposed on an upper portion (upper surface, upper end, outer side) of the TOLED 154.

In addition, dome keys 132 may be disposed on an upper portion of the solar cell 191. Thus, when the TOLED 154 is opened, the controller 180 can receive a command input by a user using the dome keys 132. The result of the command input using the dome keys 132 can be output on any one of both surfaces of the TOLED 154 according to the control of the controller 180. Further, the solar cell 191 can generate electricity by using light transmitted through the TOLED 154. Also, by arranging the solar cell 191 to receive light transmitted through the TOLED 154, a greater area of the solar cell 191 is ensured, resulting in an increase in an amount of electricity generated.

Figure 31:
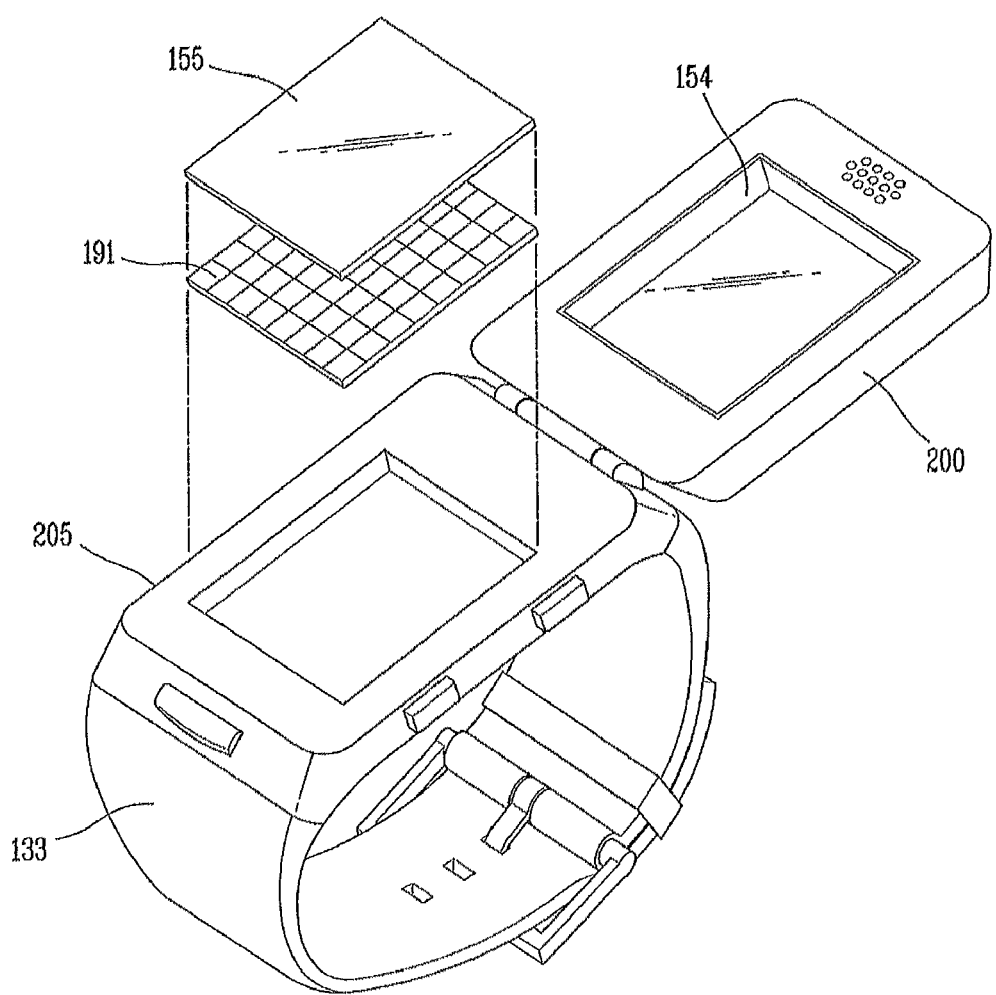
FIG. 31 is an overview of a mobile terminal having a touch pad at an upper surface of the solar cell of FIG. 30.

Next, FIG. 31 is an overview of a mobile terminal having a touchpad on an upper surface of the solar cell of FIG. 30. As shown in FIG. 31, the second body 205 may include the solar cell 191 therein, and a touchpad 155 is disposed on an upper surface of the solar cell 191. Also, the first body 200 having the TOLED 154 may be configured using a sliding unit or the hinge 201 such that at least one side thereof can be opened or closed with respect to the second body 205.

Further, because the solar cell 191 is configured to be structurally covered with the TOLED 154, the solar cell 191 can generate electricity by using light transmitted through the TOLED 154 even in the closed state of the first body 200. In addition, the controller 180 may receive a command input by a user using the touchpad 155 in the open state of the first body 200. The result of the command input using the touchpad 155 can be output on any one of both surfaces of the TOLED 154 according to the control of the controller 180.

Figure 32:
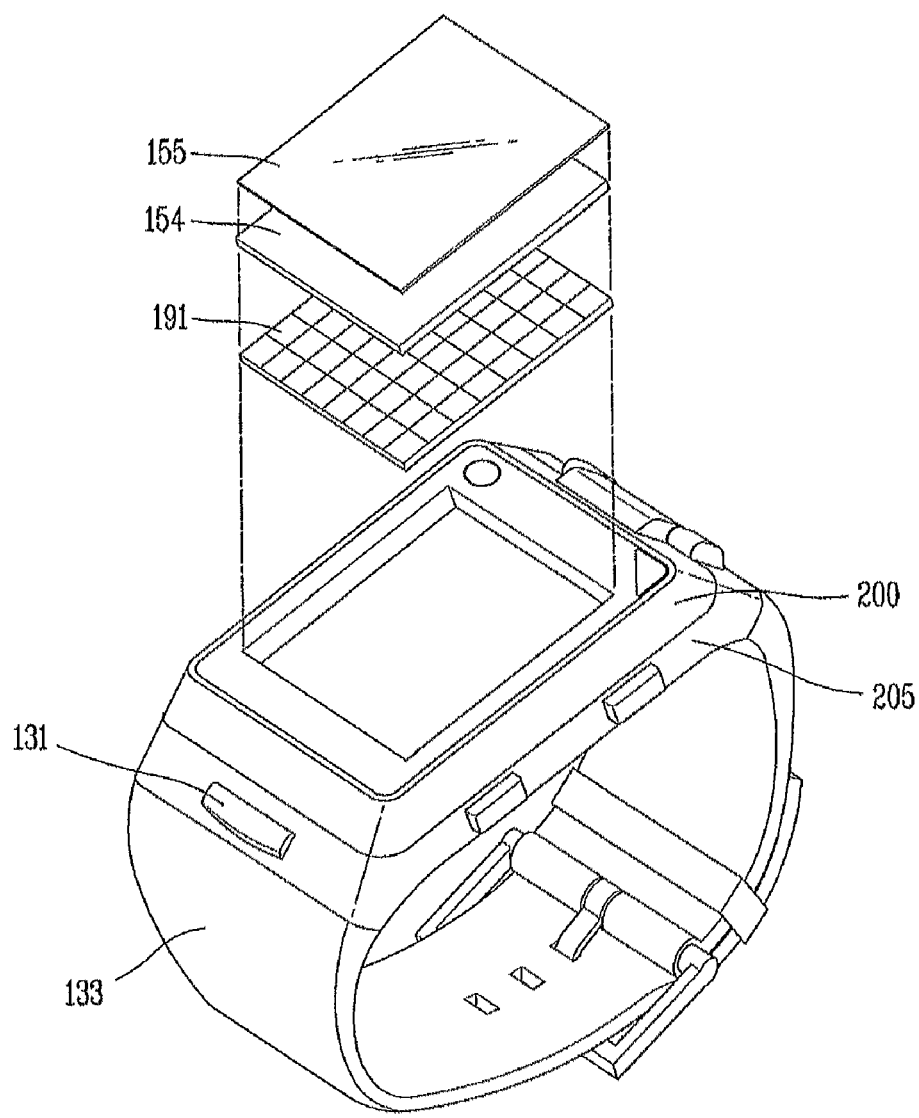
FIG. 32 is an overview of a watch-type mobile terminal having a transparent display according to an embodiment of the present invention, which shows a mobile terminal having a touch pad at an upper surface of the transparent display.

In addition, FIG. 32 is an overview of a watch-type mobile terminal having a transparent display according to an embodiment of the present invention, which shows a mobile terminal having a touchpad on an upper surface of the transparent display. As shown in FIG. 32, the second body 205 may include the solar cell 191 therein, and the first body 200 is overlapped on the second body 205. Further, the first body 200 may include the TOLED 154, which is structurally located on an upper surface of the solar cell 191. The touchpad 155 is also disposed on an upper surface of the TOLED 154.

Therefore, the user can input a command through the touch pad 155 disposed on the upper surface of the TOLED 154. Further, the solar cell 191 can generate electricity using light transmitted through the TOLED 154, regardless of whether or not the TOLED 154 displays information. Also, the amount of transmitted light depends on the transmittance of the TOLED 154, and accordingly the amount of generated electricity may be different. In addition, when the solar cell 191 is configured with black color, the color sensitivity of the TOLED 154 may be effectively improved.

2. Operation of a Mobile Terminal According to an Embodiment of the Present Invention (Manipulation of User Interface (UI))

As mentioned above, a mobile terminal with a single display is configured as a display module in which a transparent display is overlapped with a non-transparent display, and a mobile terminal with a dual display is configured as two display modules in which a transparent display and a non-transparent display are separately disposed.

Further, the folder-type mobile terminal is a representative type of mobile terminal configured to have the dual display. The folder-type mobile terminal can display independent information on each display in cooperation with the opening or closing of a folding portion, or display several information associated with each other by overlapping each display. When displaying such information associated with each other by overlapping each display, a new visual effect can be generated.

Next, the operations and functions of a mobile terminal having the single display configured by overlapping a transparent display with a non-transparent display will be described according to embodiments of the present invention. Further, the operations and functions may be applied to all aforementioned types of mobile terminals (e.g., flip-type, folder-type, bar-type, slide-type, swivel-type and watch-type), etc.

A detailed description will now be given of a display controlling method according to operational states of a mobile terminal having a transparent display according to an embodiment of the present invention, a power saving method, and a display controlling method in connection with a specific function (e.g., a camera function) provided in the mobile terminal.

Screen Displaying Method of the Mobile Terminal with Transparent Display

A method for displaying a screen in a mobile terminal with a transparent display according to an embodiment of the present invention may be divided into a displaying method of the LCD 151 and the TOLED 154, a controlling method related to a touching operation, and a controlling method related to a displaying operation.

Displaying Method of the LCD and TOLED

Next a description will be given of a method in which a user executes a photo album function and selects one image in the album to thereby display the selected image on a preview screen or link the image with another function according to an embodiment of the present invention. Also, in the method, the LCD 151 and the TOLED 154 are defined respectively as a main display and a sub display, and information to be displayed on each display is also classified, so as to provide a cubic effect.

FIGS. 33 to 38 are overviews for illustrating a displaying control method of a mobile terminal having a single transparent display according to an embodiment of the present invention, and particularly, illustrating a displaying control method of the LCD 151 and TOLED 154 when a photo album function is executed.

Figure 33:
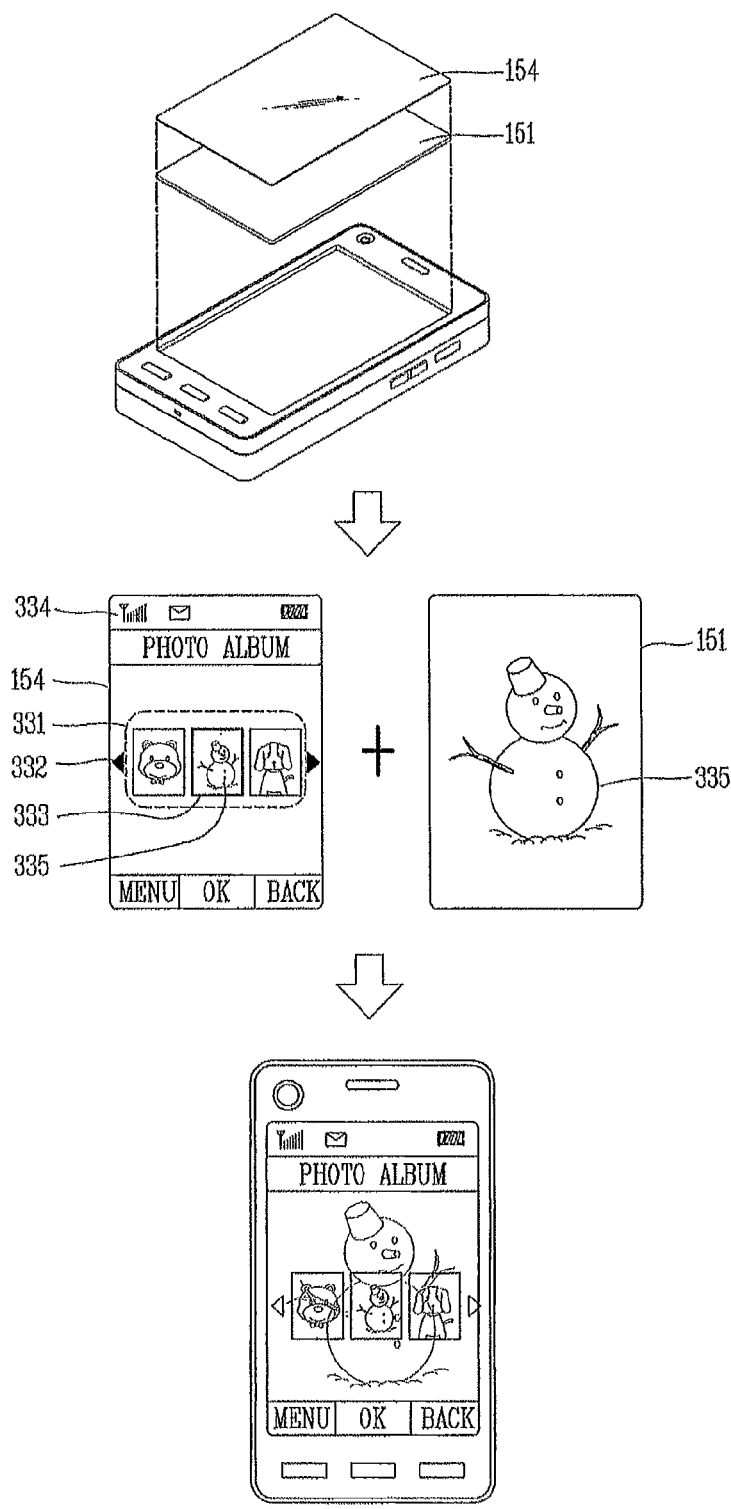
FIGS. 33 to 38 are overviews showing a method for controlling a display of a mobile terminal which has a single transparent display according to an embodiment of the present invention.
Figure 34:
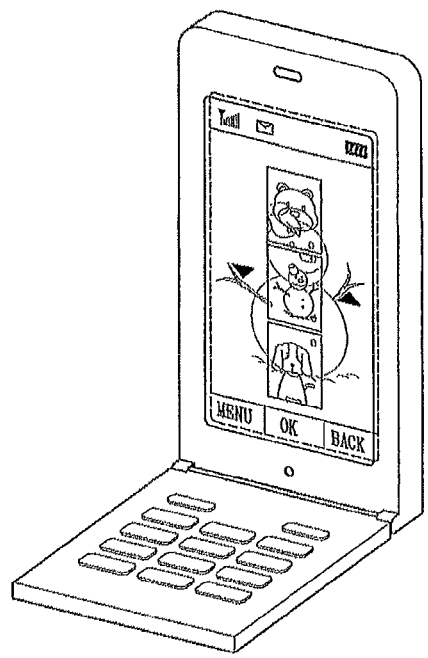
Figure 35:
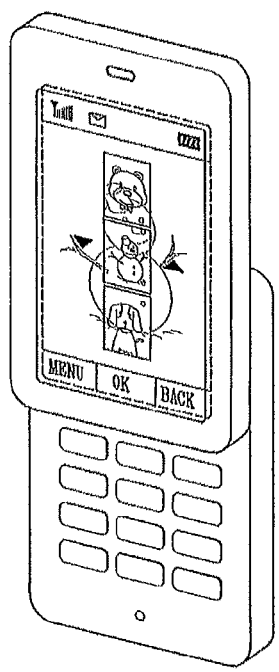
Figure 36:
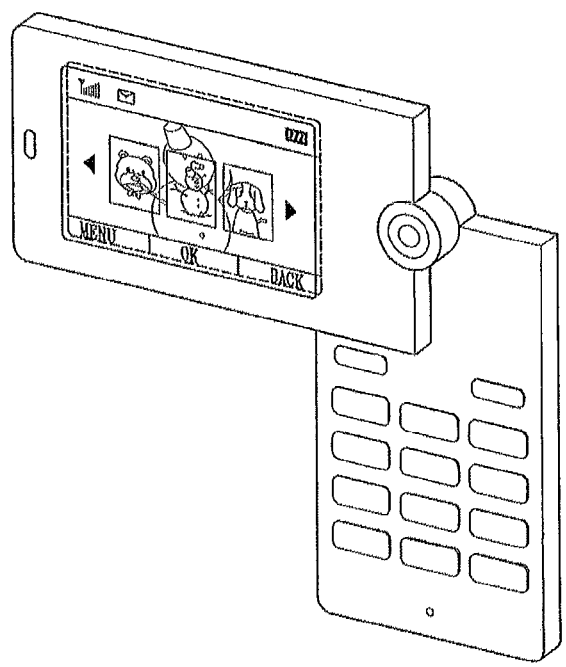
Figure 37:
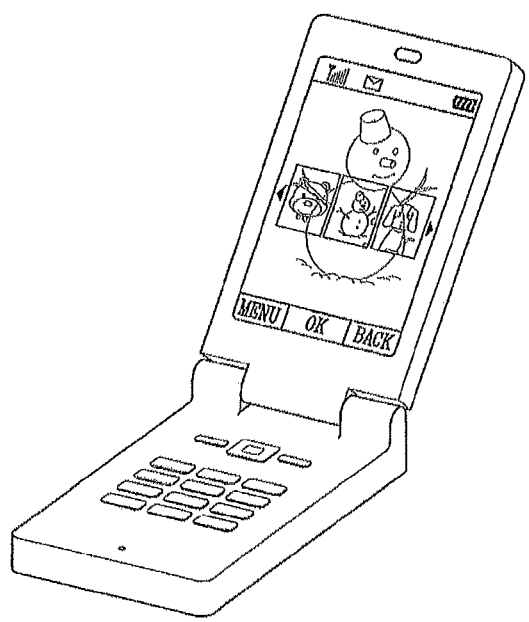
Figure 38:
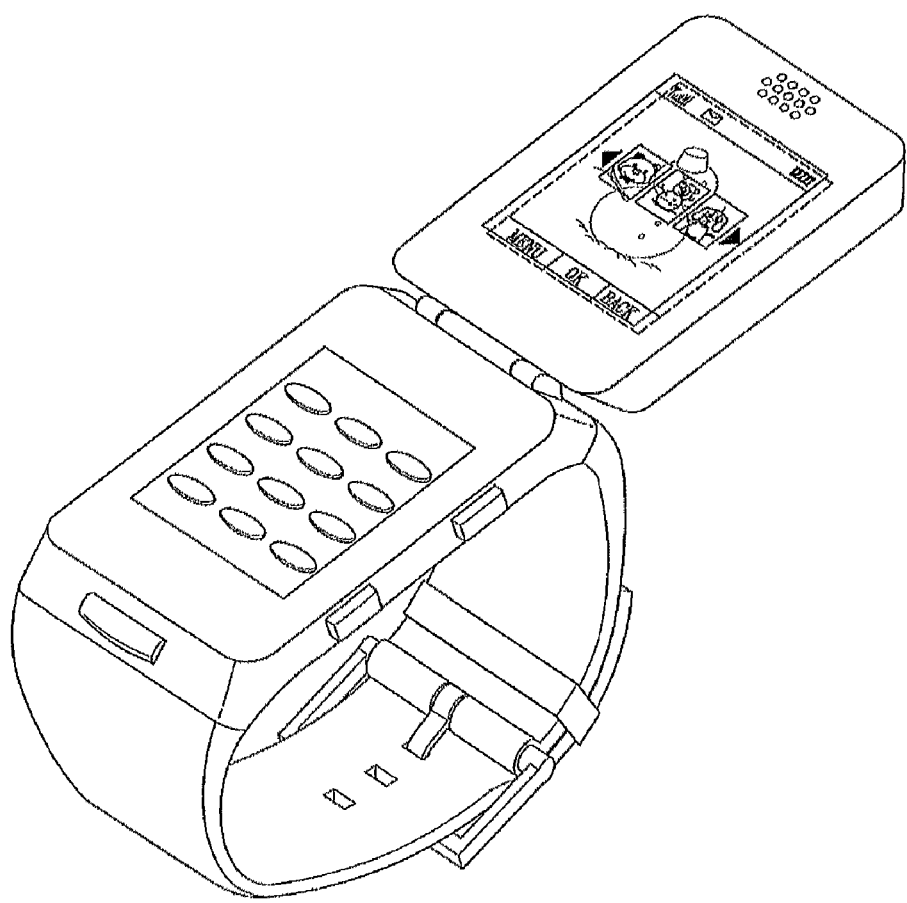

Next, a method for controlling a display provided at each type of mobile terminal will be described representatively with respect to the bar-type mobile terminal shown in FIG. 33. As shown in FIG. 33, a display disposed on each type of mobile terminal is configured by overlapping the TOLED 154 and the LCD 151. Further, the controller 180 may display a screen for executing or activating a photo album on the TOLED 154. Also, an indicator 334 for indicating an operational state of the mobile terminal may also be displayed. The screen for executing the photo album may include images 331, navigation keys 332 (hereinafter, referred to as 'software navigation keys') for moving the images 331, and a cursor 333 for selecting one of the images 331.

Also, a user can select one (e.g., image 335) of the images 331 displayed on the photo album execution screen. Further, the controller 180 can display the selected image 335 on the LCD 151 as a preview image. The controller 180 can also change the selected image 335 into an image for an idle screen of the LCD 151. FIGS. 34-38 illustrate the selected image being displayed in different configurations and on different types of mobile terminals.

In addition, the controller 180 can support an animation effect that the selected image is first dropped and then unfolded. Also, because the TOLED 154 has transmittance, even in the state of the photo album execution screen being displayed on the TOLED 154, the user can view the idle screen image set for the LCD 151. On the other hand, when the TOLED 154 is displayable on both of its surfaces, the same operation as aforementioned can be executed by controlling each front and rear surface of the TOLED 154 other than the LCD 151. In addition, a component which controls the displaying operations of the LCD 151 and TOLED 154 according to an embodiment of the present invention may be a multimedia processor or a separate processor having a control function.

Also, the controller 180 can move the object between the TOLED 154 and the LCD 151 based on a double touch operation. For example, the user can touch an object displayed on the TOLED 154 and then touch a portion of the LCD 151. Then, upon receiving a signal corresponding to the double touch operation, the controller 180 moves the object displayed on the TOLED 154 to the LCD 151 are where the user touched the LCD 151. The user can also move the object displayed on the LCD 151 to the TOLED 154 using the reverse procedure. The controller 180 can also automatically move the displayed object between the first and second displays (i.e., the TOLED 154 and the LCD 151) when there is insufficient area on a particular display (i.e., the TOLED 154 and the LCD 151).

Hereinafter, a description will be given of operations of a mobile terminal separately having the transparent display and the non-transparent display in the following embodiments. In addition, the operations of the mobile terminal having the dual display may be applied to all aforementioned types of mobile terminals (e.g., flip-type, folder-type, bar-type, slide-type, swivel-type and watch-type, etc.).

FIGS. 39 to 44 are overviews illustrating a method for controlling a display of a mobile terminal having a transparent display according to an embodiment of the present invention, which shows a method for controlling the LCD 151 and TOLED 154 when executing a photo album function in a mobile terminal having a dual display. In more detail, FIGS. 39 to 44 respectively show a folder-type mobile terminal, a swivel-type mobile terminal, flip-type mobile terminal, slide-type mobile terminal, bar-type mobile terminal, and watch-type mobile terminal.

Figure 39:
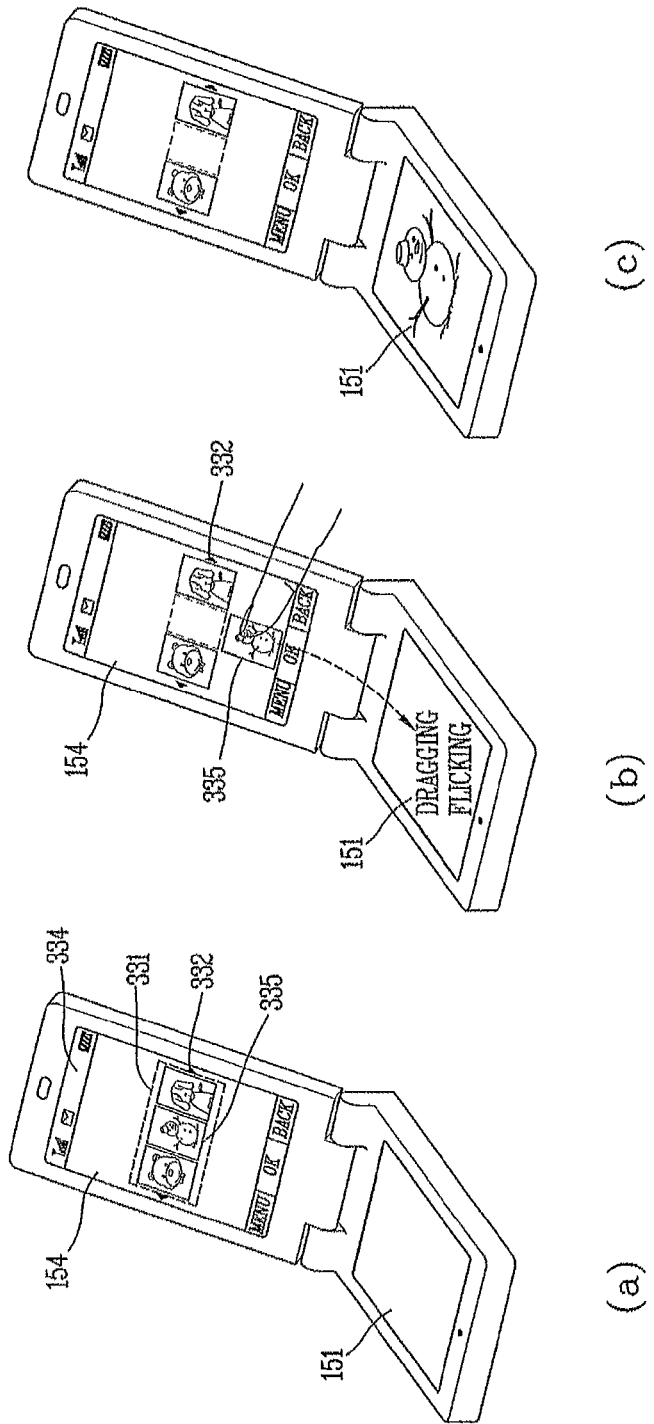

Next, a method for controlling a display provided at each type of mobile terminal will be described representatively with reference to a folder-type mobile terminal shown in FIG. 39. As shown in FIG. 39, in the mobile terminal having the TOLED 154 and LCD 151 separately provided, the controller 180 can display a screen for executing a photo album on the TOLED 154. In addition, the controller 180 may display on the TOLED 154 the images 331, the software navigation keys 332, and the cursor 333 for selecting one of the images 331. The indicator 334 for indicating an operational state of the mobile terminal may also be displayed on the TOLED 154 as shown in FIG. 39.

In addition, the user can select one image (e.g., image 335) of the images 331 displayed on the screen for activating the photo album (see FIG. 39(a)), and drag or flick the selected image 335 in a direction from the TOLED 154 to the LCD 151(see FIG. 39(b)). Accordingly, the controller 180 can display the dragged or flicked image 335 on the LCD 151 as a preview image (see FIG. 39(c)). Also, the controller 180 can change the selected image 335 to be an idle screen image of the LCD 151. In addition, the controller 180 can provide an animation effect that the selected image 335 is moved onto the LCD 151 to be then unfolded. FIGS. 40-44 illustrate the touching and dragging (or flicking) operation being performed on different types of mobile terminals.

Also, one embodiment of the present invention may separately provide a function key (hereinafter referred to as a screen switching function key) for switching contents respectively displayed on the TOLED 154 and the LCD 151. The screen switching function key may have a toggling function. Also, the screen switching function key may be configured as a software key (or an execution icon) at one side (e.g., an indicator region or the like) of the TOLED 154 or be provided as a hardware key.

Upon selecting the screen switching function key, the controller 180 can change an icon shape of the screen switching function key, and simultaneously switch contents respectively displayed on the TOLED 154 and the LCD 151. That is, the controller 180 can indicate that the screen switching function key has been selected. Afterwards, when the screen switching function key is selected again, the controller 180 converts the screen switching function key into its original shape, and then switches one more time the contents respectively displayed on the TOLED 154 and the LCD 151.

A Method for Controlling a Touching Operation on the LCD and TOLED

The method for controlling the touching operation depends on overlapped states between the LCD 151 and the TOLED 154, including a completely overlapped state, a partially overlapped state and a completely separated state. The mobile terminal having the transparent display according to an embodiment of the present invention uses different touching operations according to the overlapped states between the LCD 151 and the TOLED 154.

FIG. 45 is an overview of a mobile terminal having a dual transparent display according to an embodiment of the present invention, which shows a method for controlling displays according to an overlapped state between the displays. Here, examples will be shown having a completely overlapped state (a), a partially overlapped state (b and c) and a completely separated state (d) between the LCD 151 and the TOLED 154.

Complete Overlapped State Between the LCD and TOLED

Figure 46A:
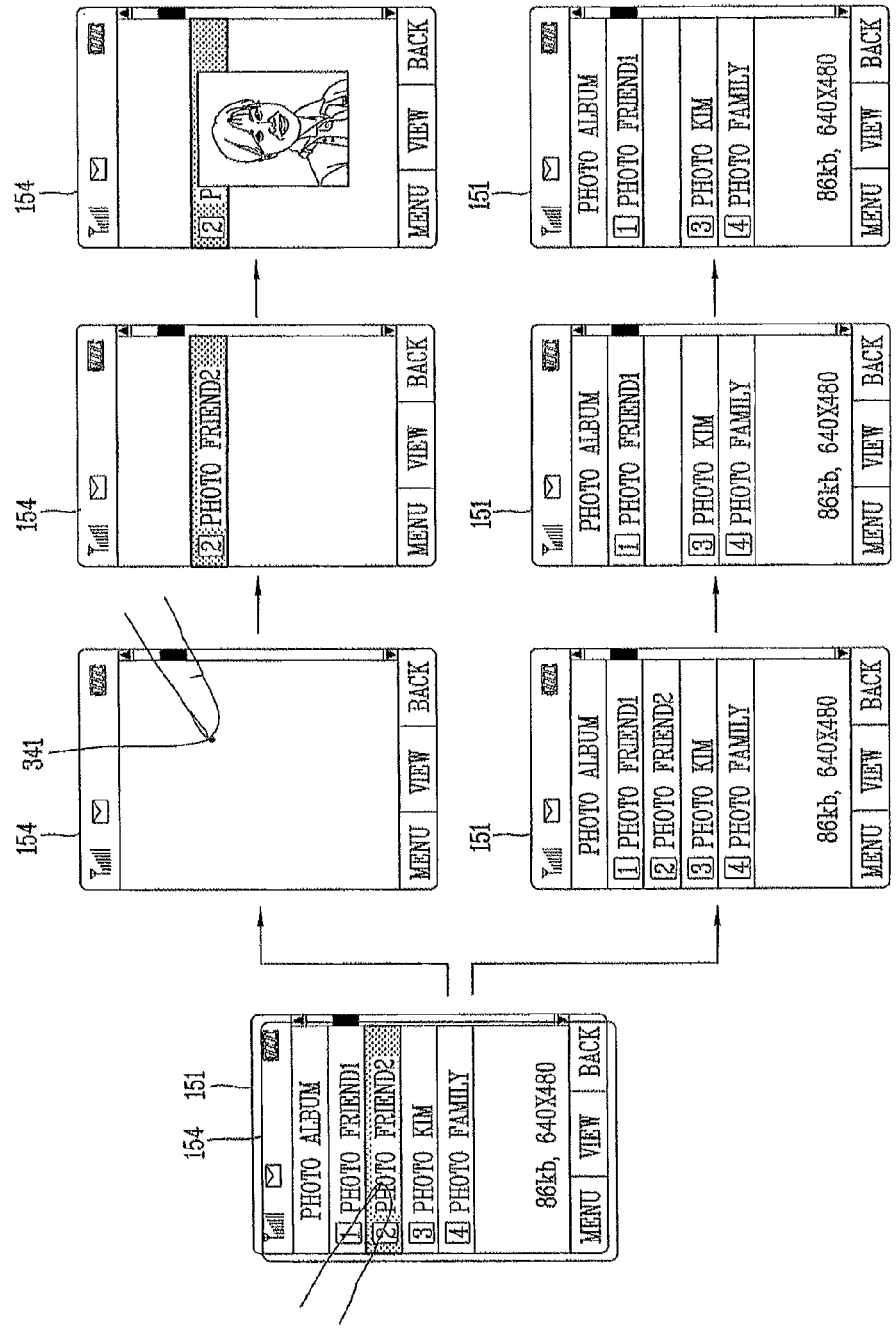

FIGS. 46A to 46C are overviews illustrating a method for controlling a touching operation in the completely overlapped state between each display shown in FIG. 45(a). Hereinafter, a touching operation sensed in the state that the TOLED 154 is completely overlapped on the LCD 151 will be described by being divided into a touch (or proximity-touch) operation, long touch operation, long touch & drag operation, and the like.

First, as shown in FIG. 46A, upon selecting a photo album function by a user, the controller 180 displays an image list on the LCD 151. Afterwards, when a touch (real touch) or proximity-touch is sensed from the exterior, the controller 180 selects an image corresponding to the corresponding touched point 341. Further, the controller 180 carries the selected image from the LCD 151 onto the TOLED 154 so as to display the selected image on the TOLED 154.

The mobile terminal according to an embodiment of the present invention may have various sensors for performing different sensing functions, and may further have a proximity sensor or tactile sensor provided in the sensing unit 140 for sensing the proximity-touch. As shown in FIG. 46B, if the external touch sensed is a long touch (e.g., a touch lasted for at least two or three seconds), the controller 180 runs or executes the selected image and displays it on the TOLED 154. The long touch may also be used when selectively moving a desired object among objects displayed on the LCD 151 to the TOLED 154. In addition, when the TOLED 154 is displaying many unnecessary objects, a certain touch input may be made to move objects from the TOLED 154 to the LCD 151 for display.

If a dragging operation or action is also sensed together with the long touch from the exterior, the controller 180 may display a preview screen for an image selected by the long touch on the TOLED 154 as shown in FIG. 46C. Afterwards, a selection cursor (or selection bar) 342 of the LCD 151 is moved by the dragging action, and a selected image by the selection cursor 342 is then displayed on the preview screen. After the external touch is not sensed any more, an initial image selected by the long touch action is displayed. The touching operation (i.e., long touch+drag) of FIG. 46C may equally be applied to the case of sensing a sliding (e.g., an operation of proximity-touch corresponding to the dragging) together with a long proximity touch (e.g., proximity touch lasted for at least two or three seconds) from the exterior. Also, upon sensing any touching operation other than the above-mentioned ones, the controller 180 can operate as done in a general method of controlling a touching operation.

In addition, the method for controlling the touching operation in the completely overlapped state may be applied to all types of mobile terminals having the single display (e.g., folder-type, flip-type, slide-type, rotating-type (e.g., swivel-type or swing-type), bar-type, watch-type and the like all having the single display).

Partially Overlapped State Between the LCD and TOLED

Figure 47A:
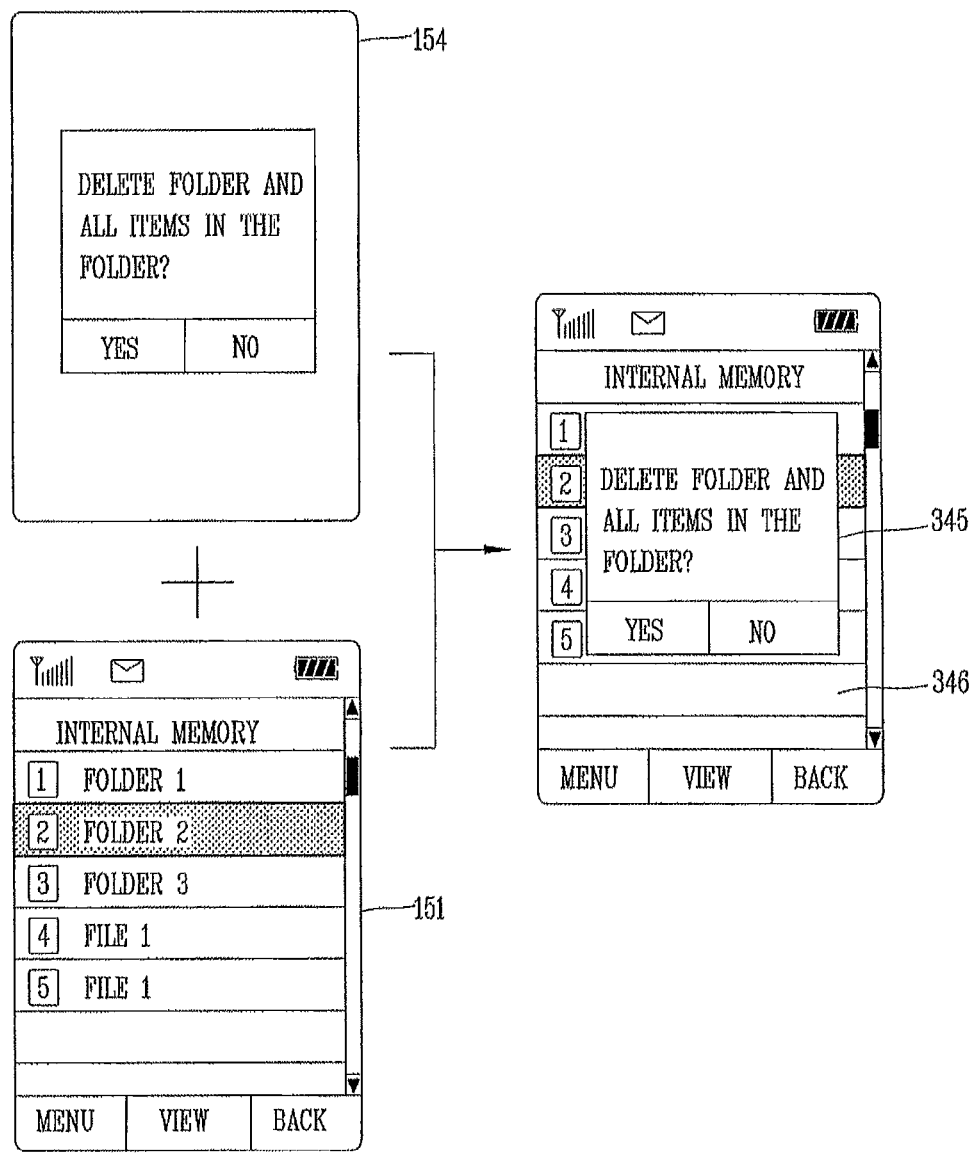
FIGS. 47A and 47B are overviews showing a method for controlling a touching operation under the state that the displays of FIG. 45 are partially overlapped with each other according to an embodiment of the present invention.
Figure 47B:
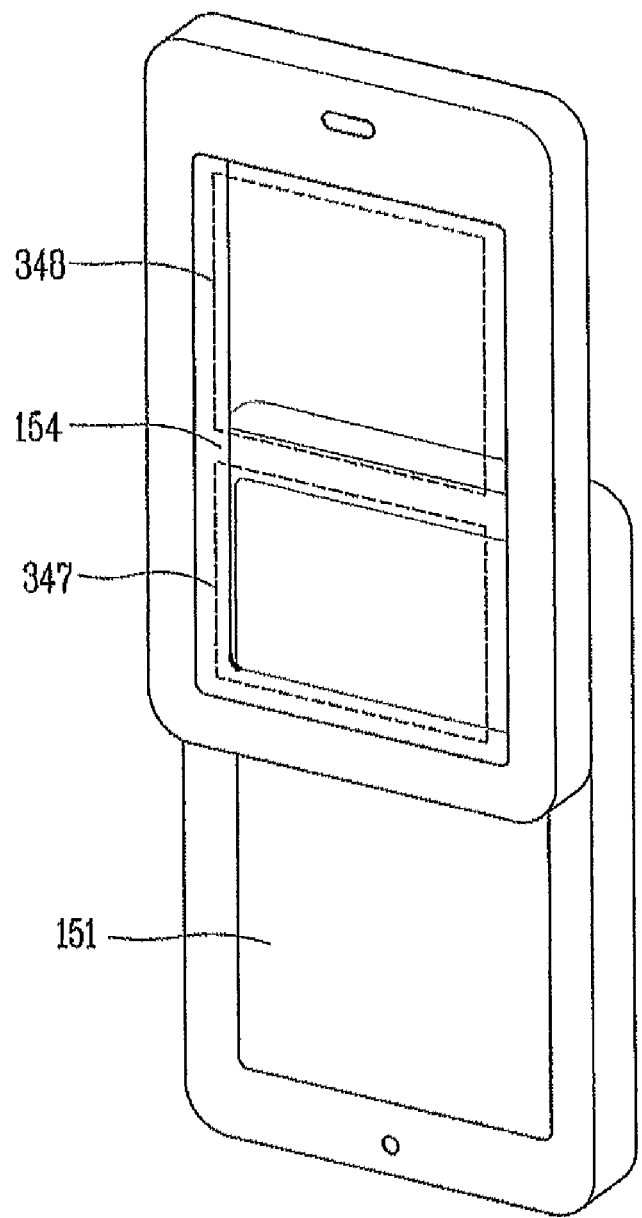

FIGS. 47A and 47B are overviews illustrating a method for controlling a touching operation in a partially overlapped state between each display. Hereinafter, a touching operation sensed in the partially overlapped state will be described by dividing the operation into a touch (or proximity-touch) operation, long touch operation, long touch & drag operation, and touch & drag operation.

FIG. 47A is an overview illustrating a pop-up selection window region of the TOLED 154. As shown in FIG. 47A, the controller 180 senses an external touch (real touch) or external proximity-touch. Upon sensing the touch, the controller 180 detects a touched point. That is, the controller 180 detects whether a pop-up selection window region has been touched or another region excluding the pop-up selection window has been touched, and thereafter performs a different processing according to the detected touched point.

For example, when a touch is sensed on the pop-up selection window region, the controller 180 may select a certain object (e.g., menu list, execution icon, or the like) and perform the function of the selected object. If the touch is sensed from the other region excluding the pop-up selection window, then the controller 180 may take no action or close or cancel the pop-up selection window.

FIG. 47B shows an overlapped region 347 and a non-overlapped region 348. As shown in FIG. 47B, if a long touch is sensed from the exterior, the controller 180 may perform a different processing depending on whether the touch is sensed on the non-overlapped region 348 or on the overlapped region 347. For example, when a touch is sensed on the non-overlapped region 348, the controller 180 may select a certain object (e.g., menu list, execution icon, or the like) and perform the function of the selected object. If a touch is sensed on the overlapped region 347, the controller 180 may apply the same method of controlling the touching operation as applied in the completely overlapped state.

Also, if a sliding of a proximity-touch is sensed together with the long proximity-touch from the exterior, the processing may be the same as that for the touching operation (i.e., long touch & drag). In addition, when a dragging is sensed together with a real touch from the exterior, the controller 180 may equally apply a method for controlling a touching operation in a separated state between the LCD 151 and the TOLED 154 which will be explained later. Even when a proximity-touch and a sliding of proximity-touch are sensed from the exterior, the controller 180 may equally apply the method for controlling the touching operation in the separated state between the LCD 151 and the TOLED 154.

As mentioned above, the method for controlling the touching operation in the partially overlapped state between the LCD 151 and the TOLED 154 can be applied to mobile terminals having a dual display (e.g., an open state of a slide-type mobile terminal, an open state of a rotating-type (e.g., swivel or swing type) mobile terminal and the like).

Completely Separated State Between the LCD and TOLED

Hereinafter, a description will be given of a touching operation sensed in the completely separated state between the LCD 151 and TOLED 154 by being divided into a touch (or proximity-touch) operation, a long touch operation, a long touch & drag operation, and the like. Thus, when a real touch (or proximity-touch) or long touch is sensed from the exterior, the controller 180 may select a certain object (e.g., menu list or execution icon) located at the corresponding touched point of the TOLED 154 and perform the function of the selected object.

If a dragging action is sensed together with the real touch from the exterior, the controller 180 may select or move the touch-selected object (e.g., menu list or execution icon) and perform the function of the selected object. For example, the TOLED 154 is allowed to display copied contents (or contents in a clipboard), and such contents are attached onto the LCD 151 by the aforementioned operation (i.e., touch & drag action).

As another example, such operation (i.e., touch & drag) is performed to move the object displayed on the TOLED 154 onto the LCD 151. As still another example, such operation (i.e., touch & drag) is performed to enlarge (or reduce) a webpage on the LCD 151, to thusly be displayed on the TOLED 154. Further, a scroll operation may also be available. Also, when a touching operation other than the above-mentioned operations is sensed, the controller 180 may operate the same as done in the general method of controlling a touching operation.

As mentioned above, the method for controlling the touching operation in the separated state between the LCD 151 and the TOLED 154 can be applied to mobile terminals having a dual display (e.g., an open state of a folder type mobile terminal, an open state of a flip type mobile terminal, an open state of a bar type mobile terminal, an open state of a watch type mobile terminal and the like).

Control Method Related to Setting of the LCD and TOLED

One embodiment of the present invention may be configured to generate a separate vibration feedback or sound feedback according to which one of the LCD 151 and TOLED 154 is manipulated. Thus, by differently setting the vibration feedback or sound feedback for the LCD 151 or TOLED 154, it is possible to recognize which display (LCD 151 or TOLED 154) a user has manipulated. For example, in the completely (or partially) overlapped state between the LCD 151 and the TOLED 154, if a user's touch (e.g., a real touch or long touch) is sensed, the controller 180 controls the operation of the LCD 151 or TOLED 154 according to the type of touch input (or according to a user's purpose). Also, the controller 180 may generate different vibration or sound feedbacks when controlling the operation of the LCD 151 and the TOLED 154.

Also, one embodiment of the present invention is configured such that a transmittance, color or brightness of the TOLED 154 can be set according to peripheral circumstances. In order to prevent information displayed on the TOLED 154 from being obscured due to a background reflected on the TOLED 154, the color or brightness of the TOLED 154 can also be controlled according to the peripheral circumstances.

Furthermore, when providing a camera or solar cell at a rear surface of the TOLED 154, in order to solve a problem that the operation of the camera or solar cell is affected by information displayed on the TOLED 154 or transmittance thereof, the transmittance can selectively be controlled with respect to a certain region of the TOLED 154. In addition, the vibration (or sound) feedback related to the TOLED 154 and the control of the transparency, color or brightness of the TOLED 154 according to the peripheral circumstances may automatically be performed by the controller 180 based upon a preset algorithm, or directly be set by a user through an environment setup option.

Concepts of Main/Sub Window of the LCD and TOLED

As discussed above, the present invention can operate displays such that the LCD 151 and the TOLED 154 can operate as a main window (or first window) and a sub window (or second window). For better understanding of a displaying method employing such concepts of the main/sub windows, an Internet browsing method will be described as one example. Further, the main and sub windows may be applied to a mobile terminal having a dual display (e.g., folder-type, slide-type, rotating-type (e.g., swivel-type, swing-type), watch-type or the like).

Figure 48:
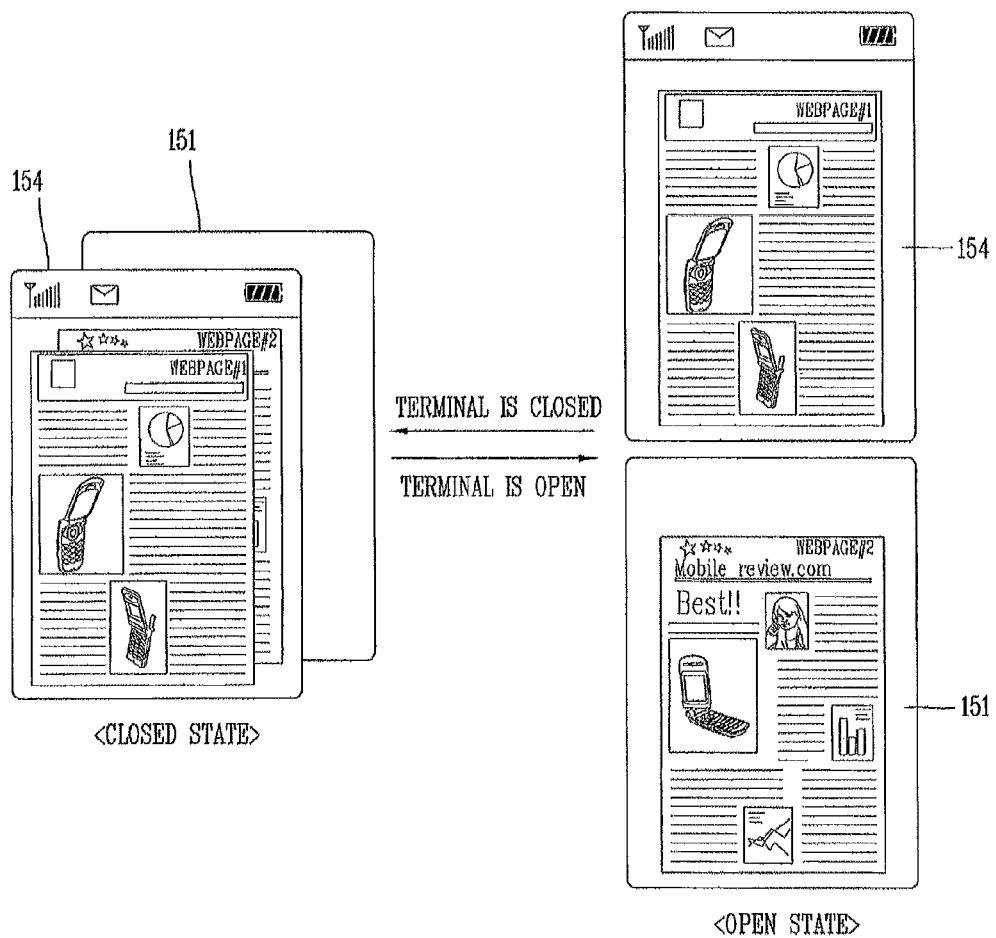
FIG. 48 is an overview showing a web browsing method for describing a main/sub window operation method in a mobile terminal according to an embodiment of the present invention.

FIG. 48 is an overview of a web browsing method for showing a method of operating main and sub windows in a mobile terminal according to an embodiment of the present invention. As shown in FIG. 48, a webpage (e.g., a main webpage) first opened when executing a web browser may be displayed on a main window (e.g., the TOLED 154), and a webpage or pop-up page linked to the first-opened webpage may be displayed on a sub window (e.g., the LCD 151).

Such webpages displayed on the main or sub windows may be displayed in an opposite window according to the environment setup option. Alternatively, when using any one of two displays provided in the mobile terminal, a webpage displayed on a display (e.g., sub window) disposed at a lower side of the mobile terminal may be moved to a display (e.g., main window) disposed at an upper side of the mobile terminal, thereby being displayed on the moved display. For example, upon closing the mobile terminal, a webpage displayed on a sub window may be moved to and displayed a main window.

Figure 49A:
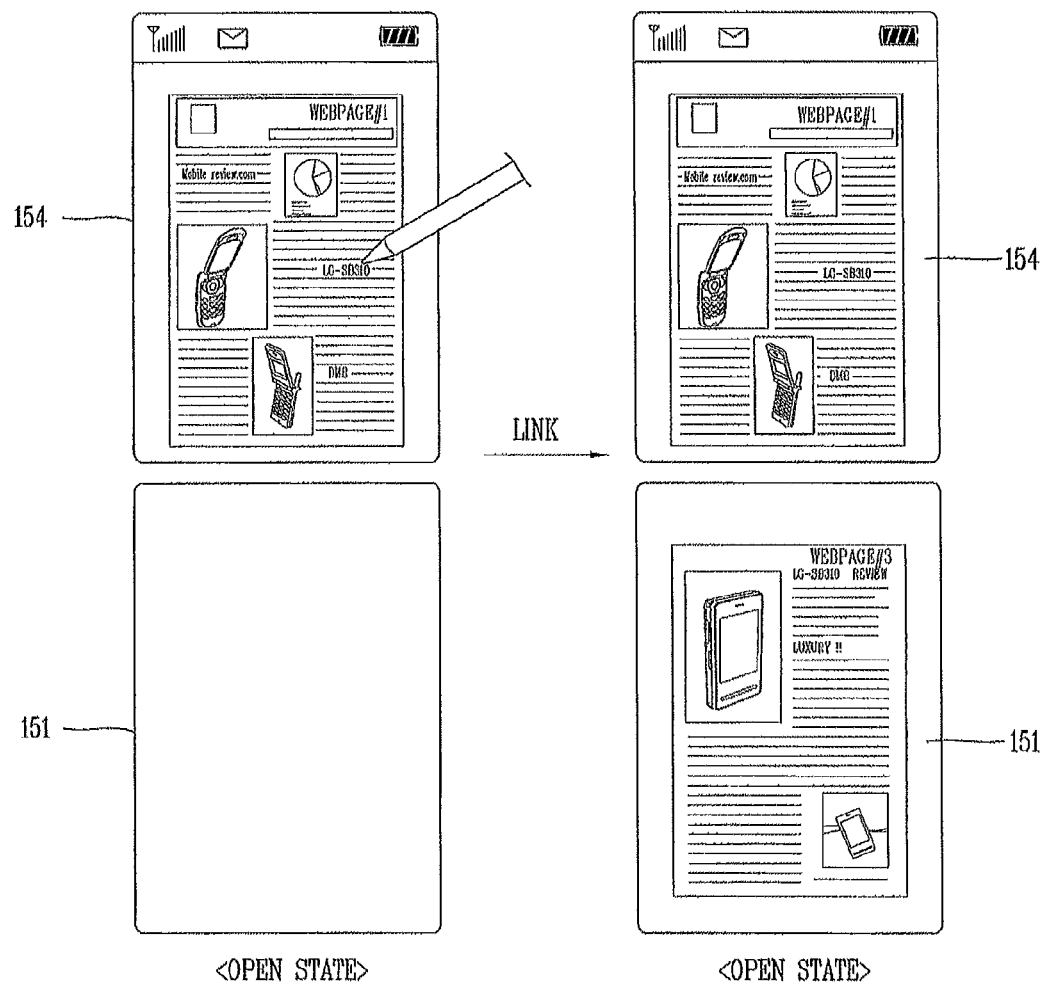
FIGS. 49A and 49B are overviews showing a method for displaying a webpage in cooperation with a main/sub window operation method in a mobile terminal according to an embodiment of the present invention.
Figure 49B:
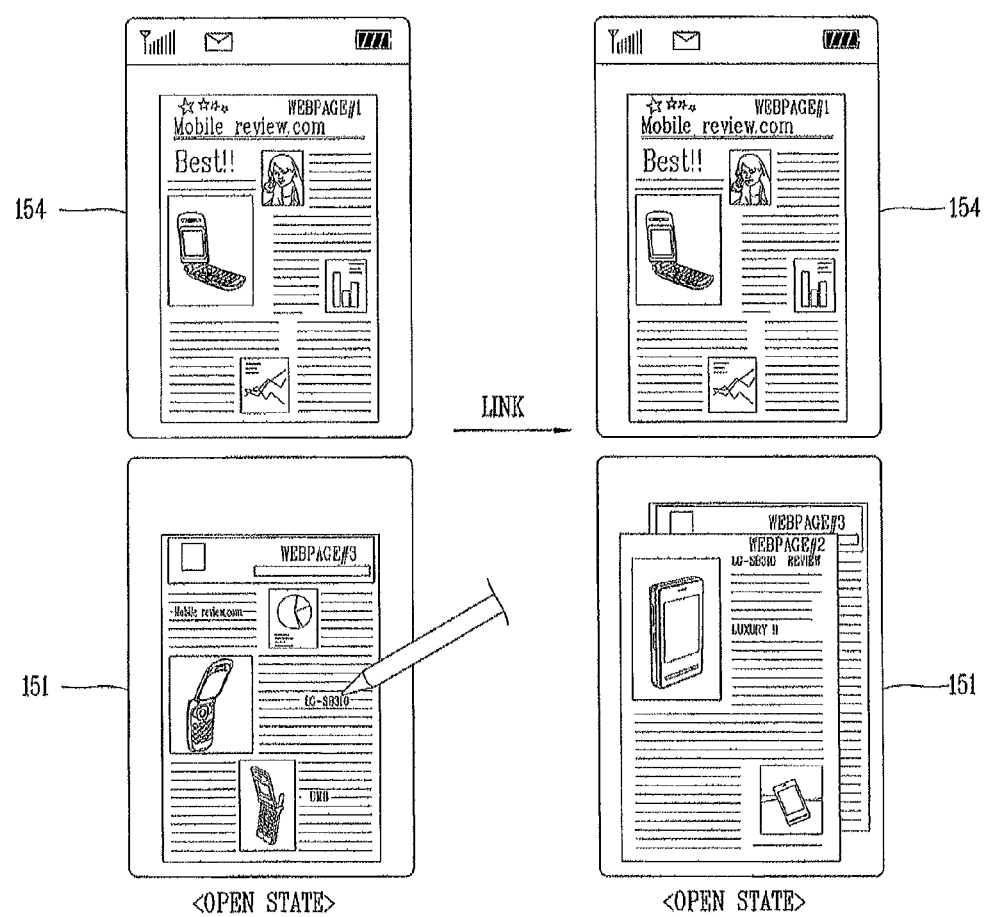

FIGS. 49A and 49B are overviews illustrating a method for displaying a webpage according to a method of operating main and sub windows in a mobile terminal according to an embodiment of the present invention. As shown in FIG. 49A, if a certain text (or certain object) on a webpage #1 displayed on a main window (e.g., the TOLED 154) is selected by a user's touch input (or proximity-touch), the controller 180 may display a webpage (e.g., webpage #3) linked to the text on a sub window (e.g., the LCD 151).

In the state that the sub window (e.g., the LCD 151) is displaying the webpage #3, as shown in FIG. 49B, if a certain text (or object) on the webpage #3 is selected, the controller 180 may display a webpage (e.g., webpage #2) linked to the selected text on the sub window (e.g., the LCD 151), as well as the webpage #3. Further, the main and sub windows may be converted by a user's selection, and also contents displayed on each window may be converted.

In addition, if the user's input is a proximity-touch and touch is sensed on a certain content (e.g., text, English word, image, video, flash or the like) displayed on a main window (e.g., the TOLED 154), the controller 180 may display information related to the corresponding content on a sub window (e.g., the LCD 151). Also, if the proximity distance sensed becomes farther away, the sub window can return to its initial state.

Display Control According to an Open/Closing Operation of the Mobile Terminal

An open/closing operation of a mobile terminal denotes an opening or closing of the mobile terminal, namely, an operation of folding, sliding or rotating (swiveling or swinging) one body of a mobile terminal having at least two bodies, such as folder-type mobile terminal, flip-type mobile terminal, slide-type mobile terminal, rotating-type (swivel or swing-type) mobile terminal, watch-type mobile terminal or the like.

Figure 50A:
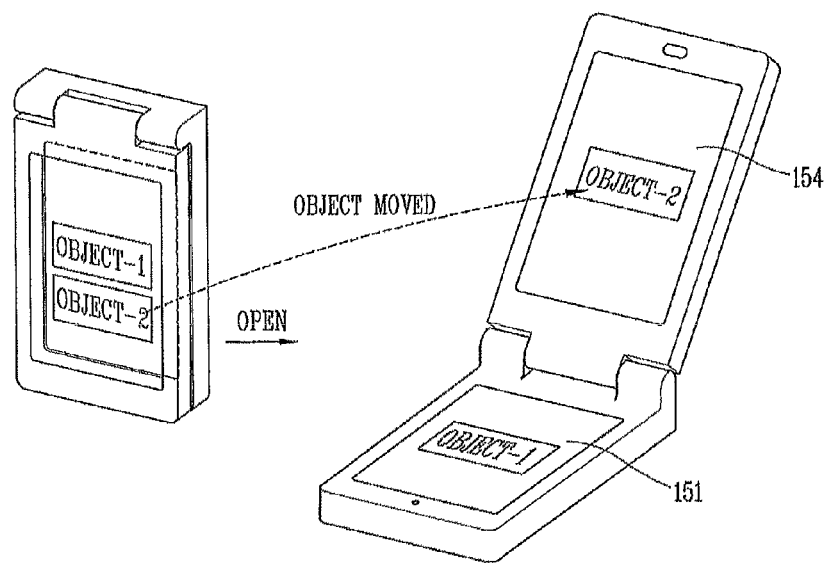
FIGS. 50A and 50B are overviews showing a method for moving a displayed object in cooperation with an open/closing operation of a mobile terminal having a dual transparent display according to an embodiment of the present invention.
Figure 50B:
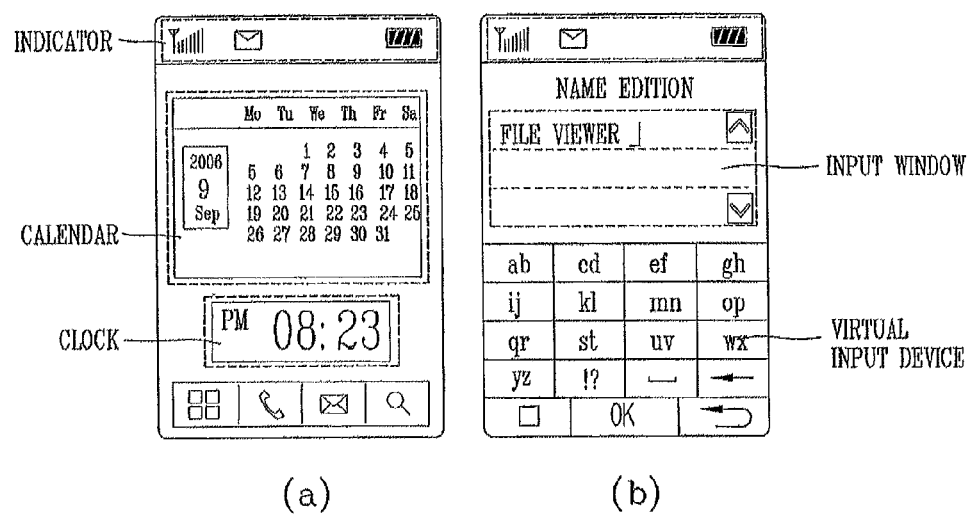

FIGS. 50A and 50B are overviews illustrating a method for moving a displayed object in cooperation with an opening/closing operation of a mobile terminal having a dual transparent display according to an embodiment of the present invention. Upon closing a mobile terminal having the LCD 151 and TOLED 154, information (or objects) displayed on each of the displays are overlapped with each other. Such overlapped information are then displayed on any one of the two displays. Hereinafter, a display having the overlapped information displayed thereon is referred to as 'main display'.

When the mobile terminal is open, the controller 180 moves and displays a part of object displayed on the main display (e.g., the LCD 151) onto a sub display (e.g., the TOLED 154). As such, an object which is moved to each display for display in cooperation with the opening/closing of the mobile terminal is referred to as 'moving object'. The moving object may include an indicator, clock and calendar, as shown in FIG. 50B(a), and further include background memo, multitasking menu, input window and the like.

As shown in FIG. 62B(b), when being displayed on a sub display, an object such as a virtual input unit or device (e.g., keypad or wheel) may be overlapped with other objects on a main display, causing inconvenience of input. Thus, such object is preferably displayed on the main display. That is, the input window is small in size and difficult to be recognized at a glance, and thus it is displayed on the sub display in greater size. The positions of the virtual input device and the input window may be changed to each other for display.

Figure 51A:
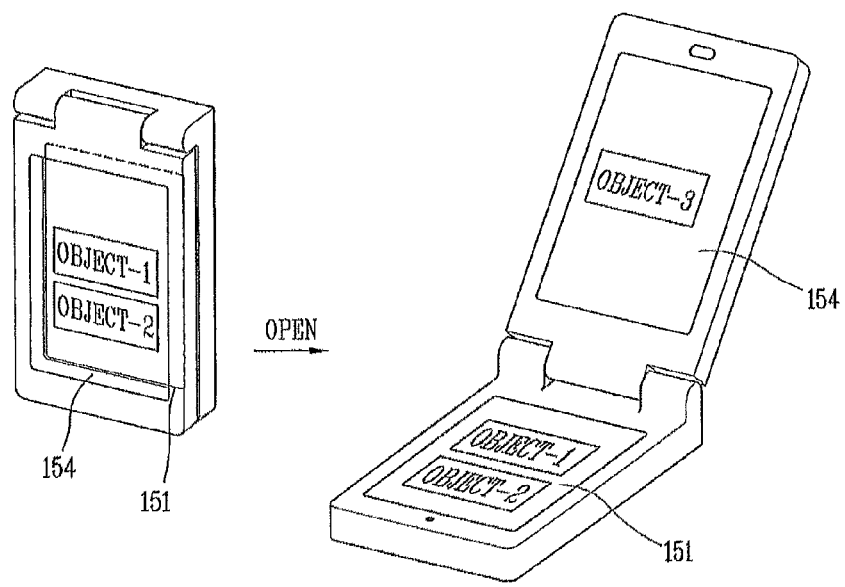
FIGS. 51A and 51B are overviews showing a method for generating a displayed object in cooperation with an open/closing operation of a mobile terminal having a dual transparent display according to an embodiment of the present invention.
Figure 51B:
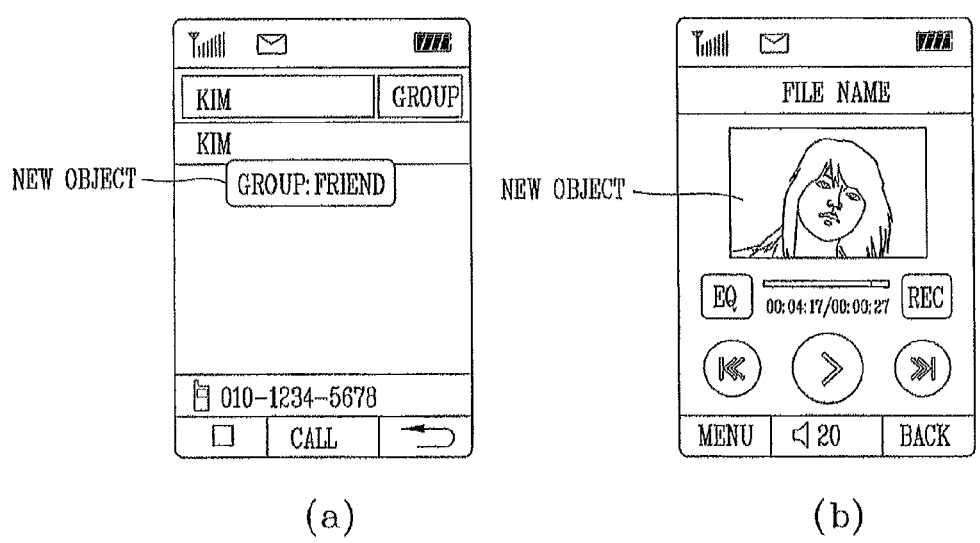
Figure 52:
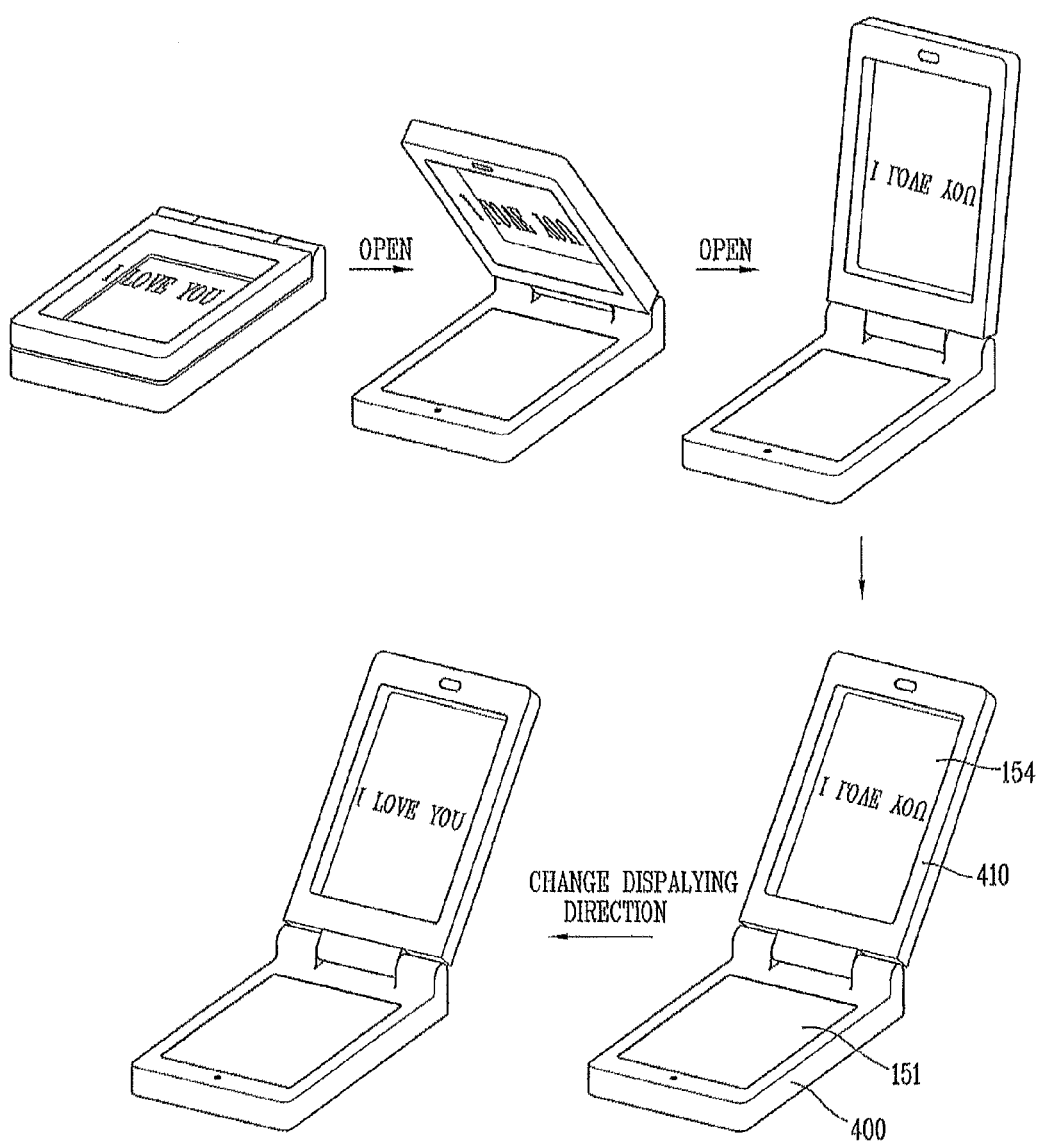
FIGS. 52 and 53 are overviews showing a method for changing an information display direction in a mobile terminal having a dual transparent display according to an embodiment of the present invention.
Figure 53:
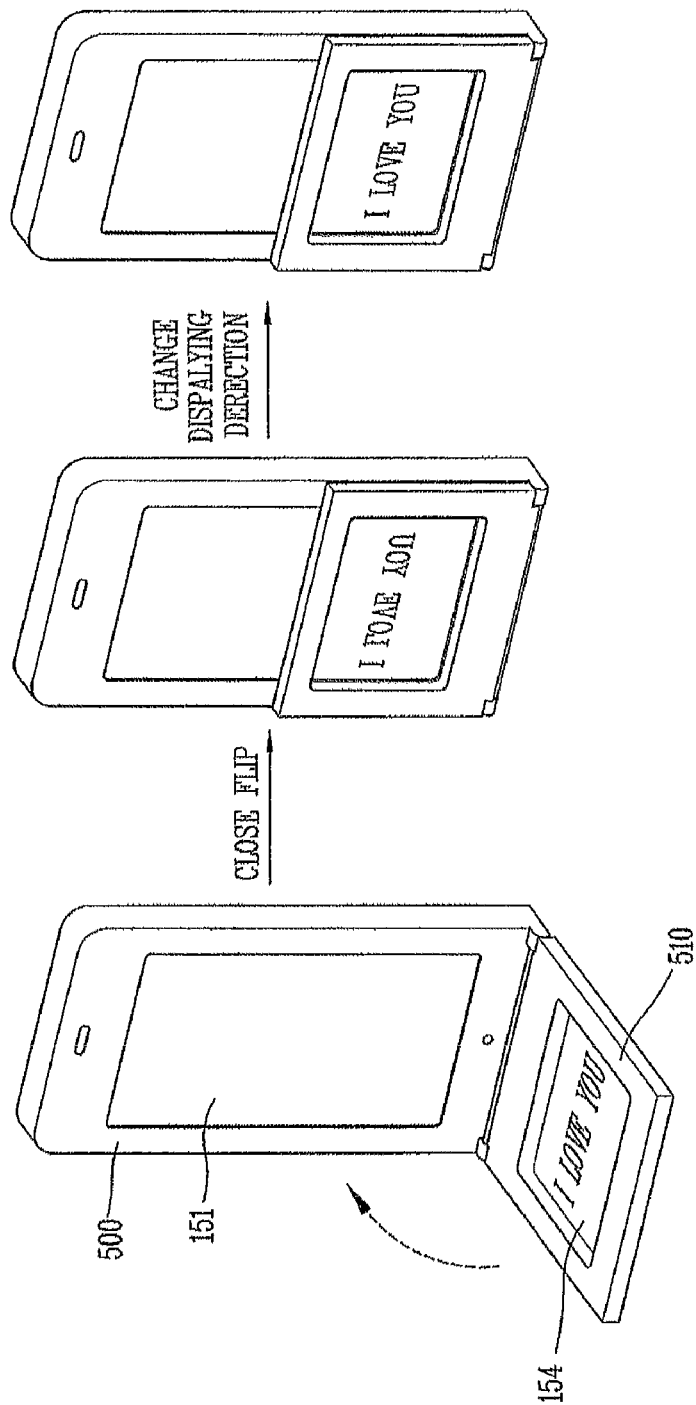
Figure 54:
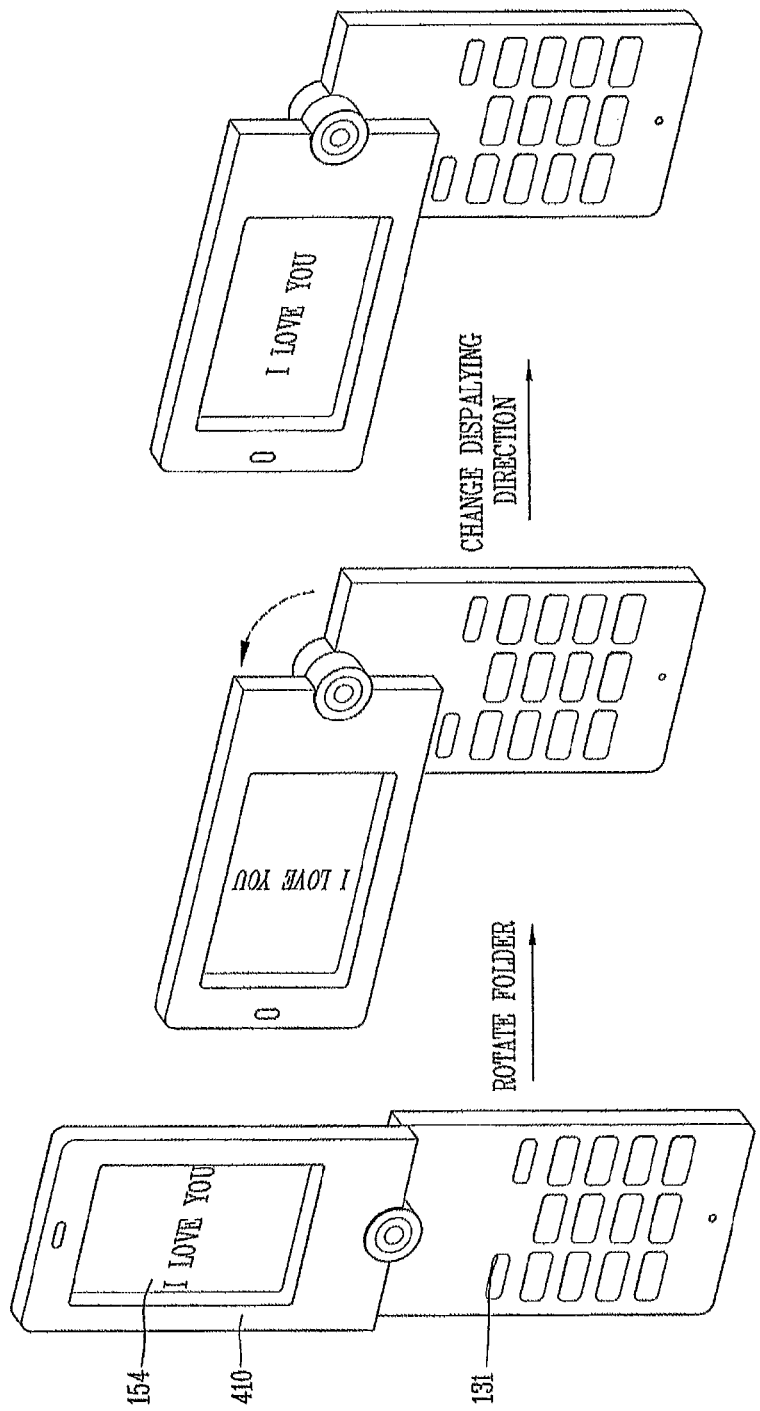
FIGS. 54 and 55 are overviews showing a method for changing an information display direction in a mobile terminal having a single transparent display according to an embodiment of the present invention.
Figure 55:
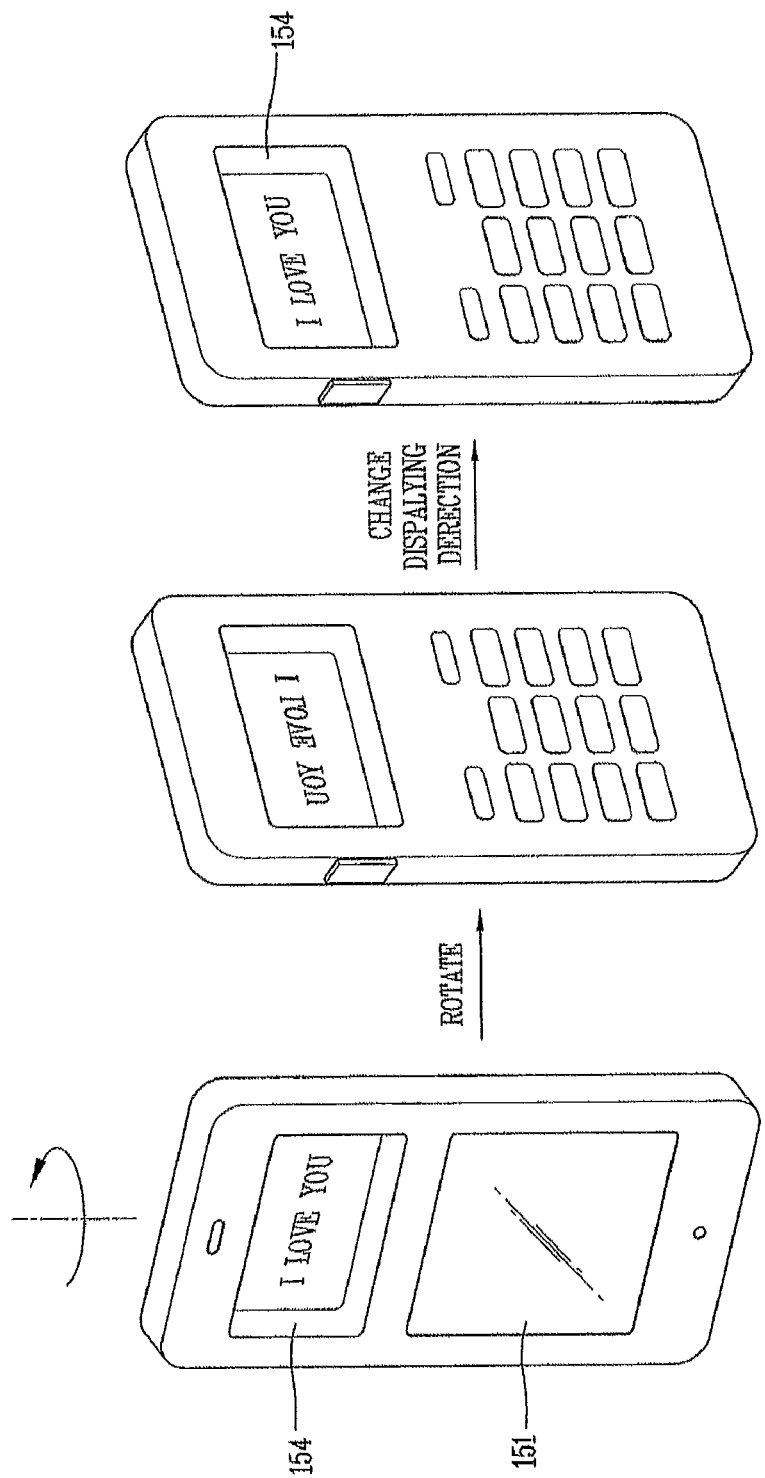

Next, FIGS. 51A and 51B are overviews illustrating a method for generating a displayed object in cooperation with an opening/closing of a mobile terminal having a dual transparent display according to an embodiment of the present invention. As shown in FIG. 51A, upon opening the mobile terminal, an object may be newly generated on a sub display (e.g., the TOLED 154). Such object is referred to as a new object. The new object is not displayed, for example, due to the lack of displaying space when two displays are overlapped with each other.

Then, when the two displays are separated after the mobile terminal is opened, the new object may further be displayed on a sub display (e.g., the TOLED 154). For example, as shown in FIG. 51B, such new objects may include detailed information (additional information) related to specific information, a sub menu for a specific list or multimedia player.

Change in Information Displaying Direction on Screen of Mobile Terminal

A mobile terminal having a transparent display according to an embodiment of the present invention may be configured such that information displayed on a display can be reversed (or rotated) suitable for a user's eye in cooperation with an opening/closing of the mobile terminal (or rotating operation thereof) so as to be displayed. FIGS. 52 to 55 are overviews illustrating a method for changing an information displaying direction in a mobile terminal having a transparent display according to an embodiment of the present invention, which respectively show a folder-type mobile terminal, flip-type mobile terminal, rotating-type (swivel-type or swing-type) mobile terminal and bar-type mobile terminal.

Each type of mobile terminal is configured such that information displayed on a display can be rotated or reversed suitable for a position (pose, posture) of the mobile terminal according to the same method. For example, the controller 180 senses when the folding portion 410 or flip portion 510 starts to be opened. When the folding portion 410 is opened by more than a certain angle, the controller 180 rotates or reverses information displayed on the folding portion 410. The certain angle may be set differently depending on manufacturers or designs of mobile terminals or based on user input.

If the mobile terminal is provided with a tilt sensor (or gyro sensor), a displaying direction of information displayed on any of two displays is changed according to the posture of the mobile terminal detected by the tilt sensor. For example, if the posture of the mobile terminal which was a vertical direction is changed into a horizontal direction, the information displaying direction of the mobile terminal can be changed from the vertical direction into the horizontal direction. Also, the mobile terminal according to the present invention may be provided with a separate software key (or hardware key) for allowing a user to selectively change the information displaying direction.

Automatic Execution of Specific Function based upon Opening/Closing of the Mobile Terminal When a mobile terminal in which a locking function has been set to protect private information or prevent others from using the terminal, the controller 180 automatically displays a pop-up window to allow an input of a password, and releases the locked state of the mobile terminal when an accurate password is input. When the locking function is not yet released, if the mobile terminal is closed again, the controller 180 closes the pop-up window to obtain the password. Further, when the locking function has been set in order to simply prevent an unintended touch input or to protect a screen, when the mobile terminal is opened, the controller 180 may automatically release the locked state without requiring a password input, and automatically reset such locking function when the mobile terminal is closed.

Next, FIG. 56 is an overview illustrating operations related to the movement of a displayed object executed in cooperation with the opening/closing of a mobile terminal having a dual transparent display according to an embodiment of the present invention, and more particularly, illustrating a function of automatically reflecting an image edited on the TOLED 154 onto an image displayed on the LCD 151.

As shown in FIG. 56(*a*), it is assumed that a folder-type mobile terminal is in a closed state and an image editor is being executed on the TOLED 154. Further, a user may refer to an image displayed on the LCD 151 which is transmitted through the TOLED 154, and draw or edit a specific image (e.g., cap or hat image) related to the image (e.g., snowman image) displayed on the LCD 151 through the image editor.

Also, while the user draws or edits the image, such drawing operation may not directly affect the image displayed on the LCD 151.

During the drawing operation, if it is sensed the folding portion 410 is open, the controller 180 can apply the drawn image on the TOLED 154 onto the image displayed on the LCD 151. For example, the cap or hat image is displayed (attached) onto the head of the snowman image displayed on the LCD 151. When the folding portion 410 is closed, the controller 180 can move the image back to the TOLED 154 (i.e., release the image). As such, the user can repeat the application and release an image during the drawing operation by opening or closing the folding portion 410. The user can also determine if the drawn image is correctly disposed over the image on the LCD 151 and drawn as desired. The controller 180 may also keep the drawn image on the LCD 151 based on a preset condition, user input, tactile input, etc. That is, once the user is satisfied with the drawn image, the user can input a preset condition to instruct the controller 180 to maintain the drawn image on the LCD 151.

In addition to the above-mentioned functions, a mobile terminal according to embodiments of the present invention can output information associated with dually executed functions through a dual display (e.g., the TOLED 154 and the LCD 151). For example, the mobile terminal may output both navigation and a digital multimedia broadcast, perform both navigation and web browser functions, perform a dual electronic book (e-BOOK) function, display an original picture during picture edition, automatically display a list of devices for transmission, display a dual webpage, and the like.

Display Controlling Method for Saving Power

A mobile terminal according to an embodiment of the present invention may also control the TOLED 154 according to external environments, such as a peripheral illumination, peripheral color, time slot and the like. In more detail, the mobile terminal may adjust a background transparency of the TOLED 154 according to the peripheral illumination sensed by an illumination sensor. For example, when the peripheral illumination increases, the mobile terminal decreases the background transparency of the TOLED 154, whereas increasing the background transparency when the peripheral illumination decreases.

In addition, the mobile terminal my sense the peripheral color by a color sensor and an image sensor. Accordingly, if a color which is equal to the sensed peripheral color exists in an information object displayed on the TOLED 154, the mobile terminal may adjust a brightness and saturation of the corresponding color. The mobile terminal may also adjust the background transparency of the TOLED 154 according to time slots. For example, the mobile terminal may decrease the background transparency of the TOLED 154 in a daytime slot having a higher peripheral illumination, while increasing it in a nighttime slot having a lower peripheral illumination.

A method for displaying information on a transparent display based on how the mobile terminal is placed according to an embodiment of the present invention will now be described. FIG. 1 will also be referred to in this description.

Figure 57:
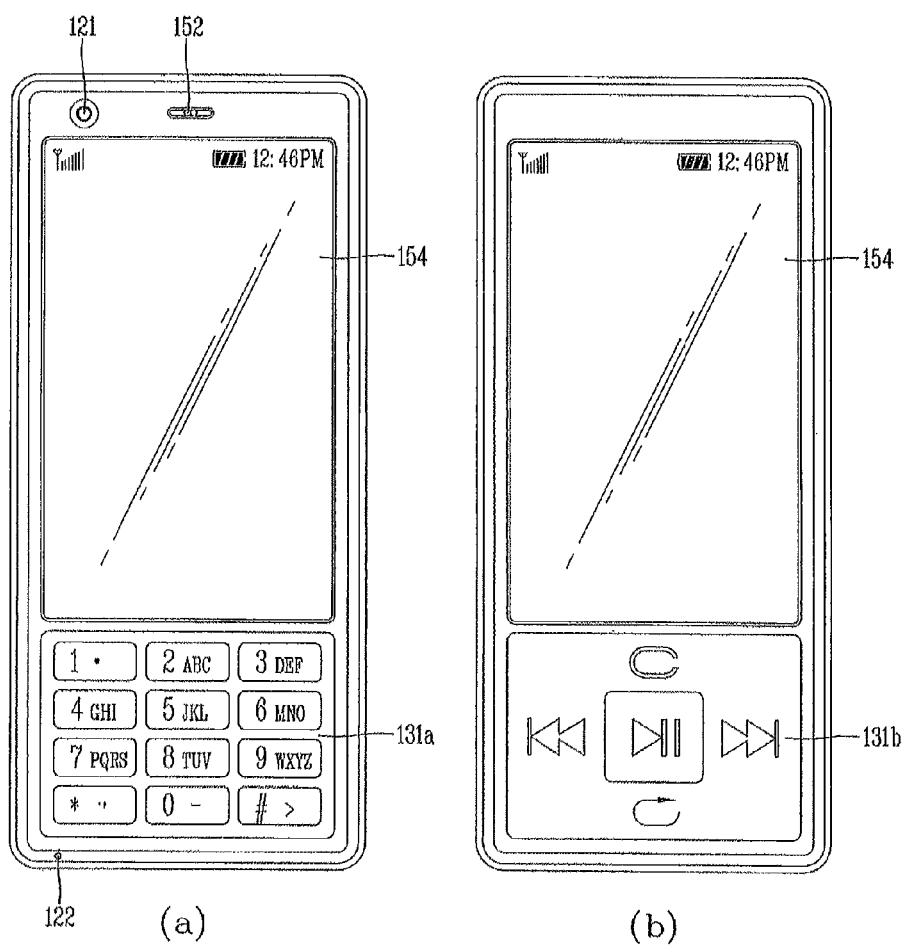
FIG. 57 is an overview showing bar type mobile terminals having a transparent display according to an embodiment of the present invention.

FIG. 57 is an overview showing bar type mobile terminals having a transparent display according to an embodiment of the present invention. As shown, the mobile terminal 100 includes a body with a window penetratingly positioned in a forward/backward direction therein and the TOLED 154 installed at the penetration window. Further, the TOLED 154 has transparency such that information displayed on the screen can be viewed in both directions (i.e., in a forward and backward direction). That is, the TOLED 154 provides an effect as if a dual display is in use with a single display.

In addition, the TOELD 154 may be overlaid with a touch pad so as to be implemented to be a touch screen, and as such, the TOLED 154 may be used as an input device as well as as a display device. The touch pad may also be disposed on the front side and/or rear side of the TOLED 154. The mobile terminal 100 may include the first or second keypads 131a and 131b disposed at opposite sides of the body.

The first and second keypads 131a and 131b may also be disposed side by side with the TOLED 154 and may be implemented as a dome key and/or a touch pad. In other words, the first and second keypads 131a and 131b may be implemented as dome keys, or one or more of the first and second keypads 131a and 131b may be implemented as touch pads. In addition, the first and second keypads 131a and 131b may be implemented as different keypads. For example, the first keypad 131a disposed on the front face of the mobile terminal 100 may be implemented as a call keypad including keys for inputting numbers, characters, symbols, or the like, while the second keypad 131b disposed on the rear face of the mobile terminal 100 may be implemented to have a direction key and a multimedia keypad for inputting control commands such as a reproducing command, a stopping command, a section repetition command, a recording command, a volume command, or the like.

Figure 58A:
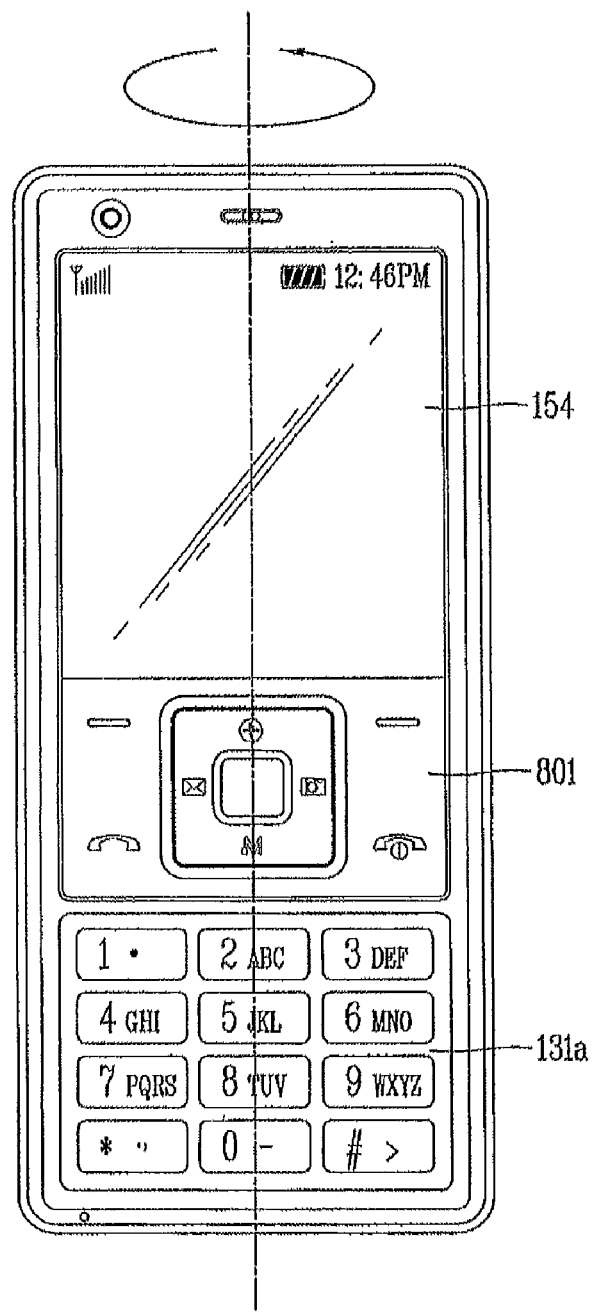
FIGS. 58A to 58C are overviews showing displaying of information on a transparent display of the mobile terminal according to an embodiment of the present invention.
Figure 58B:
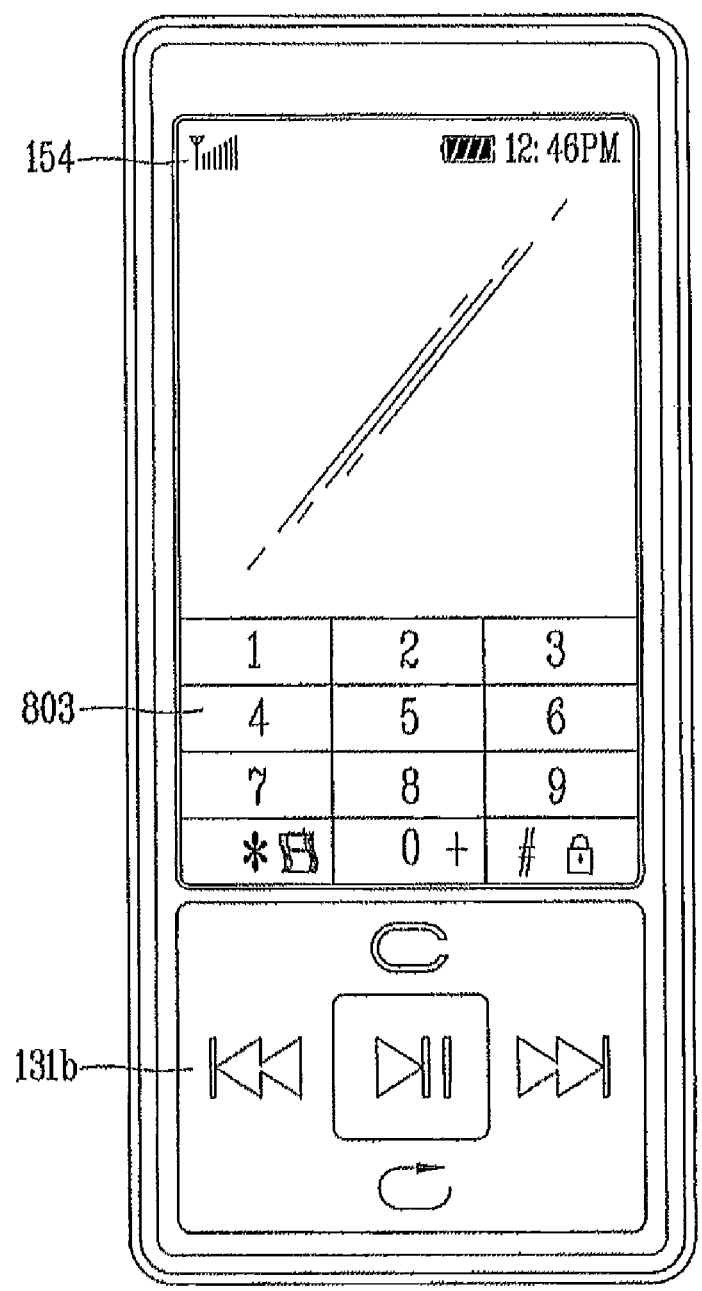
Figure 58C:
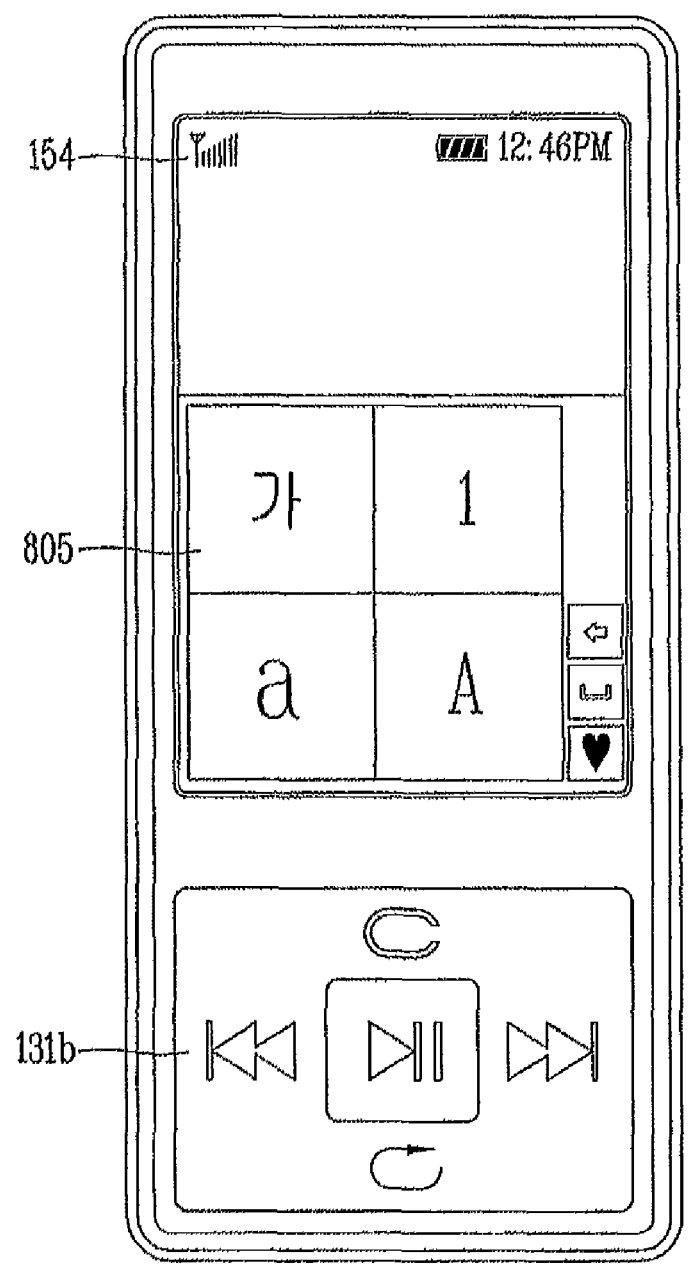

Next, FIGS. 58A to 58C are overviews showing information displayed on a transparent display of the mobile terminal according to an embodiment of the present invention. In this embodiment, a call keypad is disposed on the front face of the mobile terminal and the multimedia keypad is disposed on the rear face of the mobile terminal is given as an example.

As shown in FIGS. 58A to 58C, the mobile terminal 100 includes the TOLED 154 disposed on one surface (front surface) of the terminal and the first keypad 131a implemented as a call keypad at a lower side of the TOLED 154. Further, the second keypad 131b implemented as a multimedia keypad for inputting a control command regarding multimedia is additionally disposed at a lower portion of the TOLED 154 on another or opposite surface (rear surface) of the mobile terminal 100. In addition, the controller 180 displays icons (direction keys, keypad, function keys, etc.) for inputting a control command and data on the TOLED 154 according to how the terminal is placed.

With reference to FIG. 58A, when the mobile terminal 100 is positioned such that its front surface faces upward (e.g., faces the user), the controller 180 may display icons 801 including direction keys and function keys for performing some particular function or functions on the TOLED 154. As shown in FIG. 58B, if the mobile terminal 100 is positioned such that its rear surface faces upward (e.g., faces the user), the controller 180 may display a keypad icon 803 for inputting numbers, characters, symbols, etc., on the TOLED 154, or alternatively, as shown in FIG. 58C, may display a cursive script input region 805 for inputting text.

Figure 59:
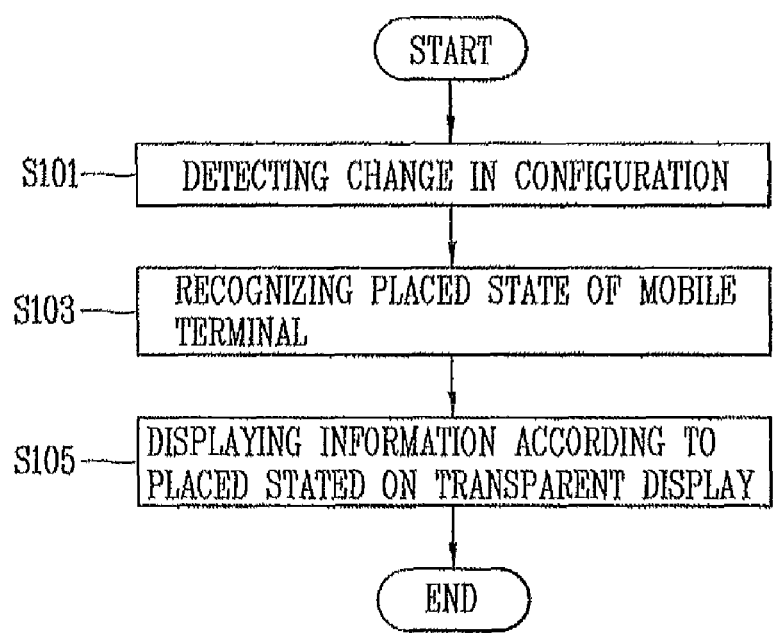
FIG. 59 is a flow chart illustrating a method for controlling a display direction of information of the mobile terminal having a transparent display according to an embodiment of the present invention.

Next, FIG. 59 is a flow chart illustrating a method for controlling a display direction of information of the mobile terminal having a transparent display according to an embodiment of the present invention. As shown, the controller 180 senses the movement of the mobile terminal 100 via the sensing unit 140 (S101). In addition, the sensing unit may include a tilt sensor for measuring a tilt and/or a gyro sensor for sensing a movement direction, acceleration, or the like. Thus, the sensing unit 140 senses the movement of the terminal such as rotation, movement, tilting, or the like, via the tilt sensor and/or the gyro sensor and transmits a corresponding sense signal to the controller 180.

The controller 180 then compares a current state of the terminal sensed by the sensor 140 with a previous state of the terminal, and if the current state of the terminal is different from the previous state, the controller 180 recognizes that the position of the terminal has been changed. In other words, the controller 180 recognizes a placed state of the terminal which has been changed according to the change in the movement of the terminal 100 as sensed by the sensing unit 140 (S103).

For example, the change in the movement of the terminal may be a change from the state in which the mobile terminal 100 is positioned with its front surface facing upwards to the state in which the mobile terminal 100 is positioned with its rear surface facing upward. The controller 180 then executes a particular operation mode previously set for the changed current state of the terminal, and displays a corresponding screen image on the TOLED 154 (S105). For example, as shown in FIGS. 58A to 58C, the controller 180 may display the icons regarding a call communication such as a direction key, a call key, an end key, or the like on the TOLED 154 or display the keypad icon or the cursive script input region for inputting data on the TOLED 154, according to how the mobile terminal 100 is placed.

Also, in this embodiment, the information display direction of the transparent display is controlled according to the movement (tilting, rotation and movement) of the terminal is taken as an example, but is not limited thereto. For example, the information display direction of the transparent display may be controlled according to an external input such as a touch, a proximity touch, a key input, or the like.

For example, when the first keypad 131a of the mobile terminal 100 is manipulated, information is displayed in a normal state on the TOLED 154 which comes on the same surface of the terminal body on which the first keypad 131a is disposed. The normal state refers to a state in which the information is displayed straight and direct on the TOLED 154 in a direction that the user views it. Namely, the normal state refers to a state in which information is displayed on the TOLED 154 without being reversed or rotated.

In the description below, the state in which the first keypad 131a of the mobile terminal 100 faces upward from the ground (e.g., faces the user) will be referred to as a first configuration, and the state in which the second keypad 131b faces upward (i.e., the first keypad 131a faces toward the ground) will be referred to as a second configuration.

Figure 60:
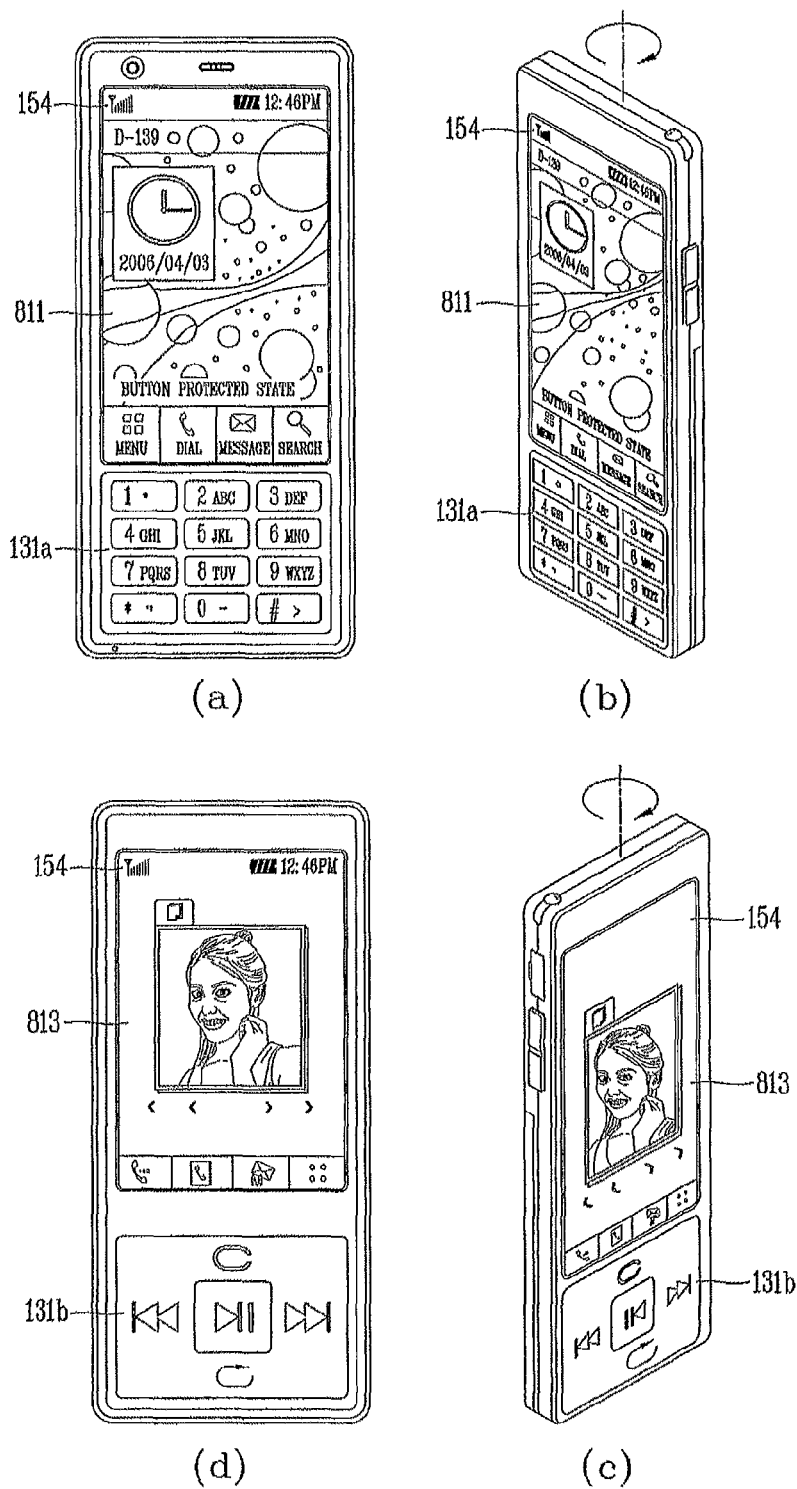
FIGS. 60 to 64 are overviews showing a method for displaying information on the transparent display of the mobile terminal according to an embodiment of the present invention.

Next, FIGS. 60 to 64 are overviews showing a method for displaying information on the transparent display of the mobile terminal according to an embodiment of the present invention. As shown in FIG. 60, when the mobile terminal 100 operates, the sensing unit 140 senses the movement of the terminal 100 and transmits a corresponding sense signal to the controller 180. Then, the controller 180 checks the configuration of the terminal 100 based on the transmitted sense signal.

If the controller 180 determines the terminal 100 is in the first configuration, the controller 180 may display a general standby screen image 811 on the TOLED 154 as shown in FIG. 60(a). Then, with the general standby screen image 811 displayed on the TOLED 154, when the mobile terminal is rotated in one direction based on a vertical axis of the terminal as shown in FIGS. 60(b) and 60(c), the sensing unit 140 senses the movement (rotation) of the terminal 100 and informs the controller 180 accordingly.

With reference to FIGS. 60(b) and 60(c), the information displayed on the TOLED 154 is changed according to the changing configuration of the terminal (e.g., the rotation of the terminal). In addition, the information displayed on the TOLED 154 is maintained until the mobile terminal 100 is rotated in one direction by a certain angle (e.g., 90°) and the screen of the TOLED 154 is parallel to the ground. Then, when the terminal 100 is rotated beyond the predetermined angle as shown in FIG. 60(c), the mobile terminal 100 detects the changed state and changes the screen image of the TOLED 154 to a multimedia standby screen image 813.

Further, the changed multimedia standby screen image 813 shown in FIG. 60(d) is displayed on the TOLED 154 until the mobile terminal 100 is again rotated or reversed to the positions shown in FIGS. 60(a) and (b). Also, in this embodiment, the mobile terminal 100 may change the display direction according to a change in its configuration such that the content displayed on the TOLED 154 is normally displayed.

Figure 61:
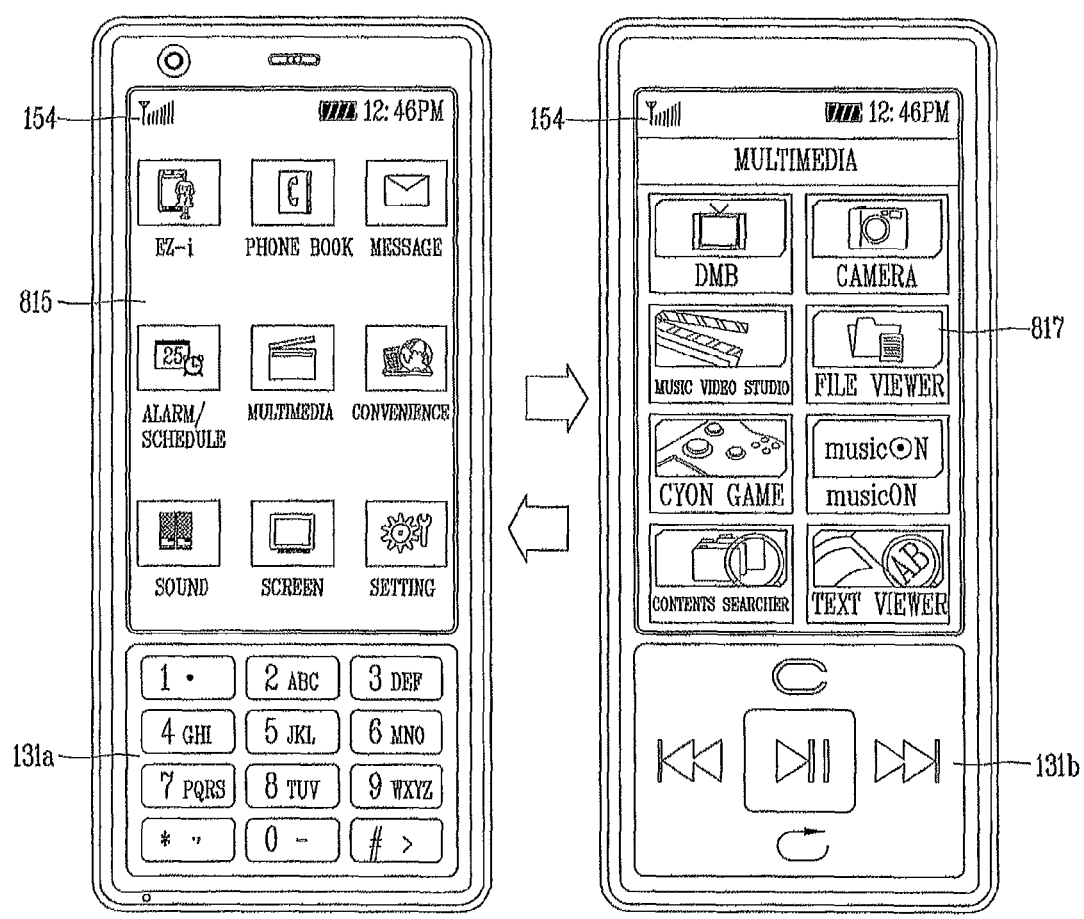

Next, with reference to FIG. 61, when the user selects a menu to execute a particular function, the mobile terminal 100 detects a current configuration of the terminal via the sensing unit 140. If the terminal 100 is in the first configuration, the controller 180 displays general main or top level menus 815 regarding a phone book, a message, an alarm/schedule setting, a screen setting, a sound setting, or the like, on the TOLED 154.

With the general main or top level menus 8145 displayed, when the mobile terminal 100 is reversed, the controller 180 detects the change in the configuration of the mobile terminal 100 via the sensing unit 140. When the controller 180 recognizes the mobile terminal 100 has been changed into the second configuration via the sensing unit 140, the controller 180 changes the general top level menus 815 displayed on the TOLED 154 to multimedia top level menus 817 regarding a broadcast, a camera, a game, or the like.

Figure 62:
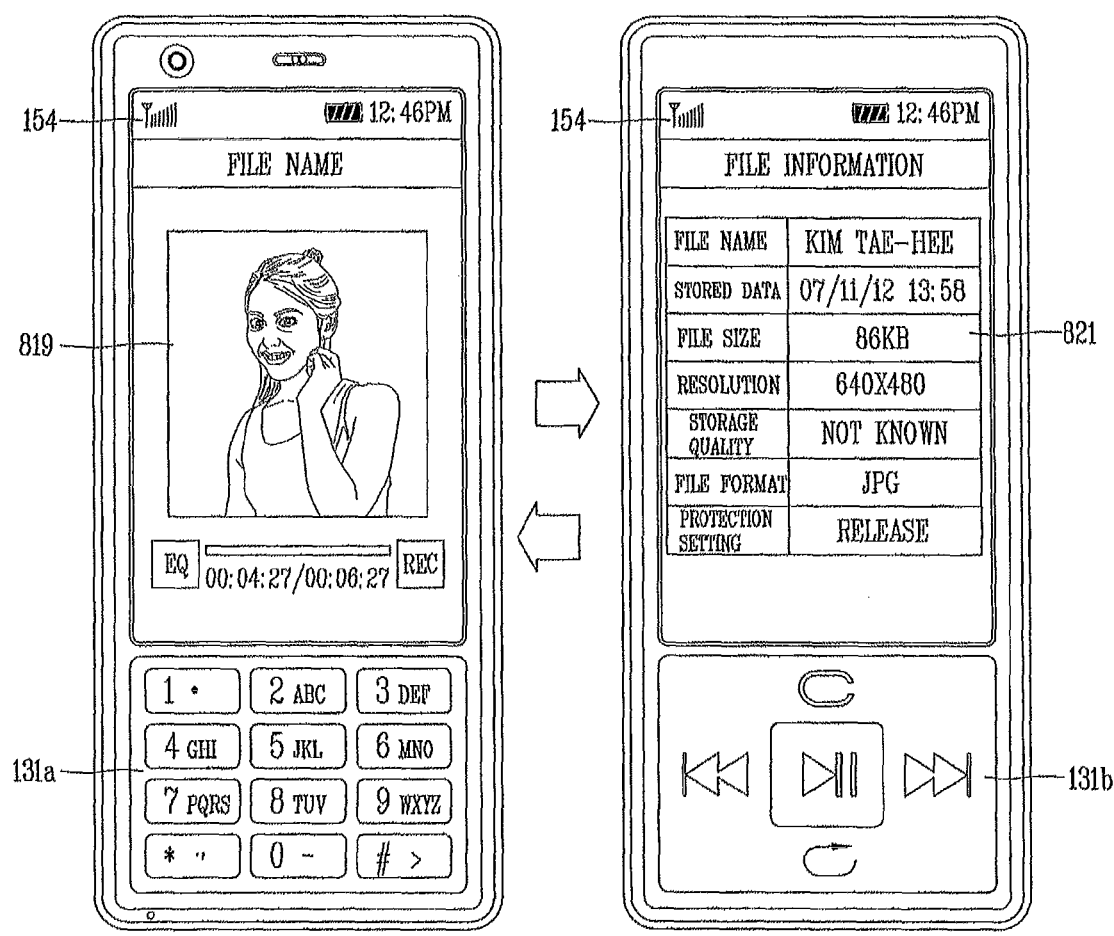

Also, with reference to FIG. 62, if the user wants to execute a multimedia file such as video or music file, the controller 180 displays a multimedia function execution screen image according to a user input. The multimedia function execution screen image includes a multimedia file list stored in the memory 160 of the terminal. Thus, the user can select one of the files to be played. When one or more files are selected from the displayed file list, the mobile terminal displays a reproduction screen image 819 for reproducing the selected file on the TOLED 154. Namely, when a video file is executed, video images reproduced by the multimedia module 181 of the mobile terminal 100 are displayed on the TOLED 154.

Then, when the user reverses the mobile terminal 100 while the multimedia file is being reproduced, the sensing unit 140 detects the movement of the mobile terminal 100 and transmits a corresponding sense signal to the controller 180. Upon receiving the sense signal, the controller 180 recognizes the configuration (positioned state) of the mobile terminal 100 according to the sense signal and displays detailed information 821 such as the file name, a stored date, a file size, resolution, a file format, or the like, of the file being played on the TOLED 154.

Figure 63:
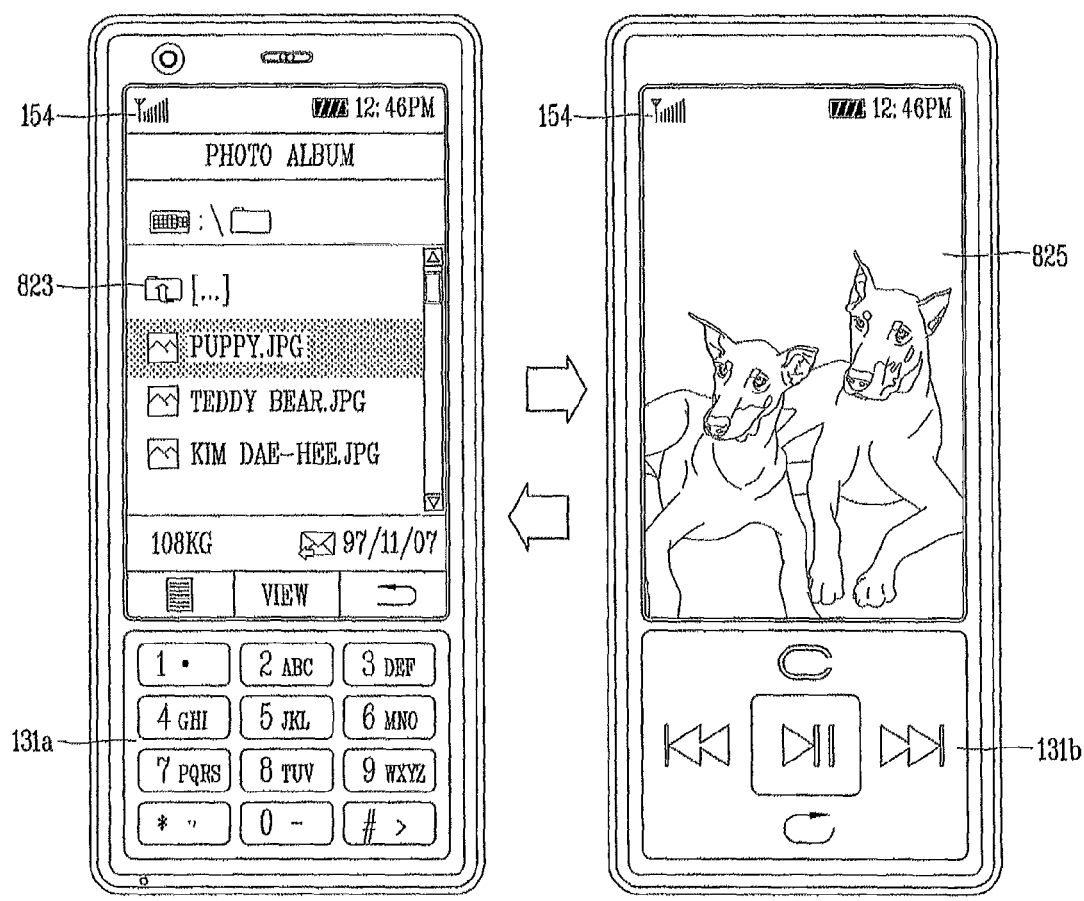

Next, with reference to FIG. 63, when a photo album is executed according to a menu manipulation by the user, the mobile terminal 100 displays a screen image 823 with a photo list on the TOLED 154. In one example, the photo list may be displayed in a thumbnail manner. Thereafter, when the user reverses the mobile terminal 100 in a state that one or more photos are selected from the photo list 823 displayed on the TOLED 154, the sensing unit 140 detects the change in the configuration of the mobile terminal 110 and informs the controller 180. As the controller 180 recognizes the changed configuration, it reproduces a photo which was selected in a previous configuration and displays the reproduced photo image 825 on the TOLED 154.

Figure 64:
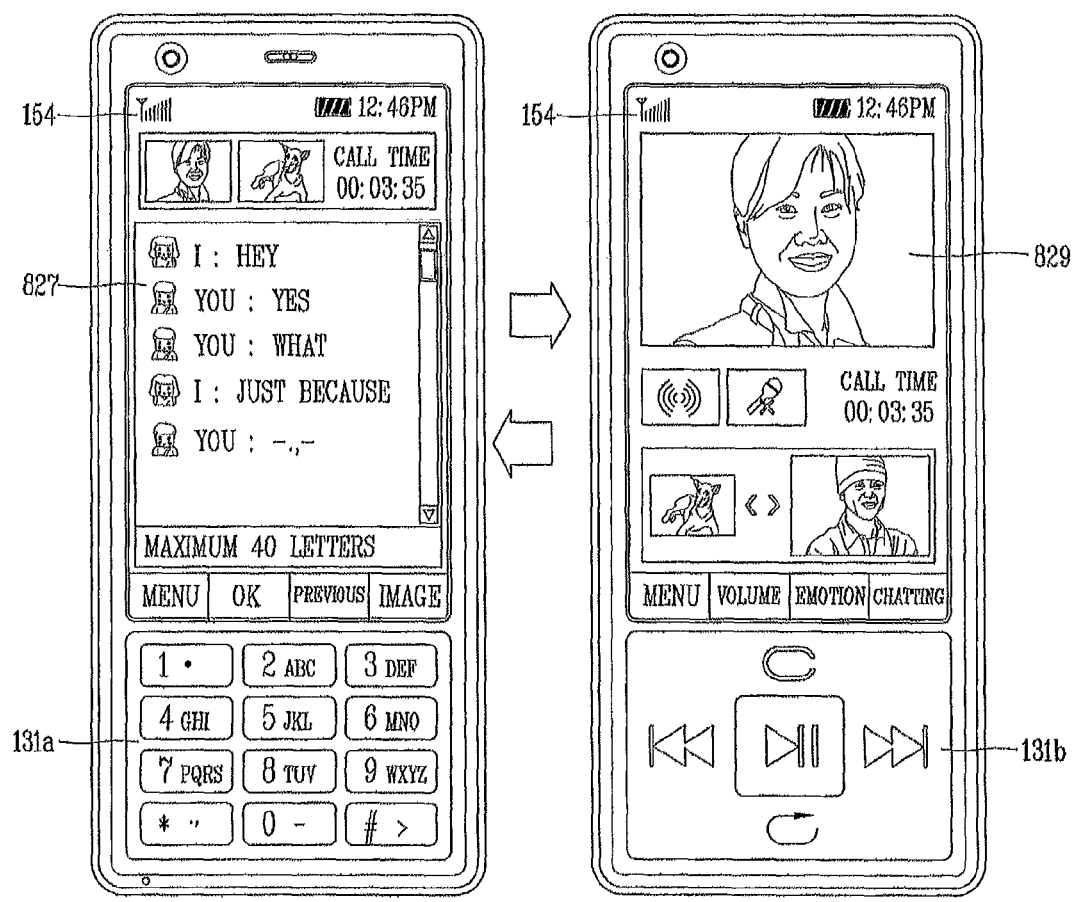

Similarly, with reference to FIG. 64, when the configuration of the terminal 100 is changed while the user performs video chatting, the controller 180 of the mobile terminal 100 detects the changed configuration. Upon detecting the change in the configuration of the mobile terminal 100, the controller 180 changes the operation mode from the video chatting mode to a video call mode, changes a video chatting screen image 827 to a video call screen image 829 according to the change in the operation mode, and displays it on the TOLED 154. Namely, the mobile terminals of the user and the other party mutually transmit images captured in real time and display the images captured in real time and images received from the other party on the TOLED 154. Also, if the image captured in real time is not desired to be transmitted, a substitute image such as a photo image, an animation character, or the like, may be transmitted.

Figure 65:
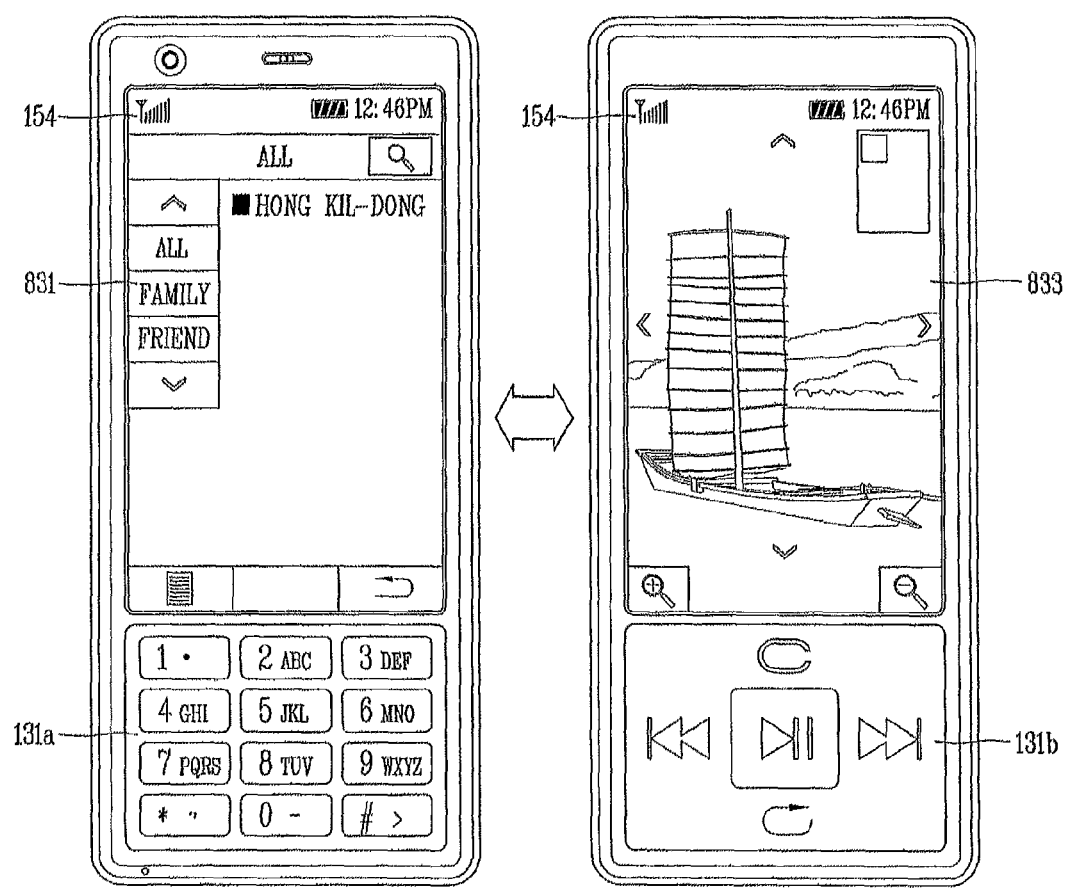
FIG. 65 is an overview showing an example of controlling the transparent display of the mobile terminal according to an embodiment of the present invention.

Next, FIG. 65 is an overview showing an example of controlling the transparent display of the mobile terminal according to an embodiment of the present invention. With reference to FIG. 65, when the user executes a phone book function through menu manipulation from a front surface of the mobile terminal 100, the controller 180 displays a phone book screen image 831 on the TOLED 154. In addition, in one example, the phone book screen image 831 includes a list of phone numbers stored in the terminal by group or by index.

Then, if the mobile terminal 100 is changed from the first configuration to the second configuration with the phone book list displayed on the TOLED 154, the controller 180 recognizes the changed configuration via the sensing unit 140 and displays a multimedia standby screen image on the TOLED 154. Then, when a camera function is selected through menu manipulation by the user on the multimedia standby screen, the controller 180 operates the camera 121 and captures an image of an object according to a user input. After the image of the subject is captured and a preview function is selected, the controller 180 displays the captured image 833 on the TOLED 154. Accordingly, the user can execute the phone book function on the front face of the mobile terminal and executes the camera function on the rear face to thus perform a plurality of tasks. Namely, the user can perform a multitasking function.

Figure 66:
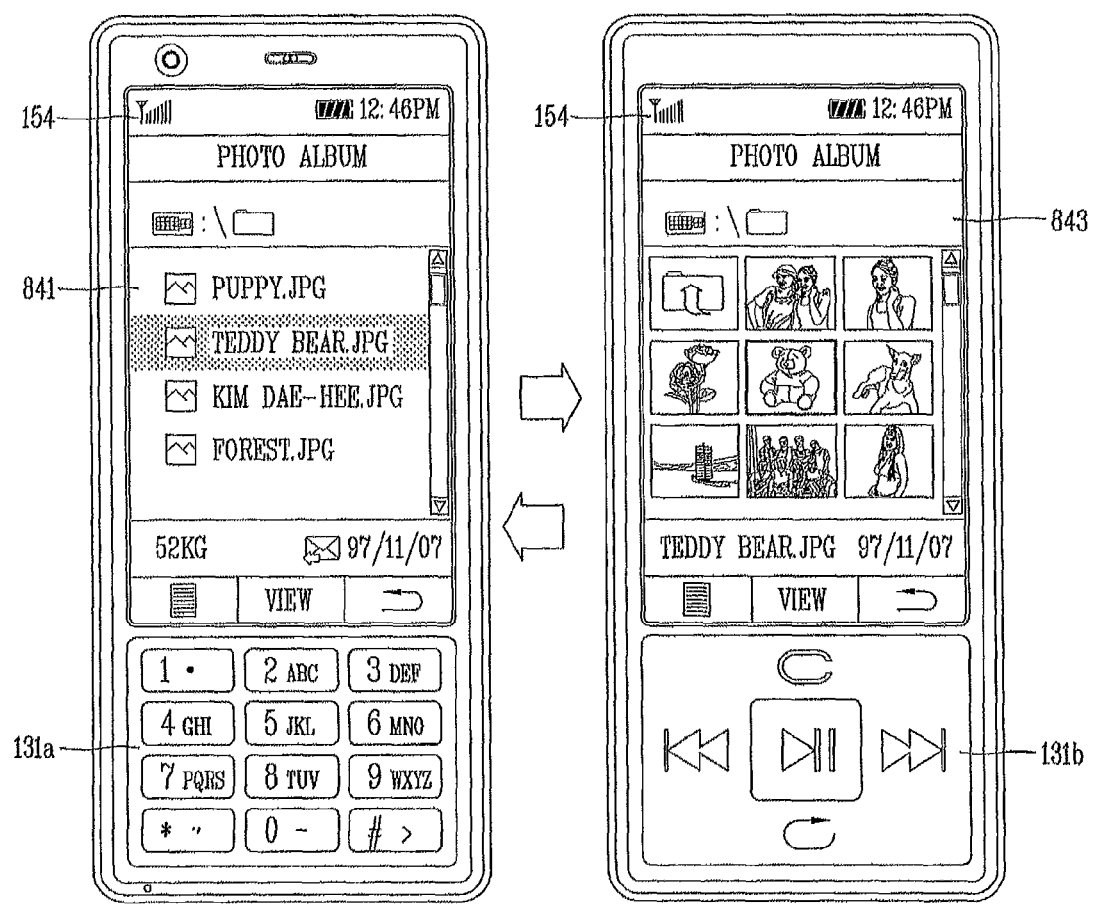
Figure 68:
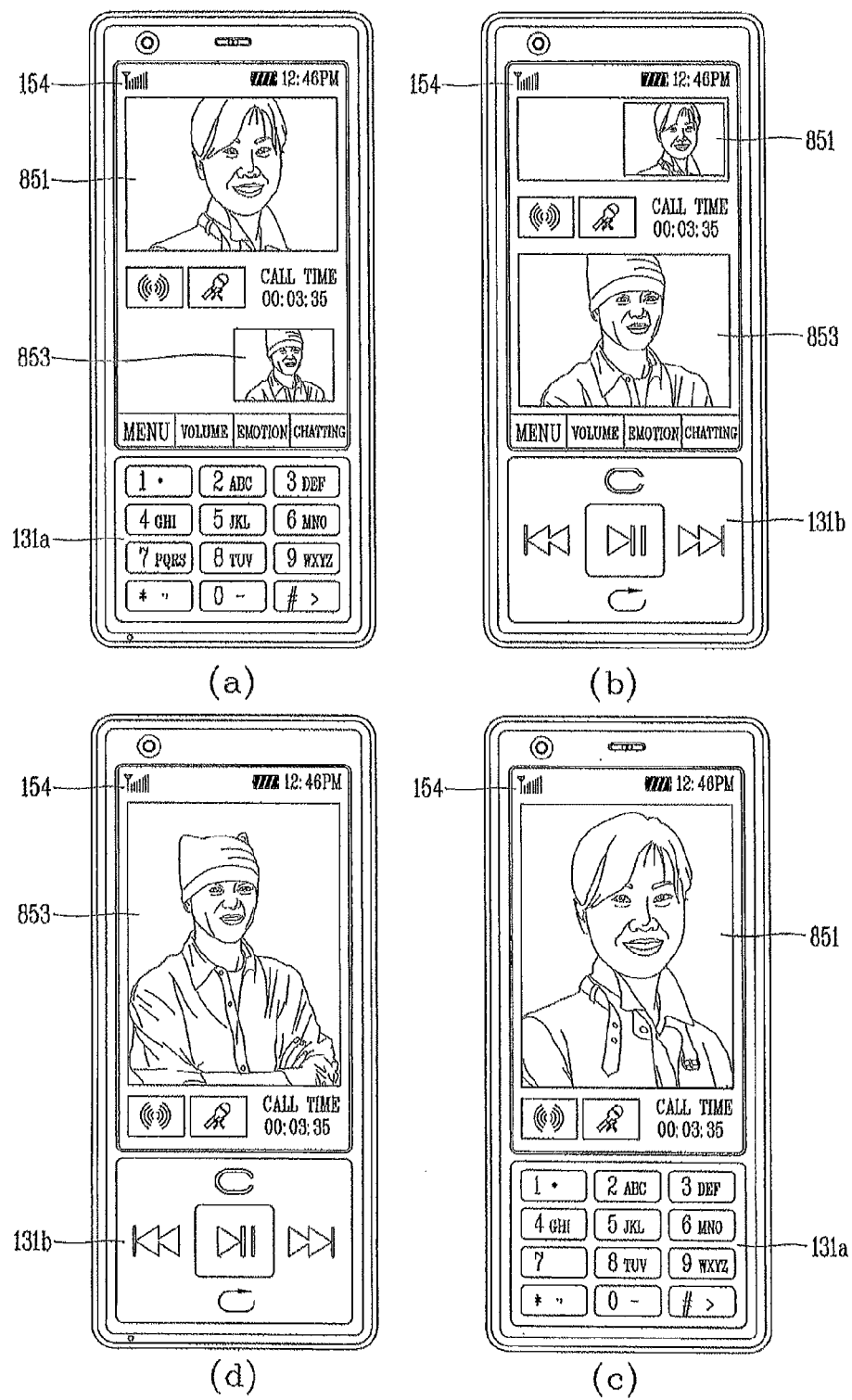

Next, FIGS. 66 to 68 are overviews showing an example of controlling a display direction of information on the transparent display of the mobile terminal according to an embodiment of the present invention. In this embodiment, if a particular function is executed and there are a plurality of methods for displaying the particular function, the display methods are automatically changed according to the configuration of the mobile terminal 100 (namely, according to how the mobile terminal is placed).

In more detail, and with reference to FIG. 66, when the mobile terminal 100 displays a photo list, a method for displaying the photo list includes a list mode for displaying the photo list as text and a thumbnail mode for displaying the photo list as a reduced image. Also, when an album function is executed by the user, the photo list is displayed on the TOLED 154 according to a pre-set display method. For example, when the pre-set display method corresponding to the configuration of the mobile terminal 100 is a list mode, the mobile terminal 100 displays the photo list in a list form 841 on the TOLED 154. With the photo list displayed in the list form, and if the configuration of the mobile terminal 100 is changed, the photo list displayed on the TOLED 154 is changed into and displayed in the thumbnail form 843.

With reference to FIG. 67, when the user attempts a voice call, the mobile terminal 100 controls the mobile communication module 112 to perform the voice call. Further, information such as a call time, an originated number, or the like is displayed on the TOLED 154 of the mobile terminal as shown in FIG. 67(*a*). Then, as shown in FIG. 67(*b*), if the configuration of the mobile terminal 100 is changed while performing the voice call, the controller 180 displays a pop-up message to the user informing the user the call in being changed into a video call and the mobile terminal is changed to a video call mode. Further, as the mobile terminal 100 is changed to the video call mode, the image captured by the camera 121 in real time is transmitted via the mobile communication module and displayed on the TOLED 154 as shown in FIG. 67(*c*). In addition, an image transmitted from another party is received via the mobile communication module 112 and displayed on the TOLED 154.

Then, if the configuration of the mobile terminal 100 is changed from the video call mode, the controller 180 displays a message in a pop-up manner, for example, informing the user the video call is being changed into the voice call mode as shown in FIG. 67(*d*). The controller 180 then displays a voice call execution screen image on the TOLED 154.

Next, with reference to the embodiment shown in FIG. 68, an image can be displayed during a video call according to four types of image display methods. For example, the image display methods may include another party image magnification viewing, my image magnification viewing, only another party image viewing, only my image viewing, or the like.

Thus, when the user attempts a video call via the mobile terminal 100, the controller 180 displays an image 851 of another party and an image 853 of the user on the TOLED 154 according to a pre-set image display method. Further, the controller 180 displays images on the TOLED 154 according to the other party image magnification viewing method in which the image of the other party is displayed to be larger than the image of the user as shown in FIG. 68(*a*).

Thereafter, when the mobile terminal 100 is changed from the first configuration to the second configuration, the controller 180 recognizes the changed configuration and changes the image display method displayed on the TOLED 154 to the my image magnification viewing method. Accordingly, the controller 180 reduces the image 851 of the other party and magnifies the user image 853 and displays such on the TOLED 154 as shown in FIG. 68(*b*).

If the mobile terminal 100 is changed from the second configuration to the first configuration, the controller 180 changes the image display method to the only another party image viewing method on the TOELD 154 as shown in FIG. 68(*c*). Also, the controller 180 magnifies only the image 851 of the other party and displays the image together with call-related information on the TOLED 154.

Then, if the configuration of the mobile terminal 100 is changed to the second configuration with only the other party image viewing displayed as changed, the controller 180 changes the image display method on the TOELD 154 to the only my image viewing method as shown in FIG. 68(*d*). Thereafter, if the configuration of the mobile terminal 100 is changed to the first configuration, the controller 180 changes the image display method of the TOLED 154 to the other party image magnification viewing method. Namely, whenever the configuration of the mobile terminal is changed, the image display mode is sequentially changed circulatively. Also, the image display mode may be returned to a previous state or a next state according to a rotation direction.

Figure 69:
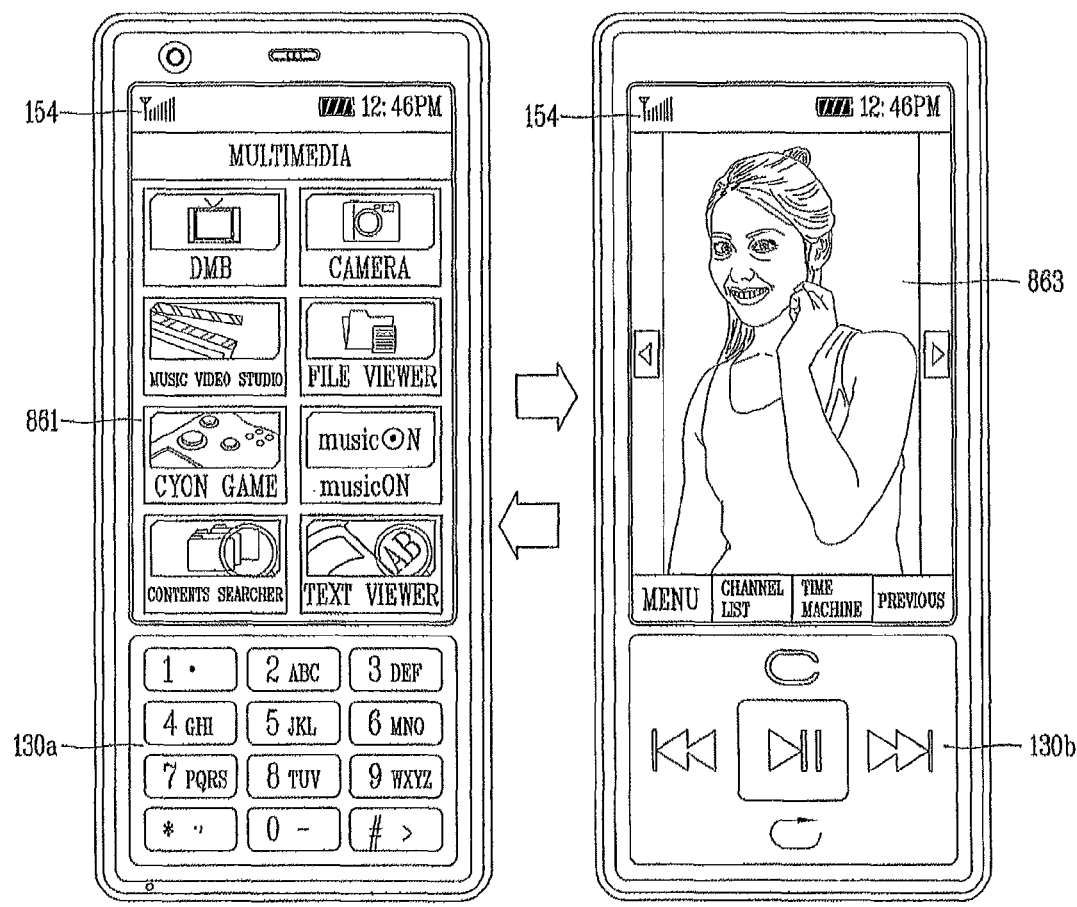
FIGS. 69 to 70 are overviews showing an example of controlling a display direction of information on the transparent display of the mobile terminal according to an embodiment of the present invention.
Figure 70:
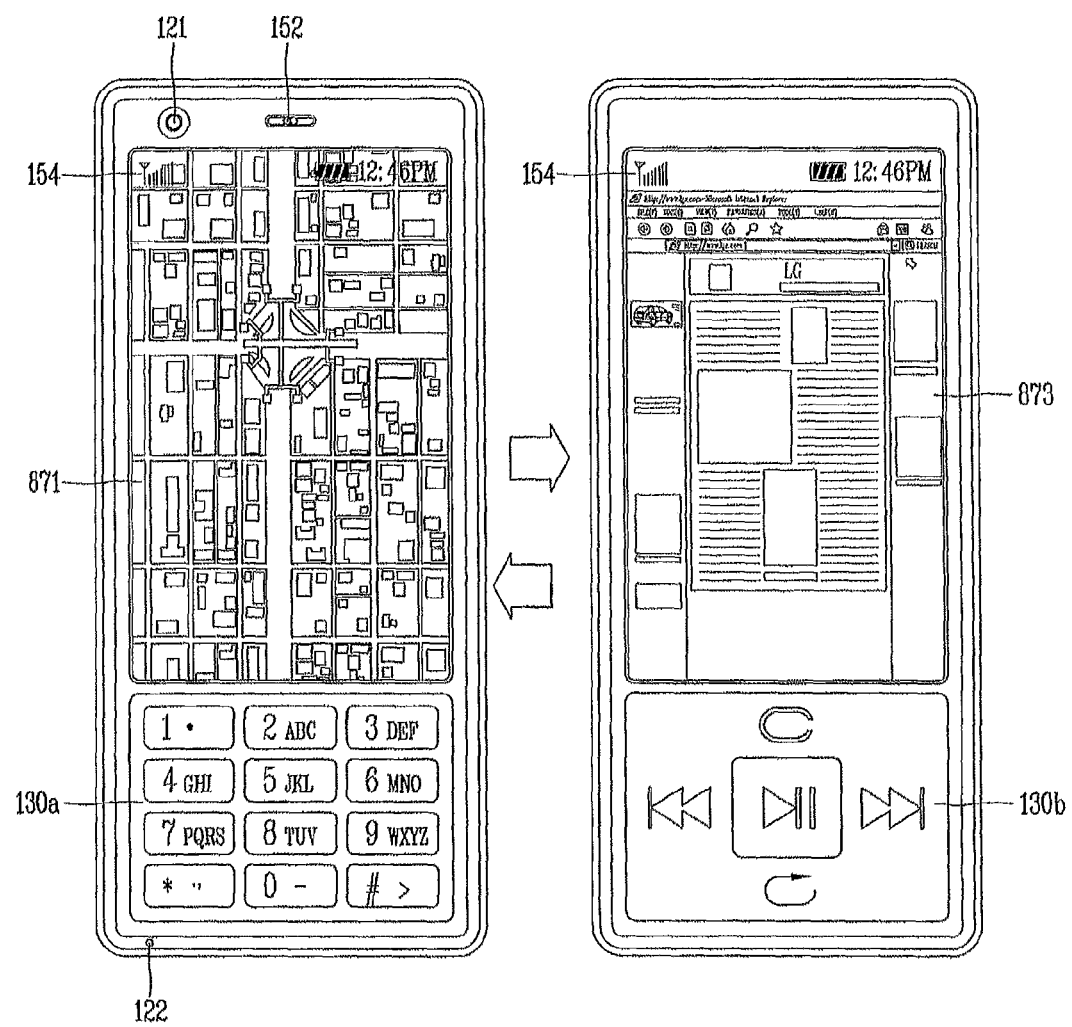

Next, FIGS. 69 to 70 are overviews showing an example of controlling a display direction of information on the transparent display of the mobile terminal according to an embodiment of the present invention. This embodiment shows that if the configuration of the mobile terminal is changed when particular conditions are met, a particular function is executed.

In more detail, as shown in FIG. 69, when the multimedia menu is selected through menu manipulation by the user, the mobile terminal 100 displays sub-menus 861 of the selected multimedia menu on the TOLED 154. Then, when a menu desired to be executed (e.g., a broadcast function) is selected from the display sub-menus 861, and if the configuration of the mobile terminal 100 is changed, the controller 180 executes the selected broadcast function as the menu desired to be executed. Namely, after a menu or contents is selected, if the configuration of the mobile terminal 100 is changed, the controller 180 recognizes the change as a command for ascertaining the selection and executes the corresponding menu or contents.

When the menu desired to be executed is selected, the controller 180 displays a broadcast image 863 received via the broadcast receiving module 111 on the TOLED 154. This embodiment shows that if the configuration of the terminal 100 is changed in a state that a particular object such as a menu or an icon is selected (namely, a cursor is positioned) on the currently executed function, the corresponding selected object is executed.

Next, with reference to FIG. 70, the controller 180 displays a navigation execution screen image 873 on the TOLED 154 according to a user input. In addition, if the configuration of the mobile terminal 100 is changed with the navigation function executing, the controller 180 executes a pre-set particular function related to the currently executed function. If the particular function previously set corresponding to the navigation function is a Web browser and if the configuration of the terminal 100 is changed while the navigation function is being executed, the controller 180 detects this change and displays a Web browser screen image 871 on the TOLED 154. Further, when the configuration of the terminal 100 is changed while the navigation function is being executed, a broadcast reception function can be executed, and various modifications may be possibly implemented.

In the embodiments of the present invention, the above-described method can be implemented as codes that can be read by a computer in a program-recorded medium. The computer-readable medium includes various types of recording devices in which data read by a computer system is stored. The computer-readable medium may include a ROM, a RAM, a CD-ROM, a magnetic tape, a floppy disk, an optical data storage device, and the like. The computer-readable medium also includes implementations in the form of signals (e.g., transmission via the Internet). The computer may also include the controller 180 of the terminal. Further, the configurations and methods according to the above-described embodiments of the mobile terminal are not limitedly applied but the entirety of portions of the respective embodiments may be selectively combined to configurations to form various modifications.

Thus, as described above, the mobile terminal according to embodiments of the present invention can control the information display direction of the transparent display according to the movement of the terminal such as rotation and inclination or an external input. The operation mode of the terminal can also be changed according to the movement of the terminal, and the screen display method of the transparent display can be changed according to the movement of the terminal. Further, a particular function can be executed according to the movement of the terminal. For example, different particular functions can be executed on both sides of the transparent display according to the movement of the terminal to provide a multitasking function to the user. The use of the transparent display according to the present invention also allows a dual-display to be used with a single display.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal comprising:
a transparent display configured to display information on both surfaces of the transparent display;
a sensing unit configured to detect a movement of the terminal; and
a controller configured to display first information on a first surface of the transparent display when the sensing unit senses the terminal is positioned in a first position and to display second information on a second surface of the transparent display when the sensing unit senses the terminal is positioned in a second position that is different than the first position.

2. The mobile terminal of claim 1, wherein the movement of the terminal sensed by the sensing unit includes at least one of a rotation of the terminal, a movement of the terminal, or an inclination of the terminal.

3. The mobile terminal of claim 1, wherein the first information displayed on the first surface of the transparent display includes a first standby screen, and the second information displayed on the second surface of the transparent display includes a second standby screen that is different than the first standby screen.

4. The mobile terminal of claim 1, wherein the first information displayed on the first surface of the transparent display includes a plurality top level menus for executing functions on the mobile terminal, and the second information displayed on the second surface of the transparent display includes a sub level menus corresponding to one of the top level menus.

5. The mobile terminal of claim 1, wherein the first information displayed on the first surface of the transparent display includes reproduced information being reproduced on the first surface of the transparent display, and the second information displayed on the second surface of the transparent display includes detailed information about the information being reproduced on the first surface of the transparent display.

6. The mobile terminal of claim 1, wherein the first information displayed on the first surface of the transparent display includes a listing of items provided by the terminal, and the second information displayed on the second surface of the transparent display includes an executable file corresponding to an item selected from the list of items.

7. The mobile terminal of claim 1, wherein the first information displayed on the first surface of the transparent display includes chatting messages corresponding to a video call being performed between the mobile terminal and at least one other terminal, and the second information displayed on the second surface of the transparent display includes video images of users in the video call.

8. The mobile terminal of claim 1, wherein the first information displayed on the first surface of the transparent display includes a listing of items provided by the terminal in a first format, and the second information displayed on the second surface of the transparent display includes the listing of the items in a second format that is different than the first format.

9. The mobile terminal of claim 1, wherein the first information displayed on the first surface of the transparent display includes information corresponding to a voice call being performed on the terminal, and the second information displayed on the second surface of the transparent display includes information corresponding to the voice call being changed into a video call.

10. The mobile terminal of claim 1, wherein the controller is further configured to change an operation mode of the terminal from displaying the first information on the first surface of the transparent display to displaying the second information on the second surface of the transparent display when the sensing unit senses the mobile terminal is change from the first surface facing a user to the second surface facing the user.

11. A method of controlling a mobile terminal, the method comprising:
- displaying information on both surfaces of a transparent display included with the mobile terminal;
- detecting a movement of the terminal using a sensing unit of the terminal;
- displaying first information on a first surface of the transparent display when the sensing unit senses the terminal is positioned in a first position; and
- displaying second information on a second surface of the transparent display when the sensing unit senses the terminal is positioned in a second position that is different than the first position.

12. The method of claim 11, wherein the movement of the terminal sensed by the sensing step includes at least one of a rotation of the terminal, a movement of the terminal, or an inclination of the terminal.

13. The method of claim 11, wherein the first information displayed on the first surface of the transparent display includes a first standby screen, and the second information displayed on the second surface of the transparent display includes a second standby screen that is different than the first standby screen.

14. The method of claim 11, wherein the first information displayed on the first surface of the transparent display includes a plurality top level menus for executing functions on the mobile terminal, and the second information displayed on the second surface of the transparent display includes a sub level menus corresponding to one of the top level menus.

15. The method of claim 11, wherein the first information displayed on the first surface of the transparent display includes reproduced information being reproduced on the first surface of the transparent display, and the second information displayed on the second surface of the transparent display includes detailed information about the information being reproduced on the first surface of the transparent display.

16. The method of claim 11, wherein the first information displayed on the first surface of the transparent display includes a listing of items provided by the terminal, and the second information displayed on the second surface of the transparent display includes an executed file corresponding to an item selected from the list of items.

17. The method of claim 11, wherein the first information displayed on the first surface of the transparent display includes chatting messages corresponding to a video call being performed between the mobile terminal and at least one other terminal, and the second information displayed on the second surface of the transparent display includes video images of users in the video call.

18. The method of claim 11, wherein the first information displayed on the first surface of the transparent display includes a listing of items provided by the terminal in a first format, and the second information displayed on the second surface of the transparent display includes the listing of the items in a second format that is different than the first format.

19. The method of claim 11, wherein the first information displayed on the first surface of the transparent display includes information corresponding to a voice call being performed on the terminal, and the second information displayed on the second surface of the transparent display includes information corresponding to the voice call being changed into a video call.

20. The method of claim 11, wherein the controller step further comprises changing an operation mode of the terminal from displaying the first information on the first surface of the transparent display to displaying the second information on the second surface of the transparent display when the sensing unit senses the mobile terminal is change from the first surface facing a user to the second surface facing the user.

* * * * *